(12) United States Patent
Wood et al.

(10) Patent No.: US 10,976,989 B2
(45) Date of Patent: Apr. 13, 2021

(54) SPATIAL MANAGEMENT OF AUDIO

(71) Applicant: Apple Inc., Cupertino, CA (US)

(72) Inventors: Stuart John Wood, San Francisco, CA (US); Martin E. Johnson, Los Gatos, CA (US); Darius A. Satongar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/553,679

(22) Filed: Aug. 28, 2019

(65) Prior Publication Data

US 2020/0097248 A1 Mar. 26, 2020

Related U.S. Application Data

(60) Provisional application No. 62/736,990, filed on Sep. 26, 2018.

(51) Int. Cl.
| | | |
|---|---|---|
| *G06F 3/048* | (2013.01) | |
| *G06F 3/16* | (2006.01) | |
| *G06F 3/0481* | (2013.01) | |
| *G06F 3/0486* | (2013.01) | |
| *G06F 3/0488* | (2013.01) | |
| *H04S 1/00* | (2006.01) | |
| *H04S 7/00* | (2006.01) | |

(52) U.S. Cl.
CPC ............ *G06F 3/165* (2013.01); *G06F 3/0481* (2013.01); *G06F 3/0486* (2013.01); *G06F 3/04883* (2013.01); *H04S 1/007* (2013.01); *H04S 7/302* (2013.01)

(58) Field of Classification Search
CPC ...... G06F 3/165; G06F 3/0481; G06F 3/0486; G06F 3/04883; H04S 1/007; H04S 7/302

USPC ......................................................... 715/716
See application file for complete search history.

(56) References Cited

U.S. PATENT DOCUMENTS

| | | | | |
|---|---|---|---|---|
| 9,928,029 | B2 * | 3/2018 | Brown | G06F 3/04847 |
| 10,175,848 | B2 * | 1/2019 | Haapsaari | G06F 3/0482 |
| 10,524,080 | B1 * | 12/2019 | Johnson | H04S 1/002 |
| 10,674,308 | B2 * | 6/2020 | Satongar | H04S 7/304 |
| 2008/0229206 | A1 | 9/2008 | Seymour et al. | |
| 2009/0215533 | A1 | 8/2009 | Zalewski et al. | |
| 2012/0235938 | A1 * | 9/2012 | Laubach | G06F 3/04883 345/173 |
| 2014/0304604 | A1 | 10/2014 | Miyazawa | |

(Continued)

OTHER PUBLICATIONS

Invitation to Pay Additional Fees and Partial International Search Report received for PCT Patent Application No. PCT/US2019/048816, dated Dec. 13, 2019, 14 pages.

(Continued)

*Primary Examiner* — David Phantana-angkool
(74) *Attorney, Agent, or Firm* — Dentons US LLP

(57) ABSTRACT

The present disclosure generally relates to user interfaces for managing spatial audio. Some exemplary techniques include user interfaces for transitioning between visual elements. Some exemplary techniques include user interfaces for previewing audio. Some exemplary techniques include user interfaces for discovering music. Some exemplary techniques include user interfaces for managing headphone transparency. Some exemplary techniques include user interfaces for manipulating multiple audio streams of an audio source.

30 Claims, 81 Drawing Sheets

(56) References Cited

U.S. PATENT DOCUMENTS

| | | | |
|---|---|---|---|
| 2015/0010160 A1* | 1/2015 | Udesen | H04R 25/70 |
| | | | 381/60 |
| 2015/0234464 A1* | 8/2015 | Yliaho | G06F 3/16 |
| | | | 345/473 |
| 2015/0312694 A1* | 10/2015 | Bilinski | H04S 7/302 |
| | | | 381/1 |
| 2016/0294557 A1 | 10/2016 | Baldwin et al. | |
| 2017/0358181 A1* | 12/2017 | Moussette | G06F 3/0486 |
| 2018/0239820 A1* | 8/2018 | Jeong | H04N 21/4668 |
| 2018/0329672 A1* | 11/2018 | Sadak | H04M 1/72569 |
| 2019/0087049 A1* | 3/2019 | Mani | G06F 3/017 |
| 2019/0087050 A1* | 3/2019 | Mani | G06F 3/0416 |
| 2019/0104359 A1* | 4/2019 | Sheaffer | H04R 1/083 |
| 2019/0104366 A1* | 4/2019 | Johnson | H04R 5/033 |
| 2019/0378430 A1* | 12/2019 | Kleiman Keinan | A63J 99/00 |
| 2020/0084560 A1* | 3/2020 | Satongar | H04B 3/23 |
| 2020/0097248 A1* | 3/2020 | Wood | H04S 7/302 |
| 2020/0104620 A1* | 4/2020 | Cohen | G06K 9/00926 |
| 2020/0356341 A1* | 11/2020 | Satongar | H04R 5/04 |
| 2020/0379716 A1* | 12/2020 | Carrigan | G06F 3/165 |

OTHER PUBLICATIONS

International Search Report and Written Opinion received for PCT Patent Application No. PCT/US2019/048816, dated Feb. 4, 2020, 22 pages.

* cited by examiner

700

708
While displaying, at the first location on the display, the first visual element:

710
Produce audio, at the two or more speakers using the first audio, in a first mode.

712
The first mode is configured such that audio produced using the first mode is perceived by the user as being produced from a first direction that corresponds to the display.

714
Produce audio, at the two or more speakers using the second audio, in a third mode different from the first mode and the second mode, wherein the third mode is configured such that audio produced in the third mode is perceived by the user as being produced from a direction that is off the display.

716
Forgo displaying, on the display, a second visual element that corresponds to the second audio.

718
Receive first user input.

1220
Concurrently with producing audio using the first audio source, second audio source, and third audio source, display, on the display, concurrent movement of the first visual element, the second visual element, and the third visual element at a fourth speed.

1400

1402
Display, at a first location on the display, a user-movable affordance.

1404
While the user-movable affordance is displayed at the first location:

1408
Operate the electronic device in a first state of ambient sound transparency.

1410
Produce, using the two or more speakers, audio using an audio source in a first mode.

1412
Detect, using the touch-sensitive surface, user input.

1400 — A

1414
In response to detecting the user input:

1416
In accordance with a set of one or more conditions being met, the set of one or more conditions including a first condition that is met when the user input is a touch-and-drag operation on the user-movable affordance:

1418
The set of one or more conditions includes a second condition that is met when the user input causes displacement of the user-movable affordance from the first location by at least a predetermined amount.

1420
Operate the electronic device in a second state of ambient sound transparency different from the first state of ambient sound transparency.

1422
Transitioning production of audio using the audio source from the first mode to a second mode different from the first mode.

1424
In accordance with the set of one or more conditions not being met:

1426
Maintain the electronic device in the first state of ambient sound transparency.

1428
Maintain producing audio using the audio source in the first mode.

1430
Update display, on the display, of the user-movable affordance from the first location on the display to a second location on the display in accordance with movement, on the touch-sensitive surface, of the user input.

1502
Produce, using the two or more speakers, audio using an audio source in a first mode, wherein the audio source includes a plurality of audio streams, including a first audio stream and a second audio stream.

1504
Detect, using the touch-sensitive surface, a first user input.

1506
In response to detecting the first user input, concurrently:

1508
Transition, using the two or more speakers, production of the first audio stream of the audio source from the first mode to a second mode that is different from the first mode.

1510
Transition, using the two or more speakers, production of the second audio stream of the audio source from the first mode to a third mode that is different from the first mode and the second mode.

1512
Display, on the display, a first visual representation of the first audio stream of the audio source.

1514
Display, on the display, a second visual representation of the second audio stream of the audio source, wherein the first visual representation is different from the second visual representation.

*FIG. 15*

SPATIAL MANAGEMENT OF AUDIO

CROSS REFERENCE TO RELATED APPLICATIONS

This application claims priority to U.S. provisional patent application 62/736,990, filed on Sep. 26, 2018, entitled, "SPATIAL MANAGEMENT OF AUDIO," the contents of which are hereby incorporated in its entirety.

FIELD

The present disclosure relates generally to computer user interfaces, and more specifically to techniques for managing spatial audio.

BACKGROUND

Humans can locate sounds in three dimensions (above and below, front and rear, and side to side). Different techniques can be used to modify audio such that a listener perceives the audio that a device creates as coming from a particular point in space.

BRIEF SUMMARY

Some techniques for managing spatial audio using electronic devices, however, are generally cumbersome and inefficient. For example, some techniques do not provide users with contextual awareness of the state of the electronic device through spatial management of audio. For another example, some existing techniques use a complex and time-consuming user interface, which may include multiple key presses or keystrokes. Existing techniques require more time than necessary, wasting user time and device energy. This latter consideration is particularly important in battery-operated devices. Further, existing audio techniques to not sufficiently help users navigate graphical user interfaces.

Accordingly, the present technique provides electronic devices with faster, more efficient methods and interfaces for managing spatial audio. Such methods and interfaces optionally complement or replace other methods for managing spatial audio. Such methods and interfaces reduce the cognitive burden on a user and produce a more efficient human-machine interface. For battery-operated computing devices, such methods and interfaces conserve power and increase the time between battery charges.

In accordance with some embodiments, a method performed at an electronic device with a display is described, wherein the electronic device is operably connected with two or more speakers. The method comprising: displaying, at a first location on the display, a first visual element; accessing first audio corresponding to the first visual element; while displaying, at the first location on the display, the first visual element: producing audio, at the two or more speakers using the first audio, in a first mode; and receiving first user input; in response to receiving the first user input: transitioning display of the first visual element from the first location on the display to the first visual element not being displayed on the display; and while not displaying, on the display, the first visual element, producing audio, at the two or more speakers, using the first audio in a second mode that is different from the first mode, wherein the second mode is configured such that audio produced in the second mode is perceived by the user as being produced from a direction that is off the display.

In accordance with some embodiments, a non-transitory computer-readable storage medium is described. The non-transitory computer-readable storage medium storing one or more programs configured to be executed by one or more processors of an electronic device with a display, wherein the electronic device is operably connected with two or more speakers, the one or more programs including instructions for: displaying, at a first location on the display, a first visual element; accessing first audio corresponding to the first visual element; while displaying, at the first location on the display, the first visual element: producing audio, at the two or more speakers using the first audio, in a first mode; and receiving first user input; in response to receiving the first user input: transitioning display of the first visual element from the first location on the display to the first visual element not being displayed on the display; and while not displaying, on the display, the first visual element, producing audio, at the two or more speakers, using the first audio in a second mode that is different from the first mode, wherein the second mode is configured such that audio produced in the second mode is perceived by the user as being produced from a direction that is off the display.

In accordance with some embodiments, a transitory computer-readable storage medium is described. The transitory computer-readable storage medium storing one or more programs configured to be executed by one or more processors of an electronic device with a display, wherein the electronic device is operably connected with two or more speakers, the one or more programs including instructions for: displaying, at a first location on the display, a first visual element; accessing first audio corresponding to the first visual element; while displaying, at the first location on the display, the first visual element: producing audio, at the two or more speakers using the first audio, in a first mode; and receiving first user input; in response to receiving the first user input: transitioning display of the first visual element from the first location on the display to the first visual element not being displayed on the display; and while not displaying, on the display, the first visual element, producing audio, at the two or more speakers, using the first audio in a second mode that is different from the first mode, wherein the second mode is configured such that audio produced in the second mode is perceived by the user as being produced from a direction that is off the display.

In accordance with some embodiments, an electronic device is described. The electronic device comprises: a display; one or more processors; and memory storing one or more programs configured to be executed by the one or more processors, wherein the electronic device is operably connected with two or more speakers, the one or more programs including instructions for: displaying, at a first location on the display, a first visual element; accessing first audio corresponding to the first visual element; while displaying, at the first location on the display, the first visual element: producing audio, at the two or more speakers using the first audio, in a first mode; and receiving first user input; in response to receiving the first user input: transitioning display of the first visual element from the first location on the display to the first visual element not being displayed on the display; and while not displaying, on the display, the first visual element, producing audio, at the two or more speakers, using the first audio in a second mode that is different from the first mode, wherein the second mode is configured such that audio produced in the second mode is perceived by the user as being produced from a direction that is off the display.

In accordance with some embodiments, an electronic device is described. The electronic device comprises: a display, wherein the electronic device is operably connected with two or more speakers; means for displaying, at a first location on the display, a first visual element; means for accessing first audio corresponding to the first visual element; means, while displaying, at the first location on the display, the first visual element, for: producing audio, at the two or more speakers using the first audio, in a first mode; and receiving first user input; means, responsive to receiving the first user input, for: transitioning display of the first visual element from the first location on the display to the first visual element not being displayed on the display; and while not displaying, on the display, the first visual element, producing audio, at the two or more speakers, using the first audio in a second mode that is different from the first mode, wherein the second mode is configured such that audio produced in the second mode is perceived by the user as being produced from a direction that is off the display.

In accordance with some embodiments, a method performed at an electronic device with a display and a touch-sensitive surface is described, wherein the electronic device is operably connected with two or more speakers. The method comprises: displaying, on the display, a list of a plurality of media elements, wherein each media element of the plurality of media elements corresponds to a respective media file; detecting, using the touch-sensitive surface, a user contact at a location corresponding to a first media element; in response to detecting the user contact at the location corresponding to the first media element and in accordance with the user contact including a touch-and-hold input: producing, using the two or more speakers, audio using a first audio file that corresponds to the first media element without exceeding a predetermined audio playback duration; while the user contact remains at the location corresponding to the first media element: in accordance with the predetermined audio playback duration period not being exceeded, continuing to produce, using the two or more speakers, audio using the first audio file; and in accordance with the predetermined audio playback duration period being exceeded, ceasing to produce, using the two or more speakers, audio using the first audio file; detecting, using the touch-sensitive surface, movement of the user contact from the location that corresponds to the first media element to a location that corresponds to a second media element; in response to detecting the user contact at the location corresponding to the second media element and in accordance with the user contact including a touch-and-hold input: producing, using the two or more speakers, audio using a second audio file that corresponds to the second media element without exceeding the predetermined audio playback duration; while the user contact remains at the location corresponding to the second media element: in accordance with the predetermined audio playback duration period not being exceeded, continuing to produce, using the two or more speakers, audio using the second audio file; and in accordance with the predetermined audio playback duration period being exceeded, ceasing to produce, using the two or more speakers, audio using the second audio file; detecting, using the touch-sensitive surface, a lift-off of the user contact; and in response to detecting the lift-off of the user contact: ceasing to produce, using the two or more speakers, audio using the first audio file or the second audio file.

In accordance with some embodiments, a non-transitory computer-readable storage medium is described. The non-transitory computer-readable storage medium stores one or more programs configured to be executed by one or more processors of an electronic device with a display and a touch-sensitive surface, wherein the electronic device is operably connected with two or more speakers, the one or more programs including instructions for: displaying, on the display, a list of a plurality of media elements, wherein each media element of the plurality of media elements corresponds to a respective media file; detecting, using the touch-sensitive surface, a user contact at a location corresponding to a first media element; in response to detecting the user contact at the location corresponding to the first media element and in accordance with the user contact including a touch-and-hold input: producing, using the two or more speakers, audio using a first audio file that corresponds to the first media element without exceeding a predetermined audio playback duration; while the user contact remains at the location corresponding to the first media element: in accordance with the predetermined audio playback duration period not being exceeded, continuing to produce, using the two or more speakers, audio using the first audio file; and in accordance with the predetermined audio playback duration period being exceeded, ceasing to produce, using the two or more speakers, audio using the first audio file; detecting, using the touch-sensitive surface, movement of the user contact from the location that corresponds to the first media element to a location that corresponds to a second media element; in response to detecting the user contact at the location corresponding to the second media element and in accordance with the user contact including a touch-and-hold input: producing, using the two or more speakers, audio using a second audio file that corresponds to the second media element without exceeding the predetermined audio playback duration; while the user contact remains at the location corresponding to the second media element: in accordance with the predetermined audio playback duration period not being exceeded, continuing to produce, using the two or more speakers, audio using the second audio file; and in accordance with the predetermined audio playback duration period being exceeded, ceasing to produce, using the two or more speakers, audio using the second audio file; detecting, using the touch-sensitive surface, a lift-off of the user contact; and in response to detecting the lift-off of the user contact: ceasing to produce, using the two or more speakers, audio using the first audio file or the second audio file.

In accordance with some embodiments, a transitory computer-readable storage medium is described. The transitory computer-readable storage medium stores one or more programs configured to be executed by one or more processors of an electronic device with a display and a touch-sensitive surface, wherein the electronic device is operably connected with two or more speakers, the one or more programs including instructions for: displaying, on the display, a list of a plurality of media elements, wherein each media element of the plurality of media elements corresponds to a respective media file; detecting, using the touch-sensitive surface, a user contact at a location corresponding to a first media element; in response to detecting the user contact at the location corresponding to the first media element and in accordance with the user contact including a touch-and-hold input: producing, using the two or more speakers, audio using a first audio file that corresponds to the first media element without exceeding a predetermined audio playback duration; while the user contact remains at the location corresponding to the first media element: in accordance with the predetermined audio playback duration period not being exceeded, continuing to produce, using the two or more speakers, audio using the first audio file; and in accordance with the predetermined audio playback duration period being exceeded, ceasing to produce, using the two or more speakers, audio using the first audio file; detecting, using the touch-sensitive surface, movement of the user contact from the location that corresponds to the first media element to a location that corresponds to a second media element; in response to detecting the user contact at the location corresponding to the second media element and in accordance with the user contact including a touch-and-hold input: producing, using the two or more speakers, audio using a second audio file that corresponds to the second media element without exceeding the predetermined audio playback duration; while the user contact remains at the location corresponding to the second media element: in accordance with the predetermined audio playback duration period not being exceeded, continuing to produce, using the two or more speakers, audio using the second audio file; and in accordance with the predetermined audio playback duration period being exceeded, ceasing to produce, using the two or more speakers, audio using the second audio file; detecting, using the touch-sensitive surface, a lift-off of the user contact; and in response to detecting the lift-off of the user contact: ceasing to produce, using the two or more speakers, audio using the first audio file or the second audio file.

In accordance with some embodiments, an electronic device is described. The electronic device comprises: a display; a touch-sensitive surface; one or more processors; and memory storing one or more programs configured to be executed by the one or more processors, wherein the electronic device is operably connected with two or more speakers, the one or more programs including instructions for: displaying, on the display, a list of a plurality of media elements, wherein each media element of the plurality of media elements corresponds to a respective media file; detecting, using the touch-sensitive surface, a user contact at a location corresponding to a first media element; in response to detecting the user contact at the location corresponding to the first media element and in accordance with the user contact including a touch-and-hold input: producing, using the two or more speakers, audio using a first audio file that corresponds to the first media element without exceeding a predetermined audio playback duration; while the user contact remains at the location corresponding to the first media element: in accordance with the predetermined audio playback duration period not being exceeded, continuing to produce, using the two or more speakers, audio using the first audio file; and in accordance with the predetermined audio playback duration period being exceeded, ceasing to produce, using the two or more speakers, audio using the first audio file; detecting, using the touch-sensitive surface, movement of the user contact from the location that corresponds to the first media element to a location that corresponds to a second media element; in response to detecting the user contact at the location corresponding to the second media element and in accordance with the user contact including a touch-and-hold input: producing, using the two or more speakers, audio using a second audio file that corresponds to the second media element without exceeding the predetermined audio playback duration; while the user contact remains at the location corresponding to the second media element: in accordance with the predetermined audio playback duration period not being exceeded, continuing to produce, using the two or more speakers, audio using the second audio file; and in accordance with the predetermined audio playback duration period being exceeded, ceasing to produce, using the two or more speakers, audio using the second audio file; detecting, using the touch-sensitive surface, a lift-off of the user contact; and in response to detecting the lift-off of the user contact: ceasing to produce, using the two or more speakers, audio using the first audio file or the second audio file.

In accordance with some embodiments, an electronic device is described. The electronic device comprises: a display; a touch-sensitive surface, wherein the electronic device is operably connected with two or more speakers; means for displaying, on the display, a list of a plurality of media elements, wherein each media element of the plurality of media elements corresponds to a respective media file; means for detecting, using the touch-sensitive surface, a user contact at a location corresponding to a first media element; means, responsive to detecting the user contact at the location corresponding to the first media element and in accordance with the user contact including a touch-and-hold input, for: producing, using the two or more speakers, audio using a first audio file that corresponds to the first media element without exceeding a predetermined audio playback duration; while the user contact remains at the location corresponding to the first media element: in accordance with the predetermined audio playback duration period not being exceeded, continuing to produce, using the two or more speakers, audio using the first audio file; and in accordance with the predetermined audio playback duration period being exceeded, ceasing to produce, using the two or more speakers, audio using the first audio file; means for detecting, using the touch-sensitive surface, movement of the user contact from the location that corresponds to the first media element to a location that corresponds to a second media element; means, responsive to detecting the user contact at the location corresponding to the second media element and in accordance with the user contact including a touch-and-hold input, for: producing, using the two or more speakers, audio using a second audio file that corresponds to the second media element without exceeding the predetermined audio playback duration; means, while the user contact remains at the location corresponding to the second media element, for: in accordance with the predetermined audio playback duration period not being exceeded, continuing to produce, using the two or more speakers, audio using the second audio file; and in accordance with the predetermined audio playback duration period being exceeded, ceasing to produce, using the two or more speakers, audio using the second audio file; means for detecting, using the touch-sensitive surface, a lift-off of the user contact; and means, responsive to detecting the lift-off of the user contact, for: ceasing to produce, using the two or more speakers, audio using the first audio file or the second audio file.

In accordance with some embodiments, a method performed at an electronic device with a display and a touch-sensitive surface is described, wherein the electronic device is operably connected with two or more speakers. The method comprises: detecting a first user input for activating a discovery mode; in response to detecting the first user input for activating the discovery mode, concurrently producing, using the two or more speakers, audio using: a first audio source in a first mode, wherein the first mode is configured such that audio produced using the first mode is perceived by the user as being produced from a first point in space that moves over time in a first direction along a predefined path at a first speed; a second audio source in a second mode, wherein the second mode is configured such that audio produced using the second mode is perceived by the user as being produced from a second point in space that moves over time in the first direction along the predefined path at a second speed, and a third audio source in a third mode, wherein the third mode is configured such that audio produced using the third mode is perceived by the user as being produced from a third point in space that moves over time in the first direction along the predefined path at a third speed; and wherein the first point, the second point, and the third point are different points in space.

In accordance with some embodiments, a non-transitory computer-readable storage medium is described. The non-transitory computer-readable storage medium stores one or more programs configured to be executed by one or more processors of an electronic device with a display and a touch-sensitive surface, wherein the electronic device is operably connected with two or more speakers, the one or more programs including instructions for: detecting a first user input for activating a discovery mode; in response to detecting the first user input for activating the discovery mode, concurrently producing, using the two or more speakers, audio using: a first audio source in a first mode, wherein the first mode is configured such that audio produced using the first mode is perceived by the user as being produced from a first point in space that moves over time in a first direction along a predefined path at a first speed; a second audio source in a second mode, wherein the second mode is configured such that audio produced using the second mode is perceived by the user as being produced from a second point in space that moves over time in the first direction along the predefined path at a second speed, and a third audio source in a third mode, wherein the third mode is configured such that audio produced using the third mode is perceived by the user as being produced from a third point in space that moves over time in the first direction along the predefined path at a third speed; and wherein the first point, the second point, and the third point are different points in space.

In accordance with some embodiments, a transitory computer-readable storage medium is described. The transitory computer-readable storage medium stores one or more programs configured to be executed by one or more processors of an electronic device with a display and a touch-sensitive surface, wherein the electronic device is operably connected with two or more speakers, the one or more programs including instructions for: detecting a first user input for activating a discovery mode; in response to detecting the first user input for activating the discovery mode, concurrently producing, using the two or more speakers, audio using: a first audio source in a first mode, wherein the first mode is configured such that audio produced using the first mode is perceived by the user as being produced from a first point in space that moves over time in a first direction along a predefined path at a first speed; a second audio source in a second mode, wherein the second mode is configured such that audio produced using the second mode is perceived by the user as being produced from a second point in space that moves over time in the first direction along the predefined path at a second speed, and a third audio source in a third mode, wherein the third mode is configured such that audio produced using the third mode is perceived by the user as being produced from a third point in space that moves over time in the first direction along the predefined path at a third speed; and wherein the first point, the second point, and the third point are different points in space.

In accordance with some embodiments, an electronic device is described. The electronic device comprises: a display; a touch-sensitive surface; one or more processors; and memory storing one or more programs configured to be executed by the one or more processors, wherein the electronic device is operably connected with two or more speakers, the one or more programs including instructions for: detecting a first user input for activating a discovery mode; in response to detecting the first user input for activating the discovery mode, concurrently producing, using the two or more speakers, audio using: a first audio source in a first mode, wherein the first mode is configured such that audio produced using the first mode is perceived by the user as being produced from a first point in space that moves over time in a first direction along a predefined path at a first speed; a second audio source in a second mode, wherein the second mode is configured such that audio produced using the second mode is perceived by the user as being produced from a second point in space that moves over time in the first direction along the predefined path at a second speed, and a third audio source in a third mode, wherein the third mode is configured such that audio produced using the third mode is perceived by the user as being produced from a third point in space that moves over time in the first direction along the predefined path at a third speed; and wherein the first point, the second point, and the third point are different points in space.

In accordance with some embodiments, an electronic device is described. The electronic device comprises: a display; a touch-sensitive surface, wherein the electronic device is operably connected with two or more speakers; means for detecting a first user input for activating a discovery mode; means, responsive to detecting the first user input for activating the discovery mode, for concurrently producing, using the two or more speakers, audio using: a first audio source in a first mode, wherein the first mode is configured such that audio produced using the first mode is perceived by the user as being produced from a first point in space that moves over time in a first direction along a predefined path at a first speed; a second audio source in a second mode, wherein the second mode is configured such that audio produced using the second mode is perceived by the user as being produced from a second point in space that moves over time in the first direction along the predefined path at a second speed, and a third audio source in a third mode, wherein the third mode is configured such that audio produced using the third mode is perceived by the user as being produced from a third point in space that moves over time in the first direction along the predefined path at a third speed; and wherein the first point, the second point, and the third point are different points in space.

In accordance with some embodiments, a method performed at an electronic device with a display and a touch-sensitive surface is described, wherein the electronic device is operably connected with two or more speakers. The method comprises: displaying, at a first location on the display, a user-movable affordance; while the user-movable affordance is displayed at the first location: operating the electronic device in a first state of ambient sound transparency; producing, using the two or more speakers, audio using an audio source in a first mode; and detecting, using the touch-sensitive surface, user input; and in response to detecting the user input: in accordance with a set of one or more conditions being met, the set of one or more conditions including a first condition that is met when the user input is a touch-and-drag operation on the user-movable affordance: operating the electronic device in a second state of ambient sound transparency different from the first state of ambient sound transparency; and transitioning production of audio using the audio source from the first mode to a second mode different from the first mode; in accordance with the set of one or more conditions not being met: maintaining the electronic device in the first state of ambient sound transparency; and maintaining producing audio using the audio source in the first mode.

In accordance with some embodiments, a non-transitory computer-readable storage medium is described. The non-transitory computer-readable storage medium stores one or more programs configured to be executed by one or more processors of an electronic device with a display and a touch-sensitive surface, wherein the electronic device is operably connected with two or more speakers, the one or more programs including instructions for: displaying, at a first location on the display, a user-movable affordance; while the user-movable affordance is displayed at the first location: operating the electronic device in a first state of ambient sound transparency; producing, using the two or more speakers, audio using an audio source in a first mode; and detecting, using the touch-sensitive surface, user input; and in response to detecting the user input: in accordance with a set of one or more conditions being met, the set of one or more conditions including a first condition that is met when the user input is a touch-and-drag operation on the user-movable affordance: operating the electronic device in a second state of ambient sound transparency different from the first state of ambient sound transparency; and transitioning production of audio using the audio source from the first mode to a second mode different from the first mode; in accordance with the set of one or more conditions not being met: maintaining the electronic device in the first state of ambient sound transparency; and maintaining producing audio using the audio source in the first mode.

In accordance with some embodiments, a transitory computer-readable storage medium is described. The transitory computer-readable storage medium stores one or more programs configured to be executed by one or more processors of an electronic device with a display and a touch-sensitive surface, wherein the electronic device is operably connected with two or more speakers, the one or more programs including instructions for: displaying, at a first location on the display, a user-movable affordance; while the user-movable affordance is displayed at the first location: operating the electronic device in a first state of ambient sound transparency; producing, using the two or more speakers, audio using an audio source in a first mode; and detecting, using the touch-sensitive surface, user input; and in response to detecting the user input: in accordance with a set of one or more conditions being met, the set of one or more conditions including a first condition that is met when the user input is a touch-and-drag operation on the user-movable affordance: operating the electronic device in a second state of ambient sound transparency different from the first state of ambient sound transparency; and transitioning production of audio using the audio source from the first mode to a second mode different from the first mode; in accordance with the set of one or more conditions not being met: maintaining the electronic device in the first state of ambient sound transparency; and maintaining producing audio using the audio source in the first mode.

In accordance with some embodiments, an electronic device is described. The electronic device comprises: a display; a touch-sensitive surface; one or more processors; and memory storing one or more programs configured to be executed by the one or more processors, wherein the electronic device is operably connected with two or more speakers, the one or more programs including instructions for: displaying, at a first location on the display, a user-movable affordance; while the user-movable affordance is displayed at the first location: operating the electronic device in a first state of ambient sound transparency; producing, using the two or more speakers, audio using an audio source in a first mode; and detecting, using the touch-sensitive surface, user input; and in response to detecting the user input: in accordance with a set of one or more conditions being met, the set of one or more conditions including a first condition that is met when the user input is a touch-and-drag operation on the user-movable affordance: operating the electronic device in a second state of ambient sound transparency different from the first state of ambient sound transparency; and transitioning production of audio using the audio source from the first mode to a second mode different from the first mode; in accordance with the set of one or more conditions not being met: maintaining the electronic device in the first state of ambient sound transparency; and maintaining producing audio using the audio source in the first mode.

In accordance with some embodiments, an electronic device is described. The electronic device comprises: a display; a touch-sensitive surface, wherein the electronic device is operably connected with two or more speakers; means for displaying, at a first location on the display, a user-movable affordance; means, while the user-movable affordance is displayed at the first location, for: operating the electronic device in a first state of ambient sound transparency; producing, using the two or more speakers, audio using an audio source in a first mode; and detecting, using the touch-sensitive surface, user input; and means, responsive to detecting the user input, for: in accordance with a set of one or more conditions being met, the set of one or more conditions including a first condition that is met when the user input is a touch-and-drag operation on the user-movable affordance: operating the electronic device in a second state of ambient sound transparency different from the first state of ambient sound transparency; and transitioning production of audio using the audio source from the first mode to a second mode different from the first mode; in accordance with the set of one or more conditions not being met: maintaining the electronic device in the first state of ambient sound transparency; and maintaining producing audio using the audio source in the first mode.

In accordance with some embodiments, a method performed at an electronic device with a display and a touch-sensitive surface is described, wherein the electronic device is operably connected with two or more speakers including a first speaker and a second speaker. The method comprises: producing, using the two or more speakers, audio using an audio source in a first mode, wherein the audio source includes a plurality of audio streams, including a first audio stream and a second audio stream; detecting, using the touch-sensitive surface, a first user input; in response to detecting the first user input, concurrently: transitioning, using the two or more speakers, production of the first audio stream of the audio source from the first mode to a second mode that is different from the first mode; transitioning, using the two or more speakers, production of the second audio stream of the audio source from the first mode to a third mode that is different from the first mode and the second mode; displaying, on the display, a first visual representation of the first audio stream of the audio source; and displaying, on the display, a second visual representation of the second audio stream of the audio source, wherein the first visual representation is different from the second visual representation.

In accordance with some embodiments, a non-transitory computer-readable storage medium is described. The non-transitory computer-readable storage medium stores one or more programs configured to be executed by one or more processors of an electronic device with a display and a touch-sensitive surface, wherein the electronic device is operably connected with two or more speakers including a first speaker and a second speaker, the one or more programs including instructions for: producing, using the two or more speakers, audio using an audio source in a first mode, wherein the audio source includes a plurality of audio streams, including a first audio stream and a second audio stream; detecting, using the touch-sensitive surface, a first user input; in response to detecting the first user input, concurrently: transitioning, using the two or more speakers, production of the first audio stream of the audio source from the first mode to a second mode that is different from the first mode; transitioning, using the two or more speakers, production of the second audio stream of the audio source from the first mode to a third mode that is different from the first mode and the second mode; displaying, on the display, a first visual representation of the first audio stream of the audio source; and displaying, on the display, a second visual representation of the second audio stream of the audio source, wherein the first visual representation is different from the second visual representation.

In accordance with some embodiments, a transitory computer-readable storage medium is described. The transitory computer-readable storage medium stores one or more programs configured to be executed by one or more processors of an electronic device with a display and a touch-sensitive surface, wherein the electronic device is operably connected with two or more speakers including a first speaker and a second speaker, the one or more programs including instructions for: producing, using the two or more speakers, audio using an audio source in a first mode, wherein the audio source includes a plurality of audio streams, including a first audio stream and a second audio stream; detecting, using the touch-sensitive surface, a first user input; in response to detecting the first user input, concurrently: transitioning, using the two or more speakers, production of the first audio stream of the audio source from the first mode to a second mode that is different from the first mode; transitioning, using the two or more speakers, production of the second audio stream of the audio source from the first mode to a third mode that is different from the first mode and the second mode; displaying, on the display, a first visual representation of the first audio stream of the audio source; and displaying, on the display, a second visual representation of the second audio stream of the audio source, wherein the first visual representation is different from the second visual representation.

In accordance with some embodiments, an electronic device is described. The electronic device comprises: a display; a touch-sensitive surface; one or more processors; and memory storing one or more programs configured to be executed by the one or more processors, wherein the electronic device is operably connected with two or more speakers including a first speaker and a second speaker, the one or more programs including instructions for: producing, using the two or more speakers, audio using an audio source in a first mode, wherein the audio source includes a plurality of audio streams, including a first audio stream and a second audio stream; detecting, using the touch-sensitive surface, a first user input; in response to detecting the first user input, concurrently: transitioning, using the two or more speakers, production of the first audio stream of the audio source from the first mode to a second mode that is different from the first mode; transitioning, using the two or more speakers, production of the second audio stream of the audio source from the first mode to a third mode that is different from the first mode and the second mode; displaying, on the display, a first visual representation of the first audio stream of the audio source; and displaying, on the display, a second visual representation of the second audio stream of the audio source, wherein the first visual representation is different from the second visual representation.

In accordance with some embodiments, an electronic device is described. The electronic device comprises: a display; a touch-sensitive surface, wherein the electronic device is operably connected with two or more speakers including a first speaker and a second speaker; means for producing, using the two or more speakers, audio using an audio source in a first mode, wherein the audio source includes a plurality of audio streams, including a first audio stream and a second audio stream; means for detecting, using the touch-sensitive surface, a first user input; means, responsive to detecting the first user input, for concurrently: transitioning, using the two or more speakers, production of the first audio stream of the audio source from the first mode to a second mode that is different from the first mode; transitioning, using the two or more speakers, production of the second audio stream of the audio source from the first mode to a third mode that is different from the first mode and the second mode; displaying, on the display, a first visual representation of the first audio stream of the audio source; and displaying, on the display, a second visual representation of the second audio stream of the audio source, wherein the first visual representation is different from the second visual representation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing spatial audio, thereby increasing the effectiveness, efficiency, and user satisfaction with such devices. Such methods and interfaces may complement or replace other methods for managing spatial audio.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7C is a flow diagram illustrating a method for transitioning between visual elements using an electronic device in accordance with some embodiments.

FIGS. 14A-14B is a flow diagram illustrating a method for managing headphone transparency using an electronic device in accordance with some embodiments.

FIG. 15 is a flow diagram illustrating a method for manipulating multiple audio streams of an audio source using an electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing spatial audio. For example, spatial audio can provide users with contextual awareness of the state of the electronic device. Such techniques can reduce the cognitive burden on a user who uses electronic devices, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing event notifications.

Figure 6A:
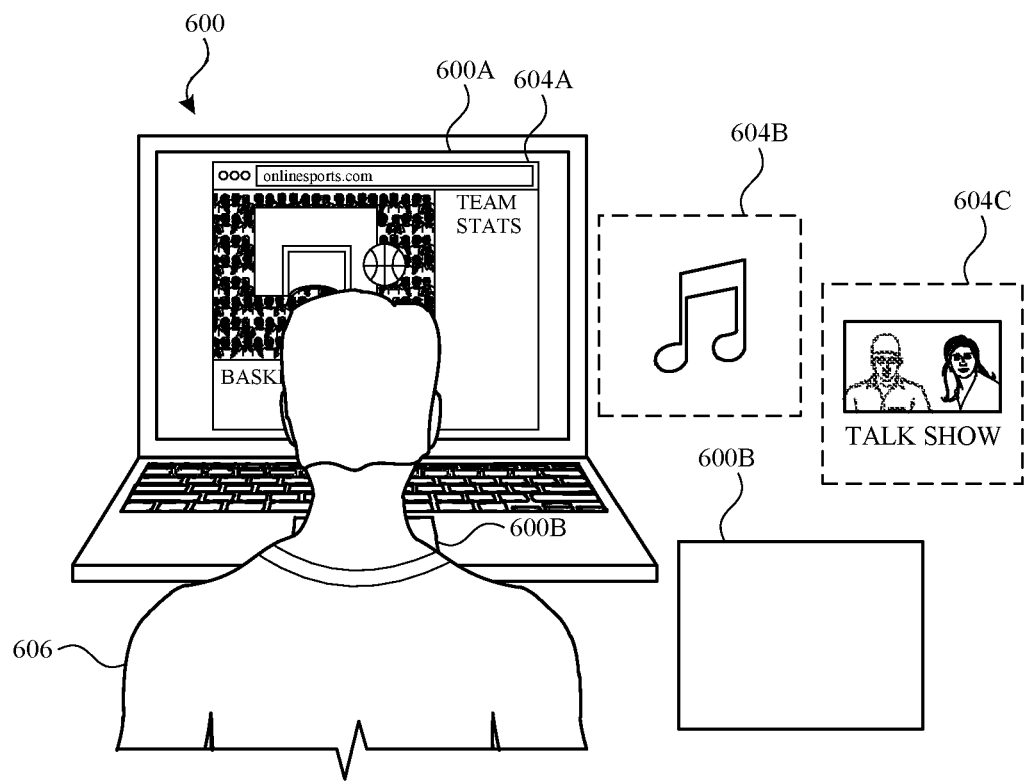
FIGS. 6A-6N illustrate exemplary techniques for transitioning between visual elements, in accordance with some embodiments.
Figure 6A:
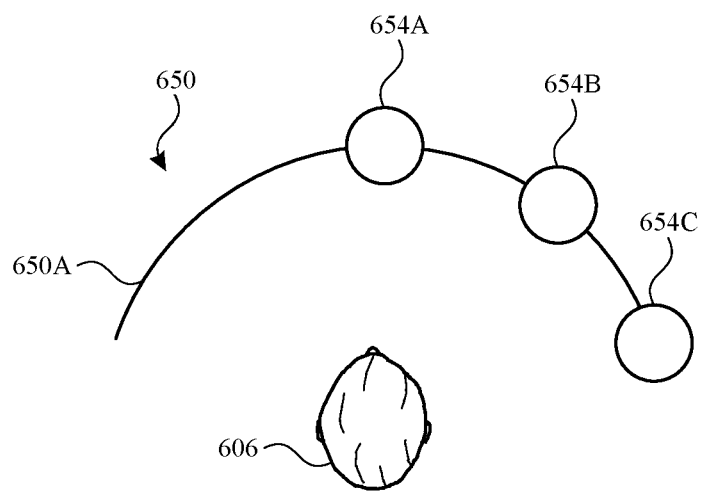
Figure 6B:
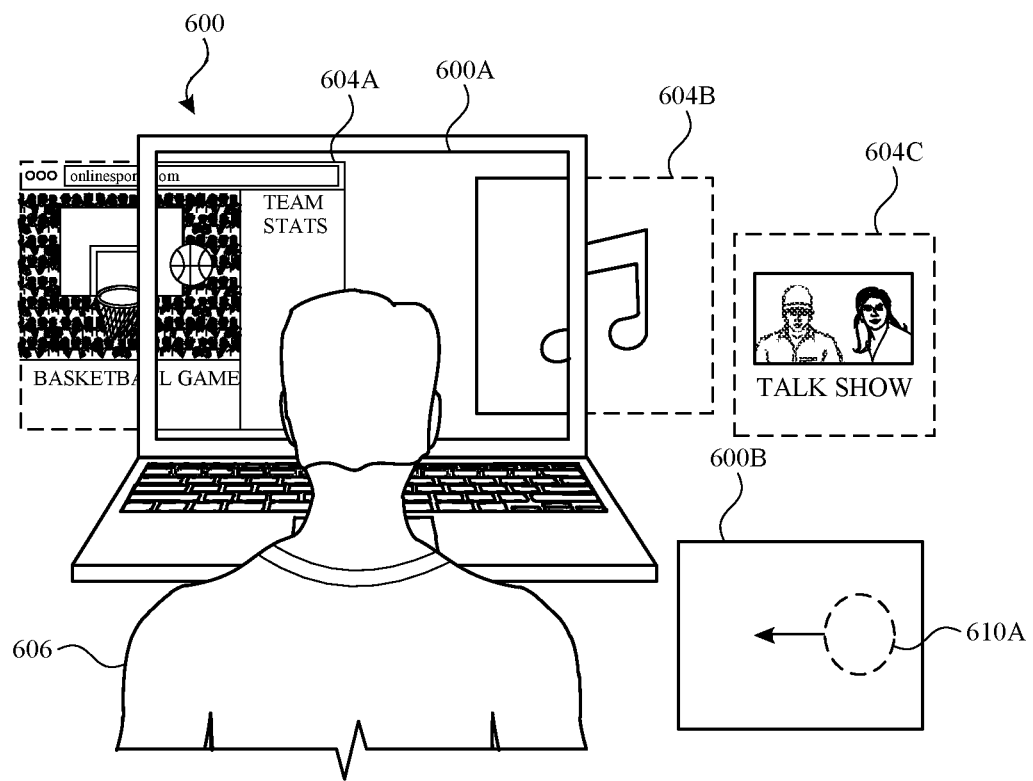
Figure 6B:
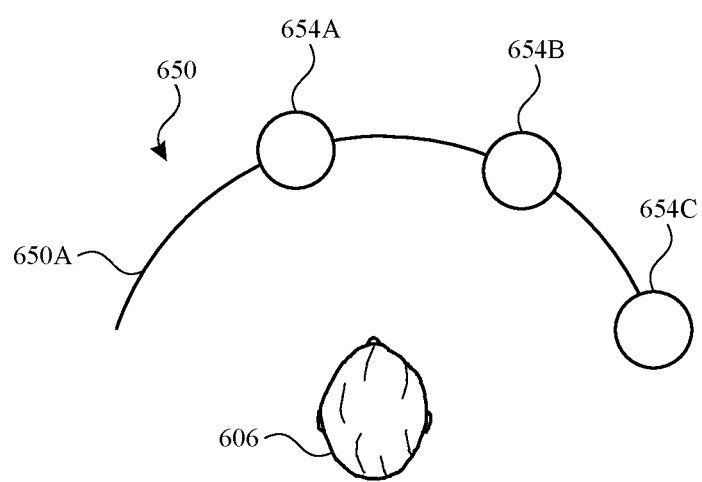
Figure 6C:
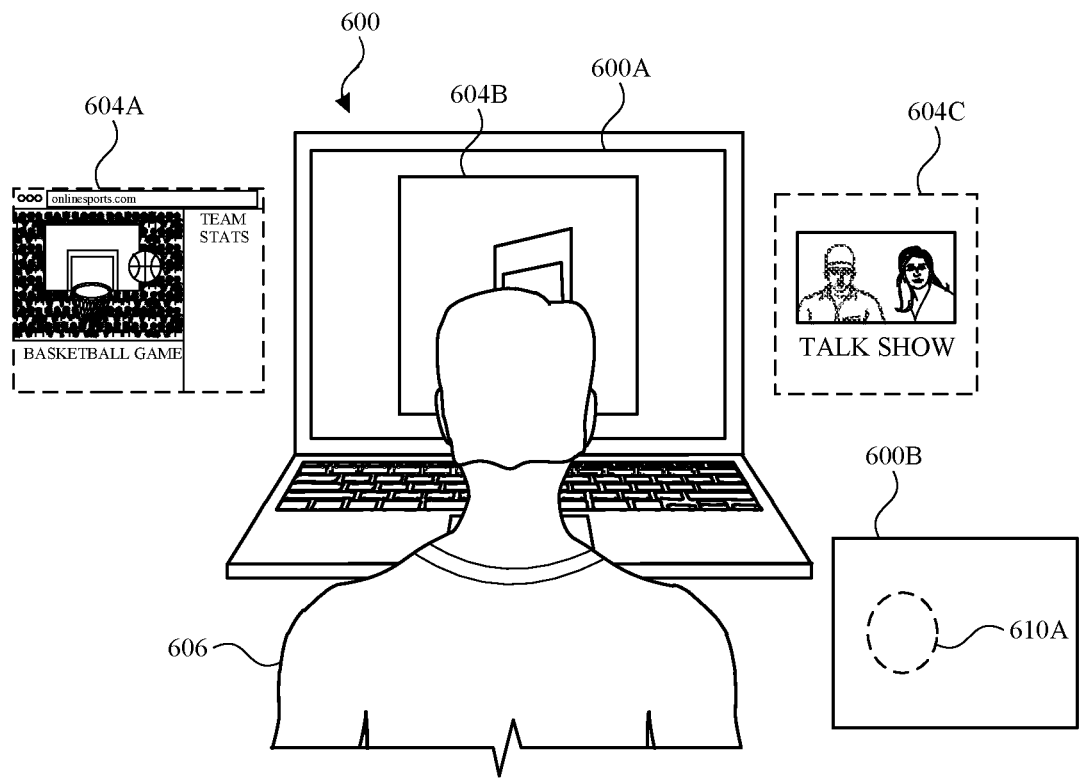
Figure 6C:
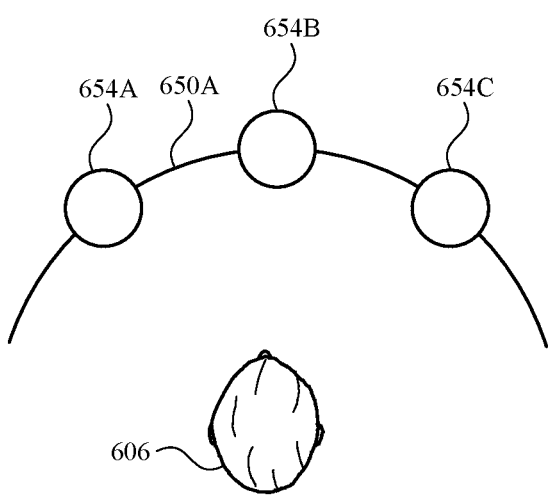
Figure 6D:
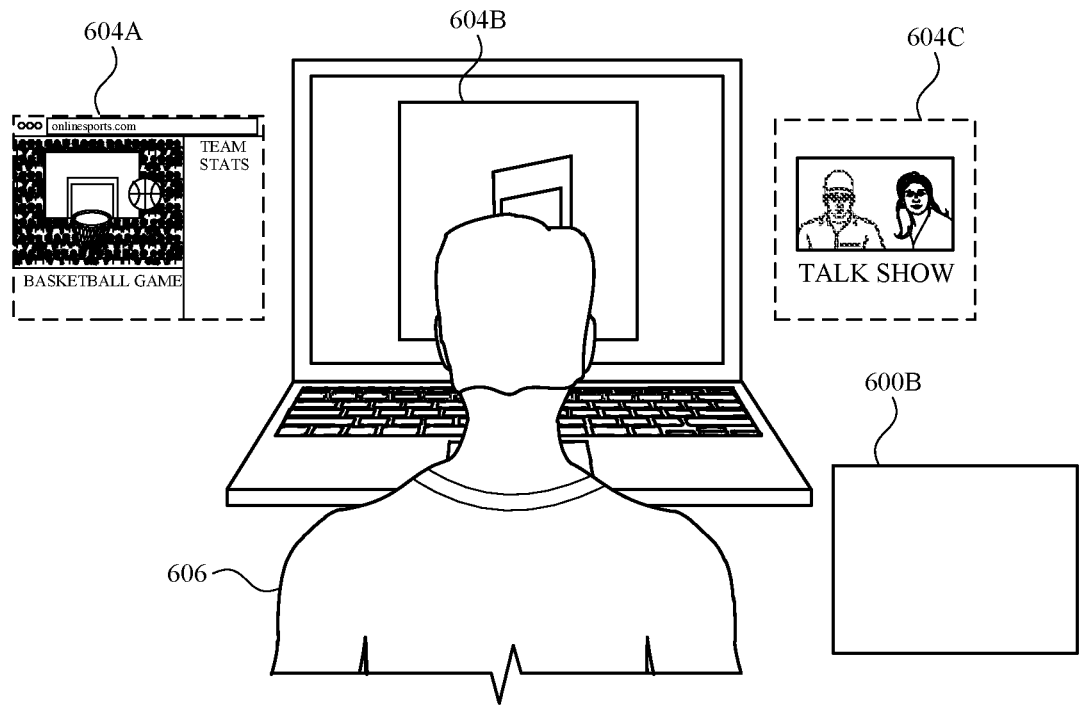
Figure 6D:
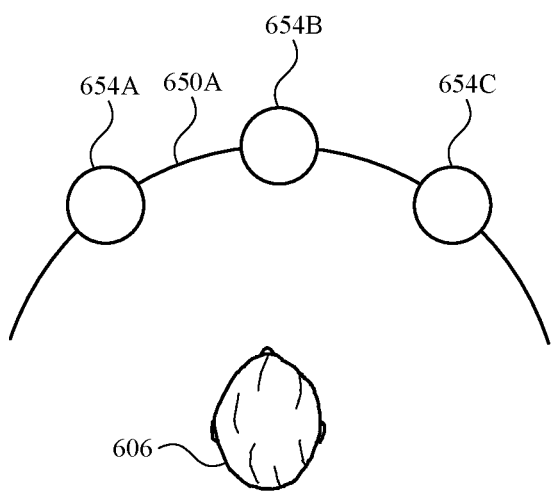
Figure 6E:
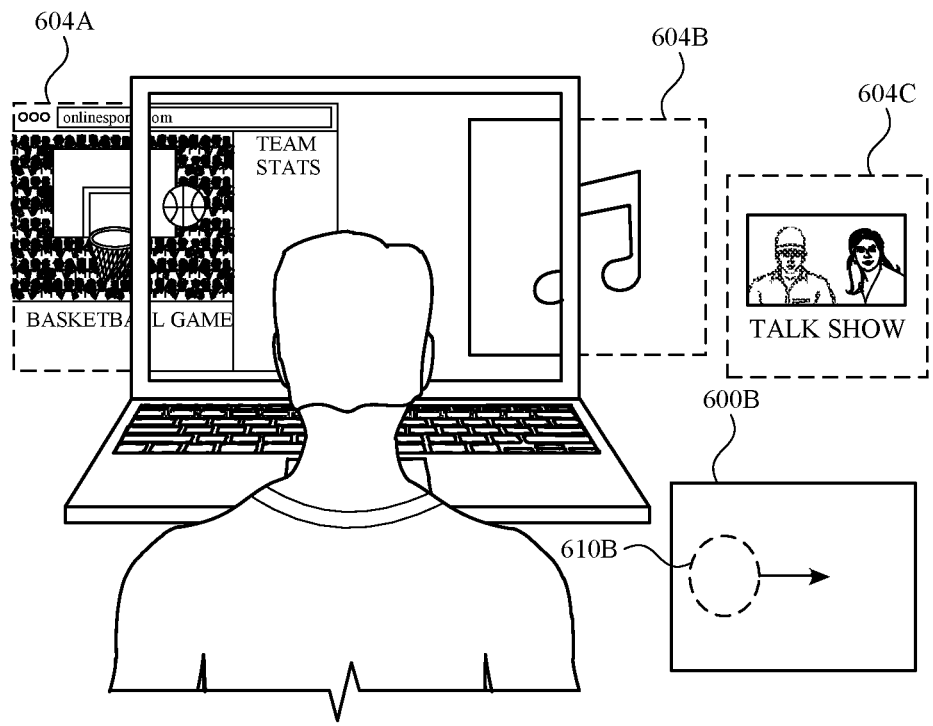
Figure 6E:
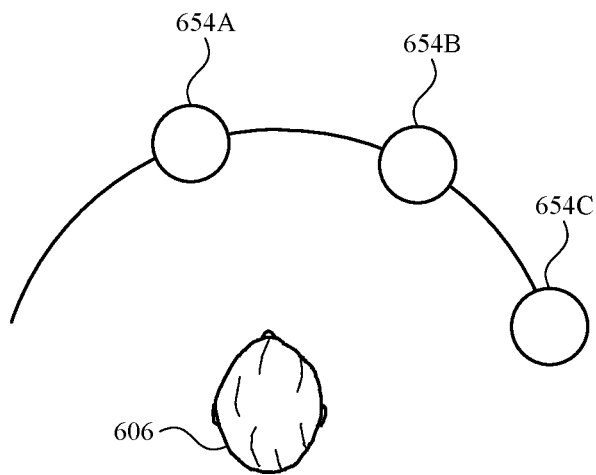
Figure 6F:
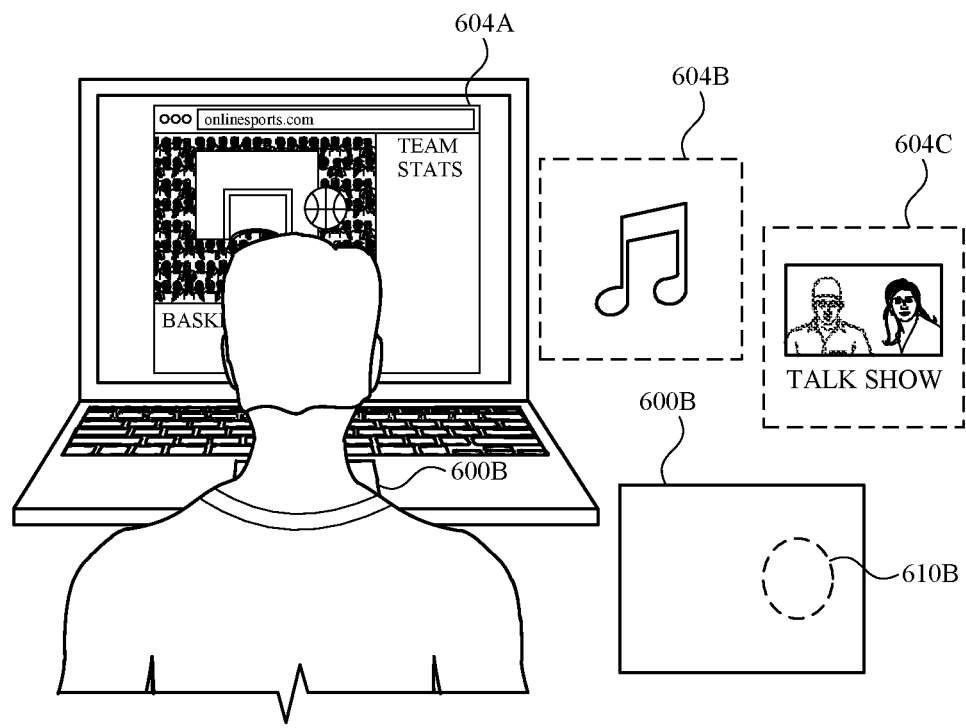
Figure 6F:
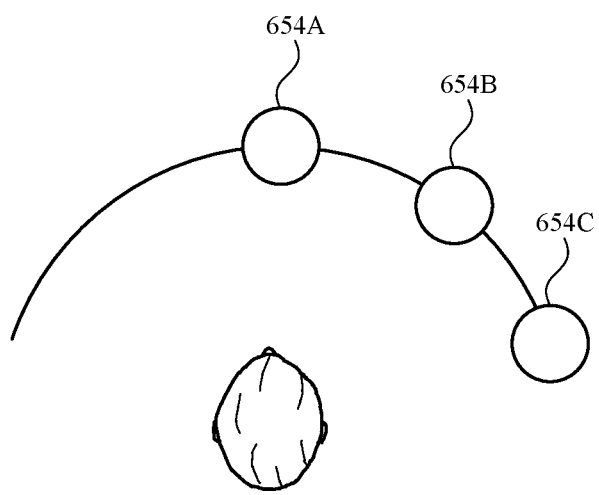
Figure 6G:
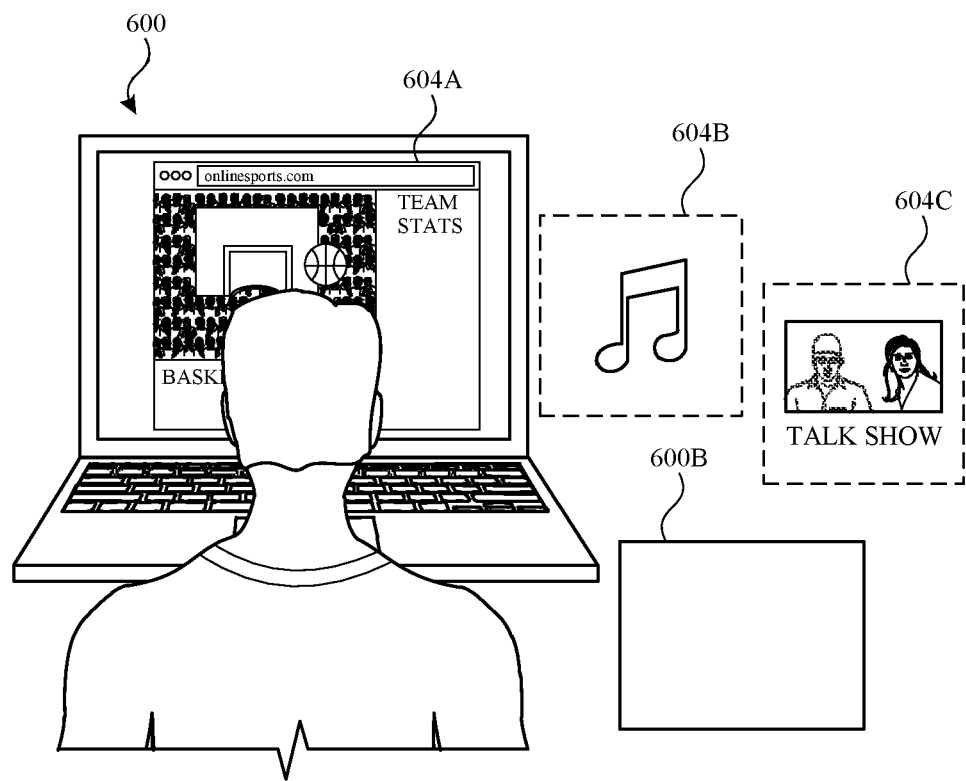
Figure 6G:
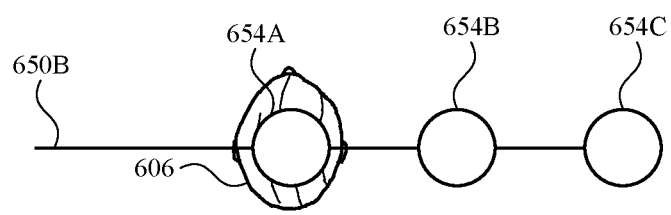
Figure 6H:
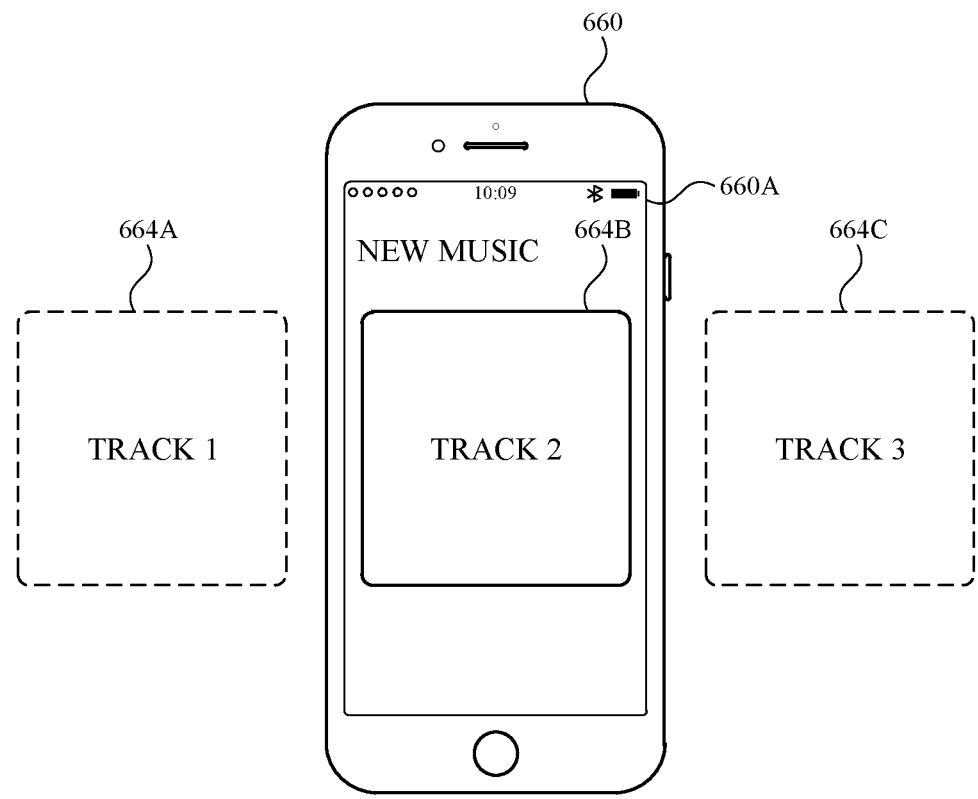
Figure 6H:
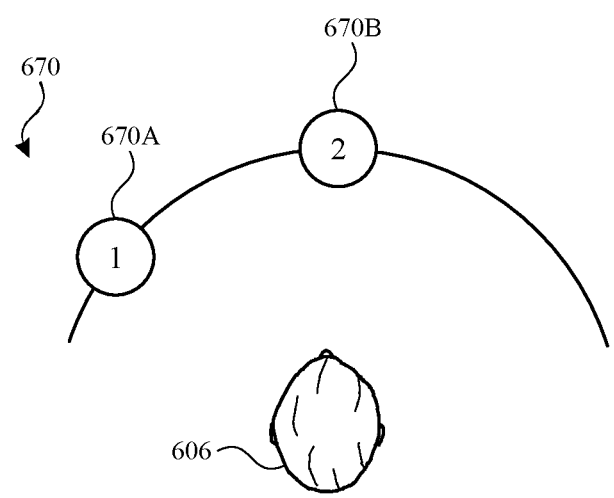
Figure 6I:
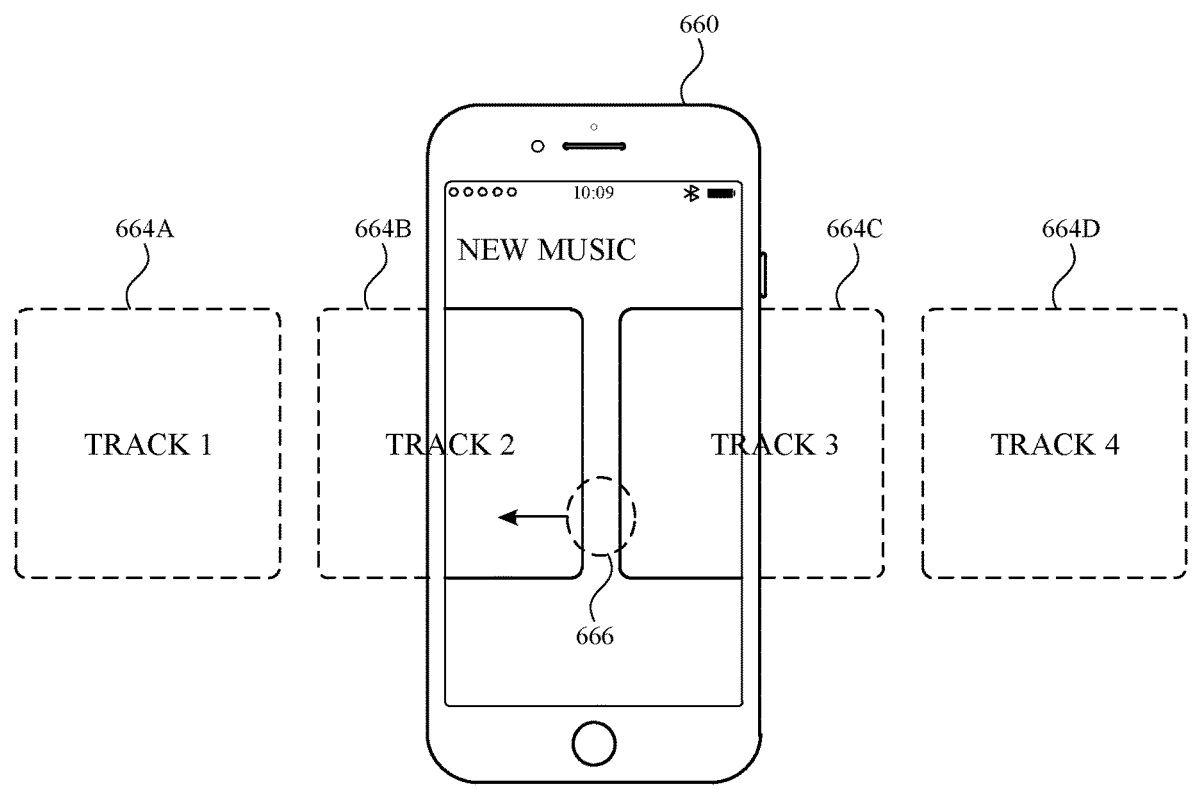
Figure 6I:
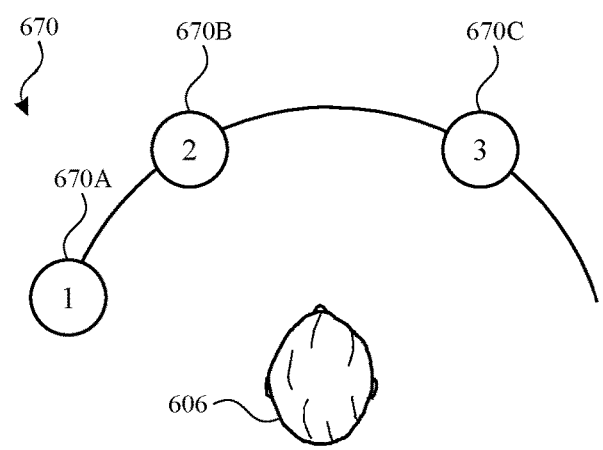
Figure 6J:
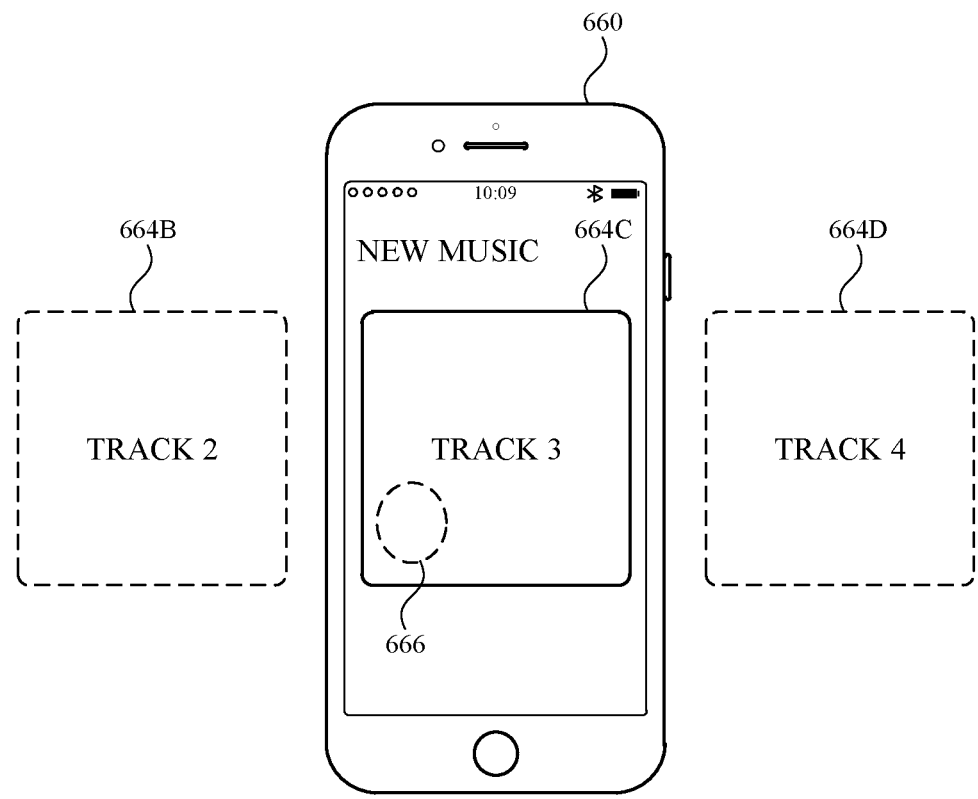
Figure 6J:
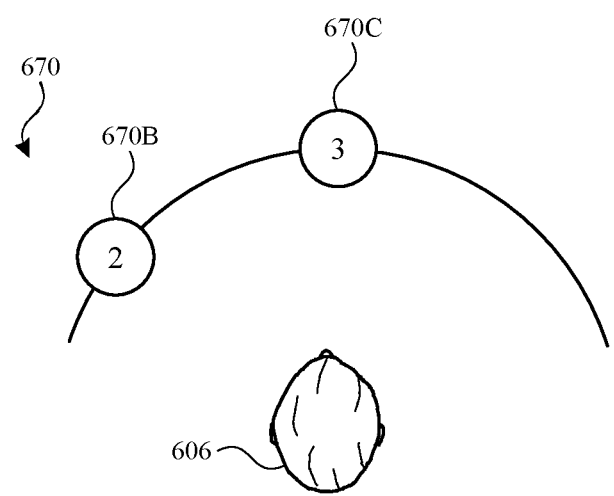
Figure 6K:
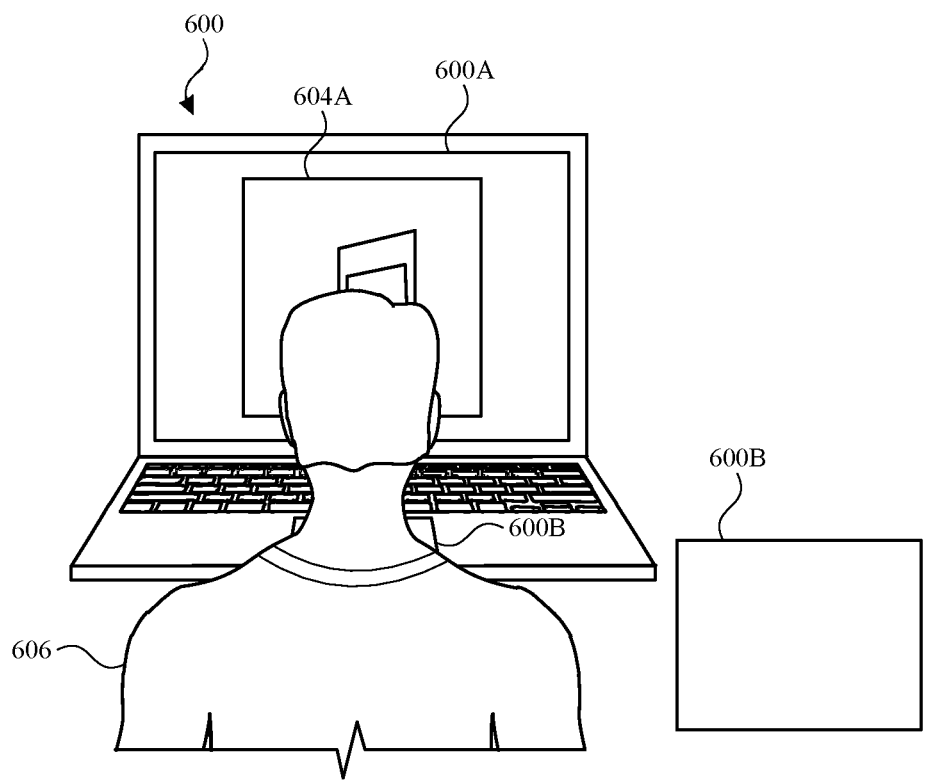
Figure 6K:
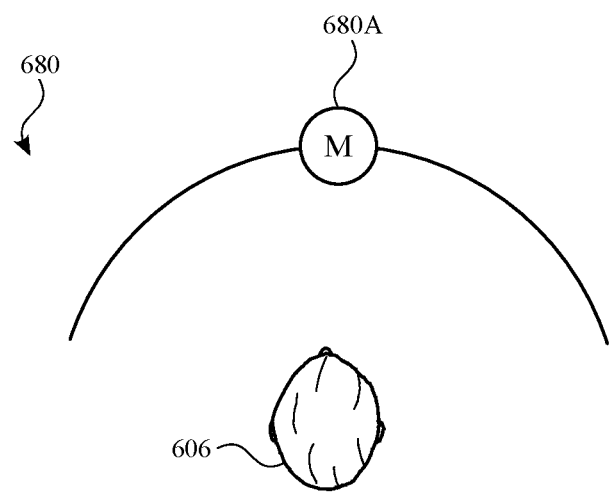
Figure 6L:
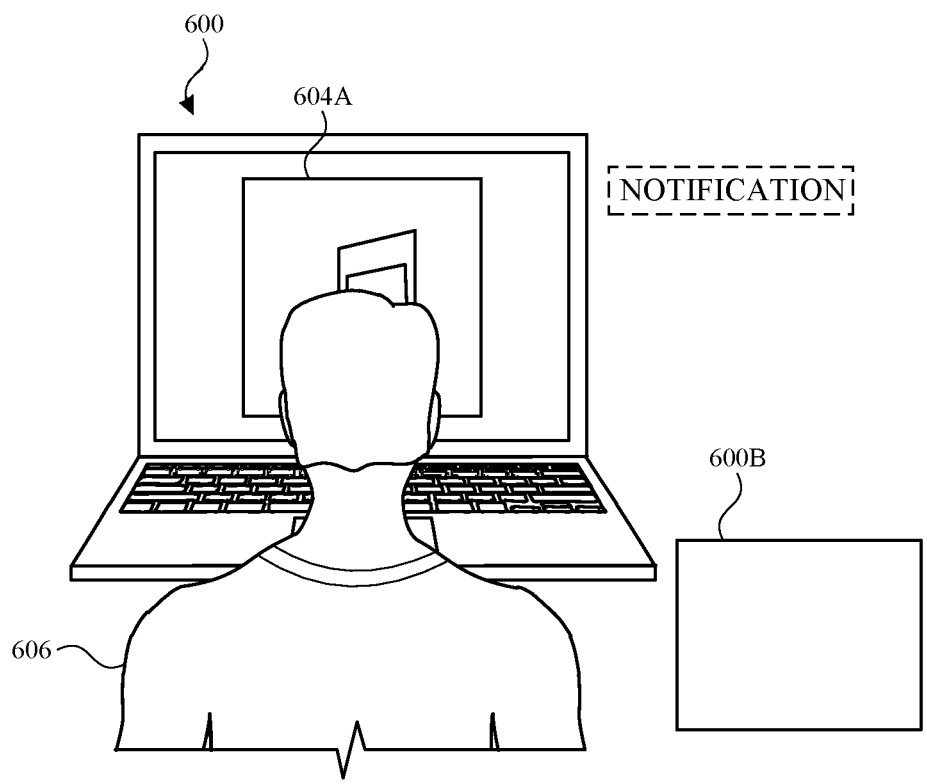
Figure 6L:
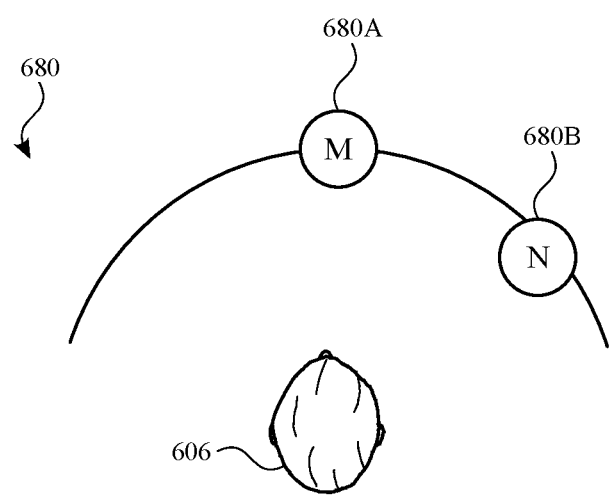
Figure 6M:
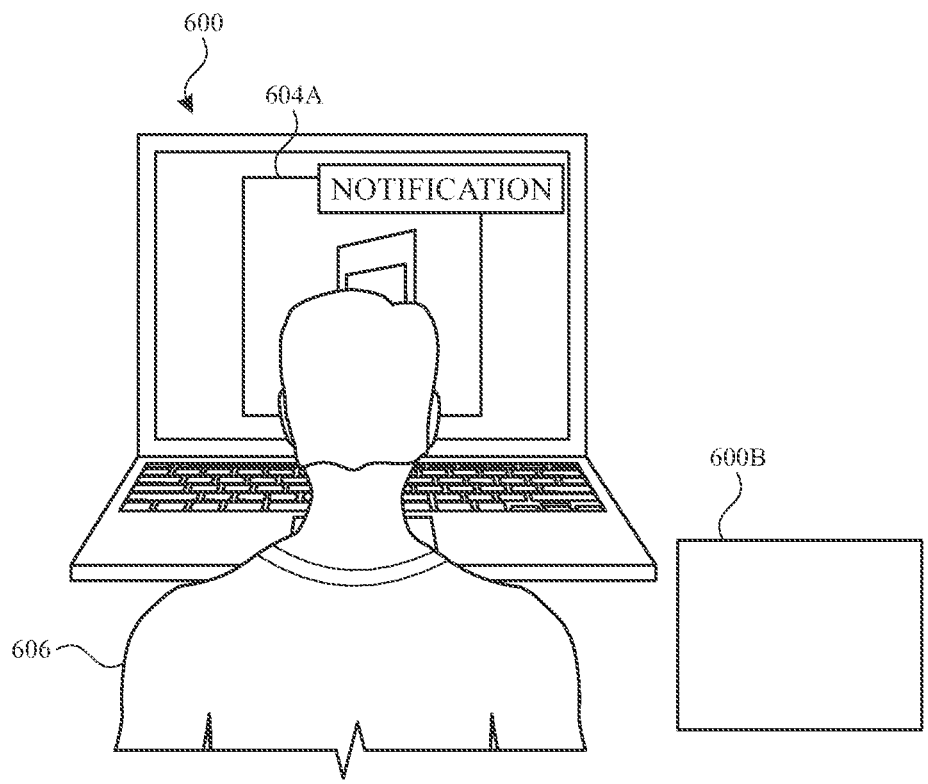
Figure 6M:
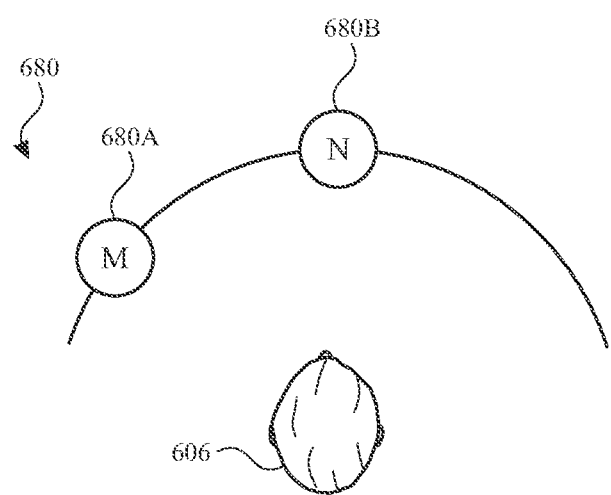
Figure 6N:
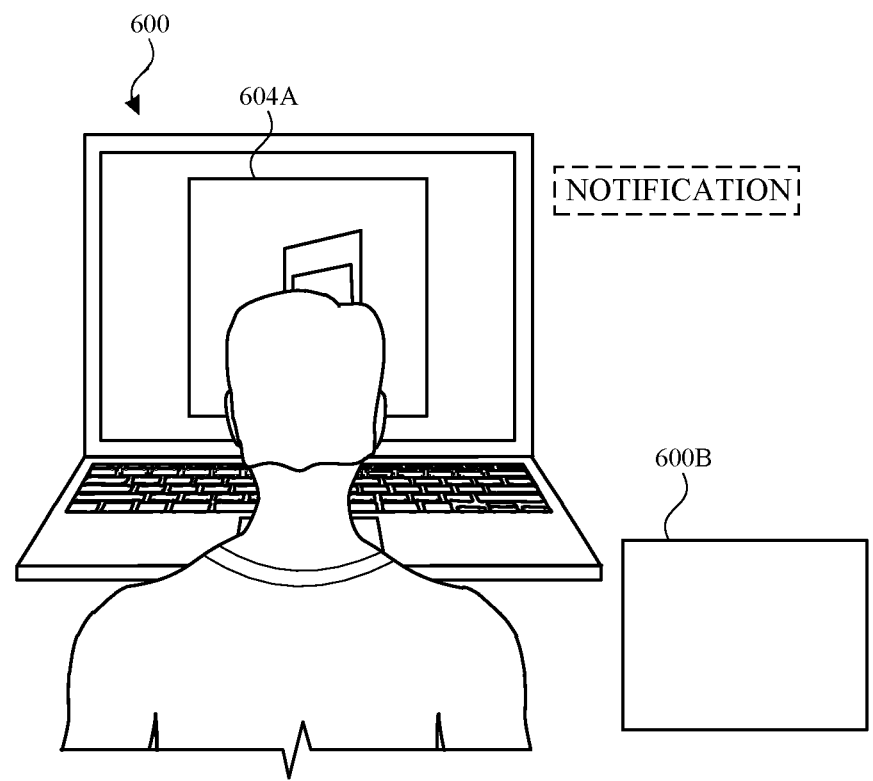
Figure 6N:
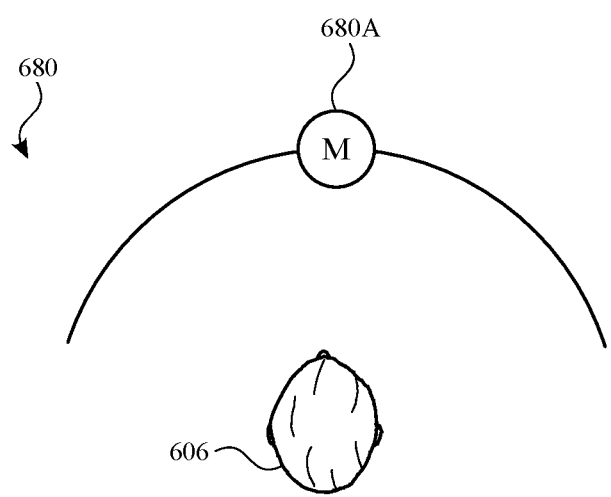
Figure 7A:
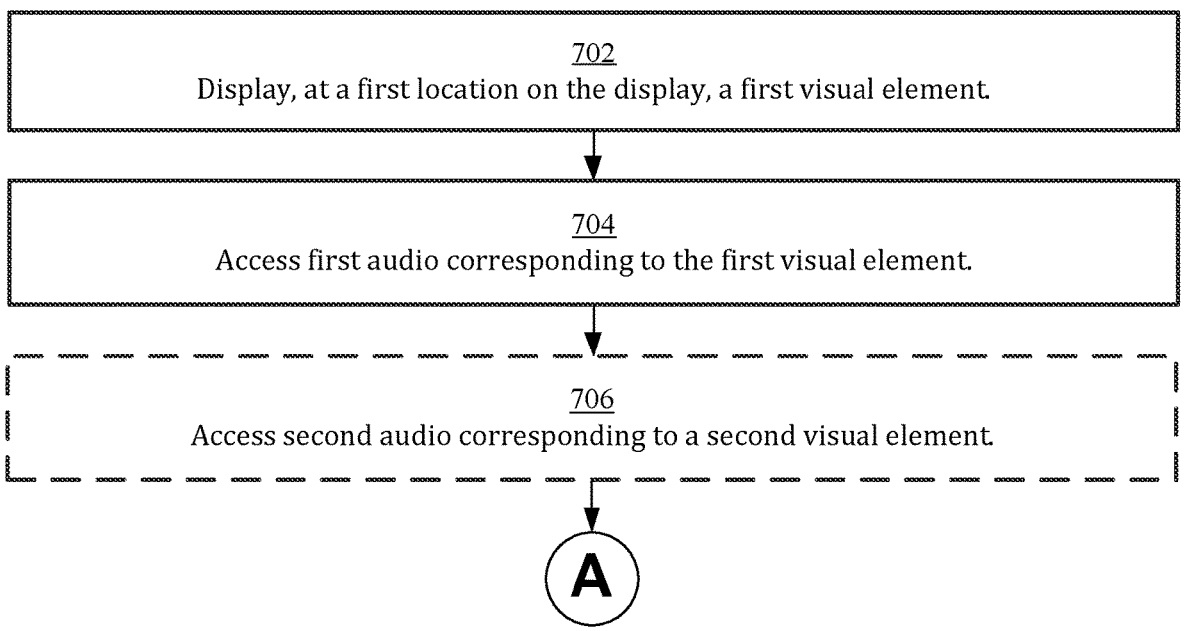
Figure 7C:
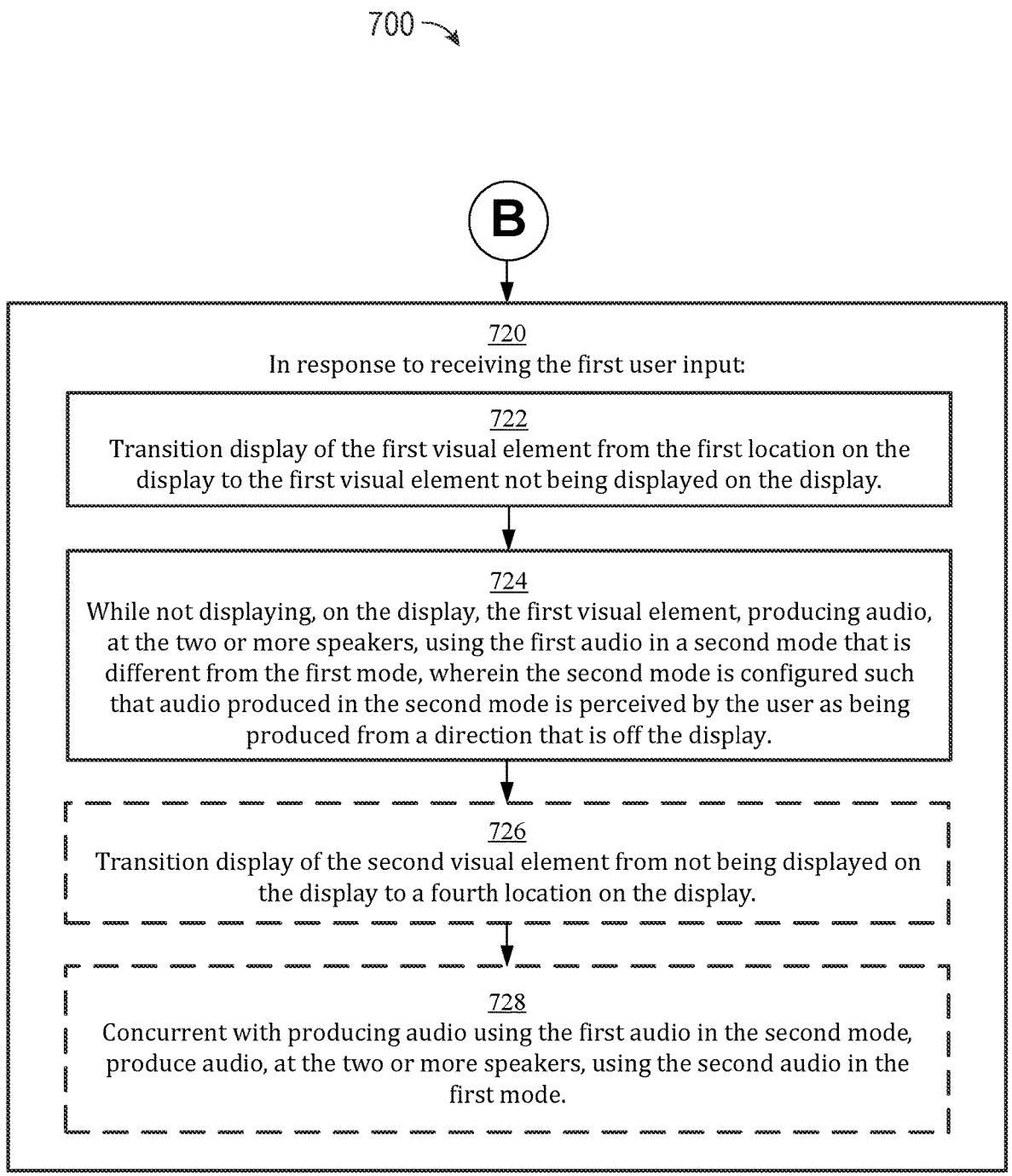

FIGS. 6A-6N illustrate exemplary techniques for transitioning between visual elements, in accordance with some embodiments. FIGS. 7A-7C is a flow diagram illustrating a method for transitioning between visual elements using an electronic device in accordance with some embodiments. The user interfaces in FIGS. 6A-6N are used to illustrate the processes described below, including the processes in FIGS. 7A-7C.

FIGS. 8A-8K illustrate exemplary techniques for previewing audio, in accordance with some embodiments. FIGS. 9A-9C is a flow diagram illustrating a method for previewing audio using an electronic device in accordance with some embodiments. The user interfaces in FIGS. 8A-8K are used to illustrate the processes described below, including the processes in FIGS. 9A-9C.

FIGS. 10A-10K illustrate exemplary techniques for discovering music, in accordance with some embodiments. FIGS. 11A-11G illustrate exemplary techniques for discovering music, in accordance with some embodiments. FIGS. 12A-12B is a flow diagram illustrating a method for discovering music using an electronic device in accordance with some embodiments. The user interfaces in FIGS. 10A-10K and 11A-11G are used to illustrate the processes described below, including the processes in FIGS. 12A-12B.

Figure 13A:
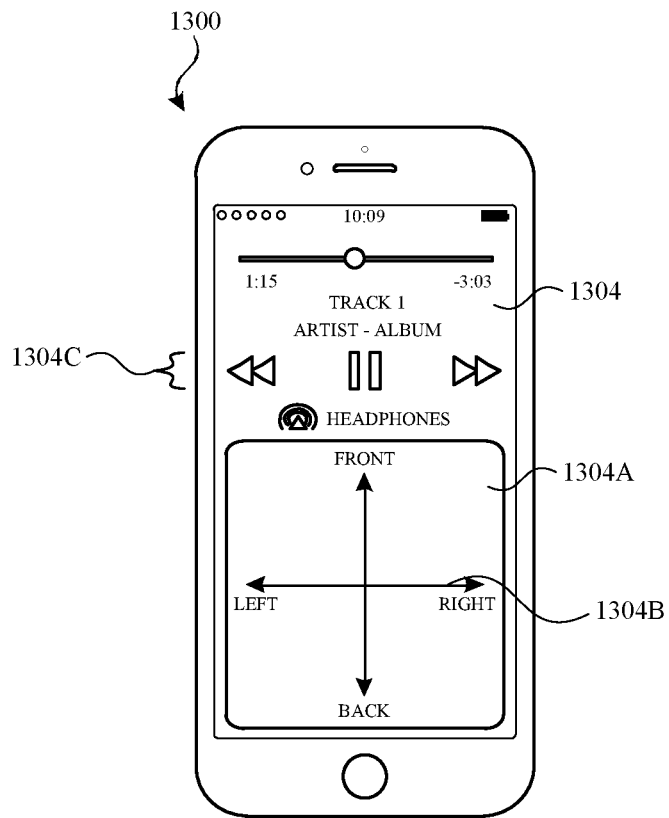
FIGS. 13A-13F illustrate exemplary techniques for managing headphone transparency, in accordance with some embodiments.
Figure 13A:
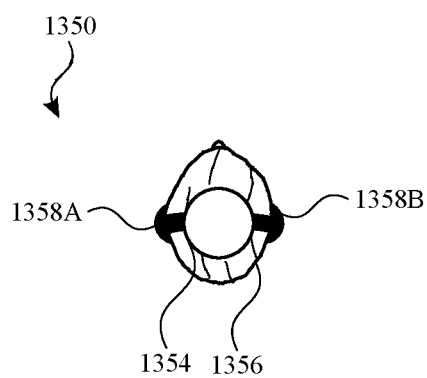
Figure 13B:
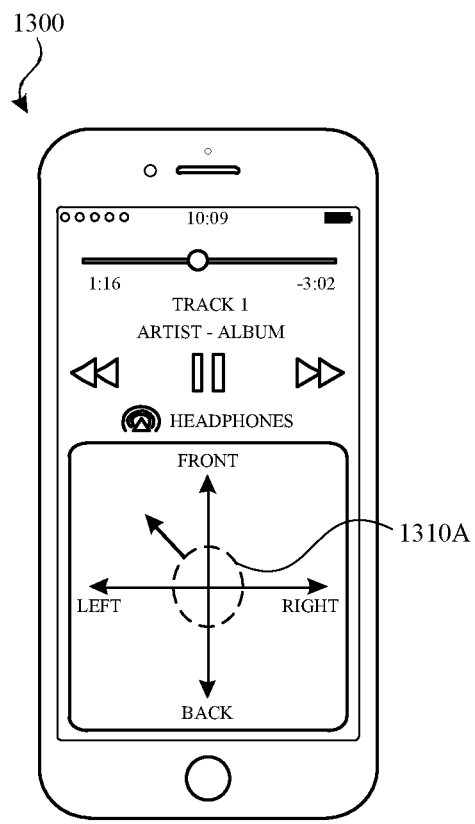
Figure 13B:
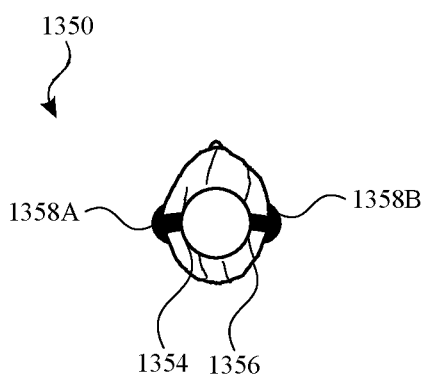
Figure 13C:
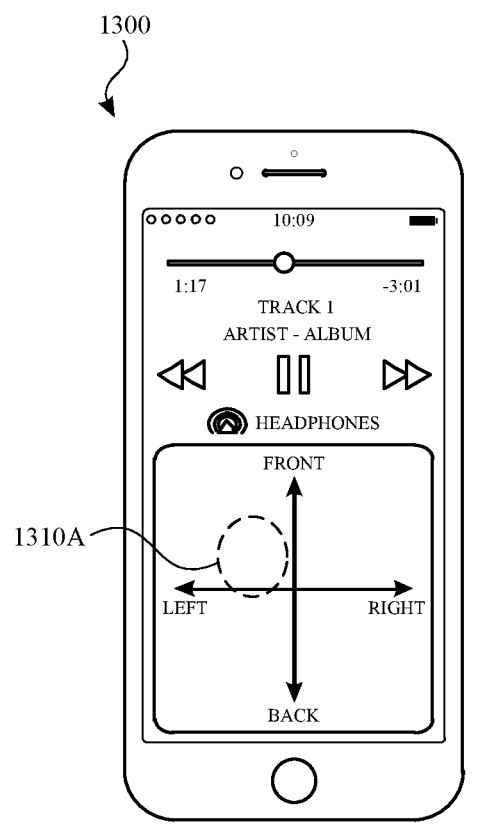
Figure 13C:
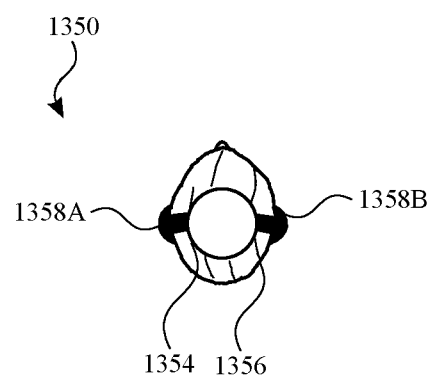

FIGS. 13A-13F illustrate exemplary techniques for managing headphone transparency, in accordance with some embodiments. FIGS. 14A-14B is a flow diagram illustrating a method for managing headphone transparency using an electronic device in accordance with some embodiments. The user interfaces in FIGS. 13A-13F are used to illustrate the processes described below, including the processes in FIGS. 14A-14B.

FIGS. 13G-13M illustrate exemplary techniques for manipulating multiple audio streams of an audio source, in accordance with some embodiments. FIG. 15 is a flow diagram illustrating a method for manipulating multiple audio streams of an audio source using an electronic device in accordance with some embodiments. The user interfaces in FIGS. 13G-13M are used to illustrate the processes described below, including the processes in FIG. 15.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
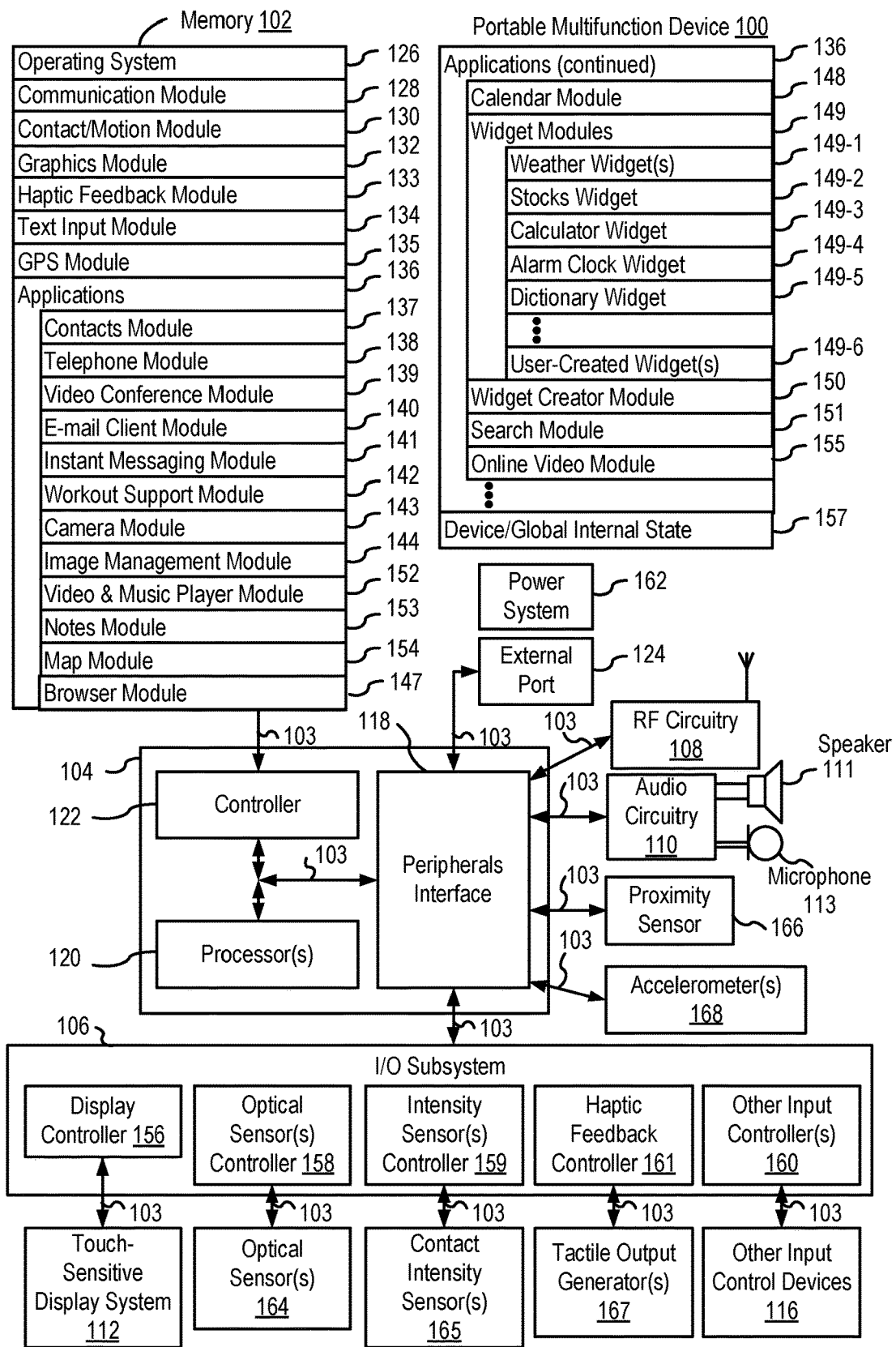
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that is, in some circumstances, otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
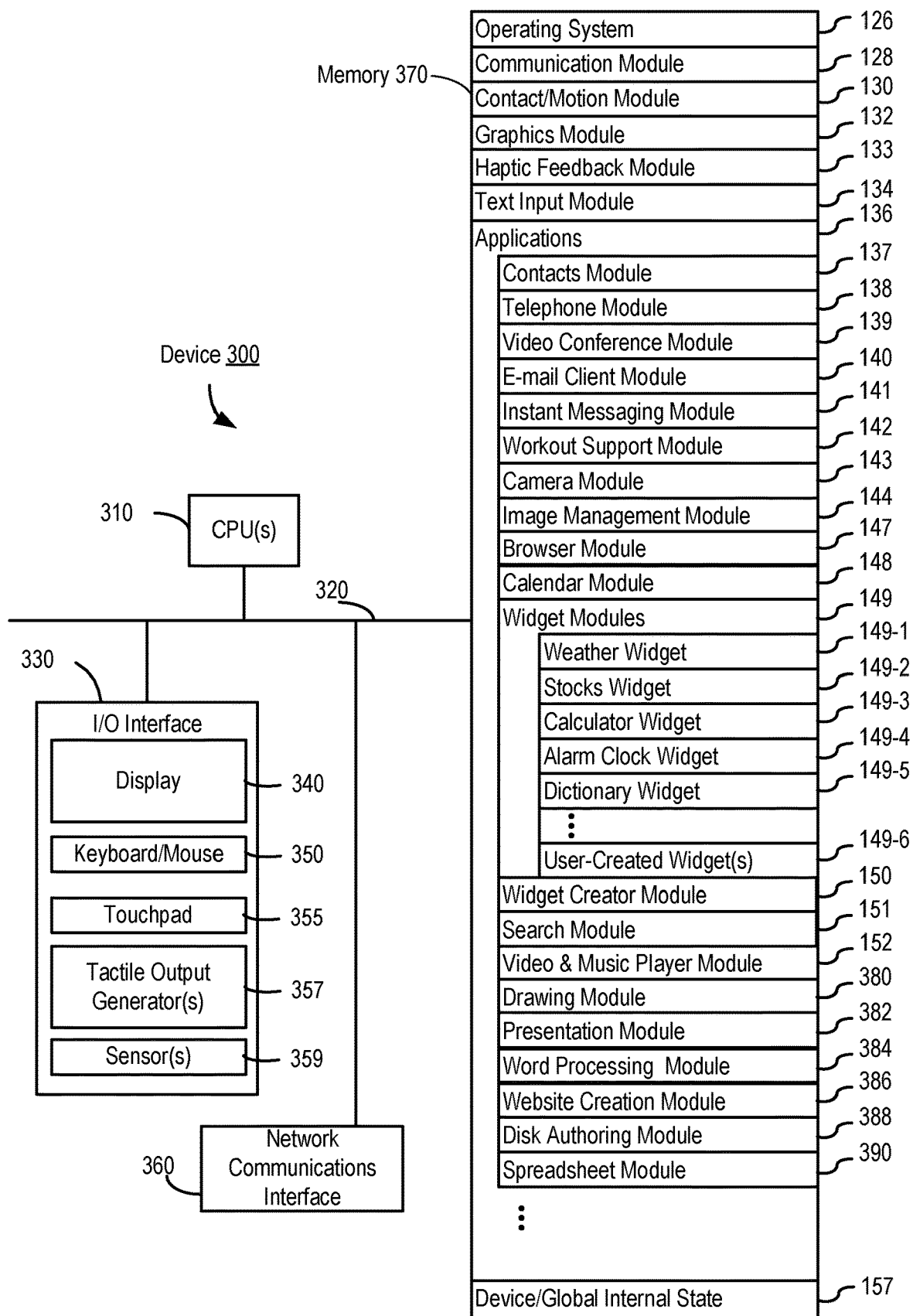
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
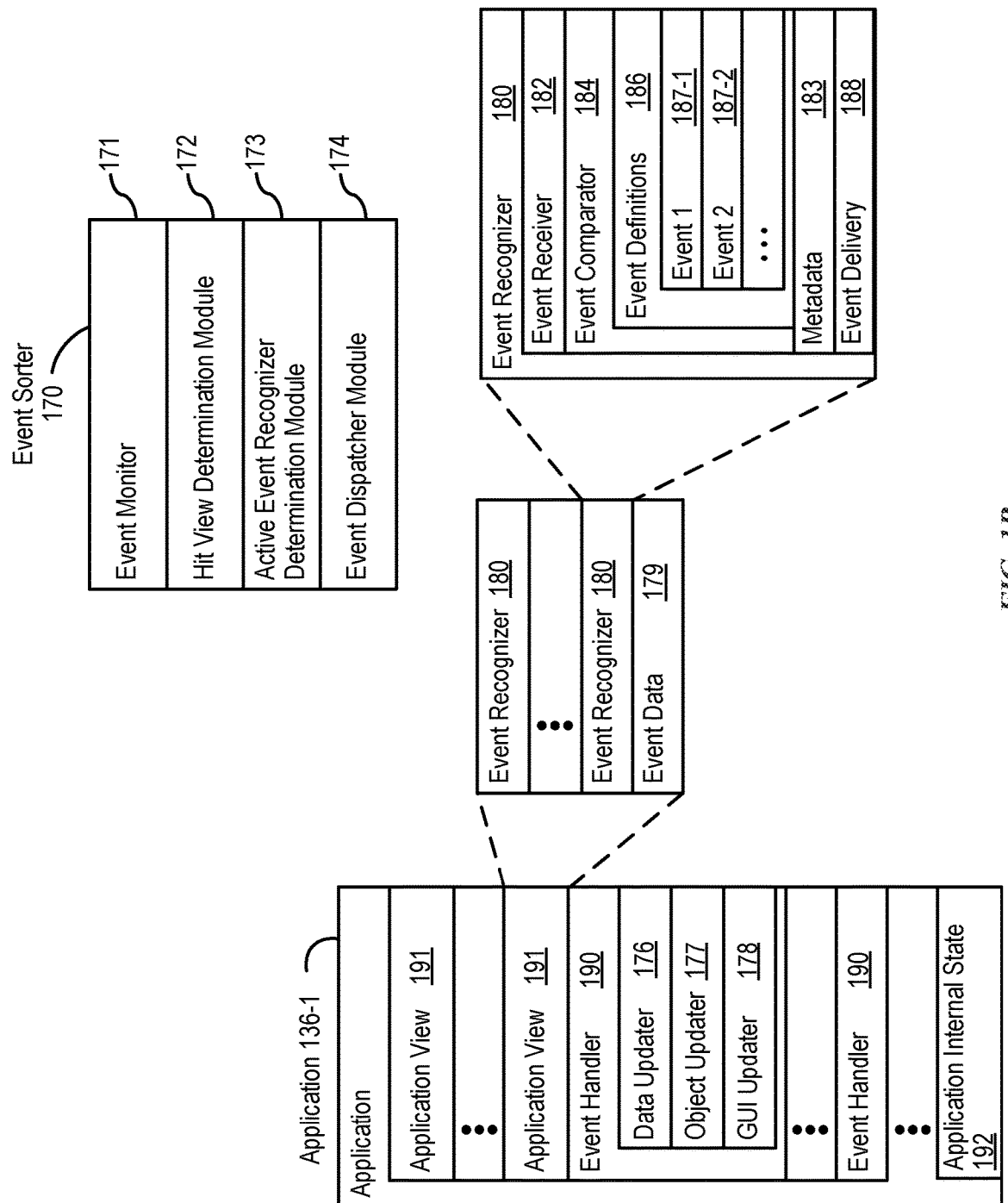
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
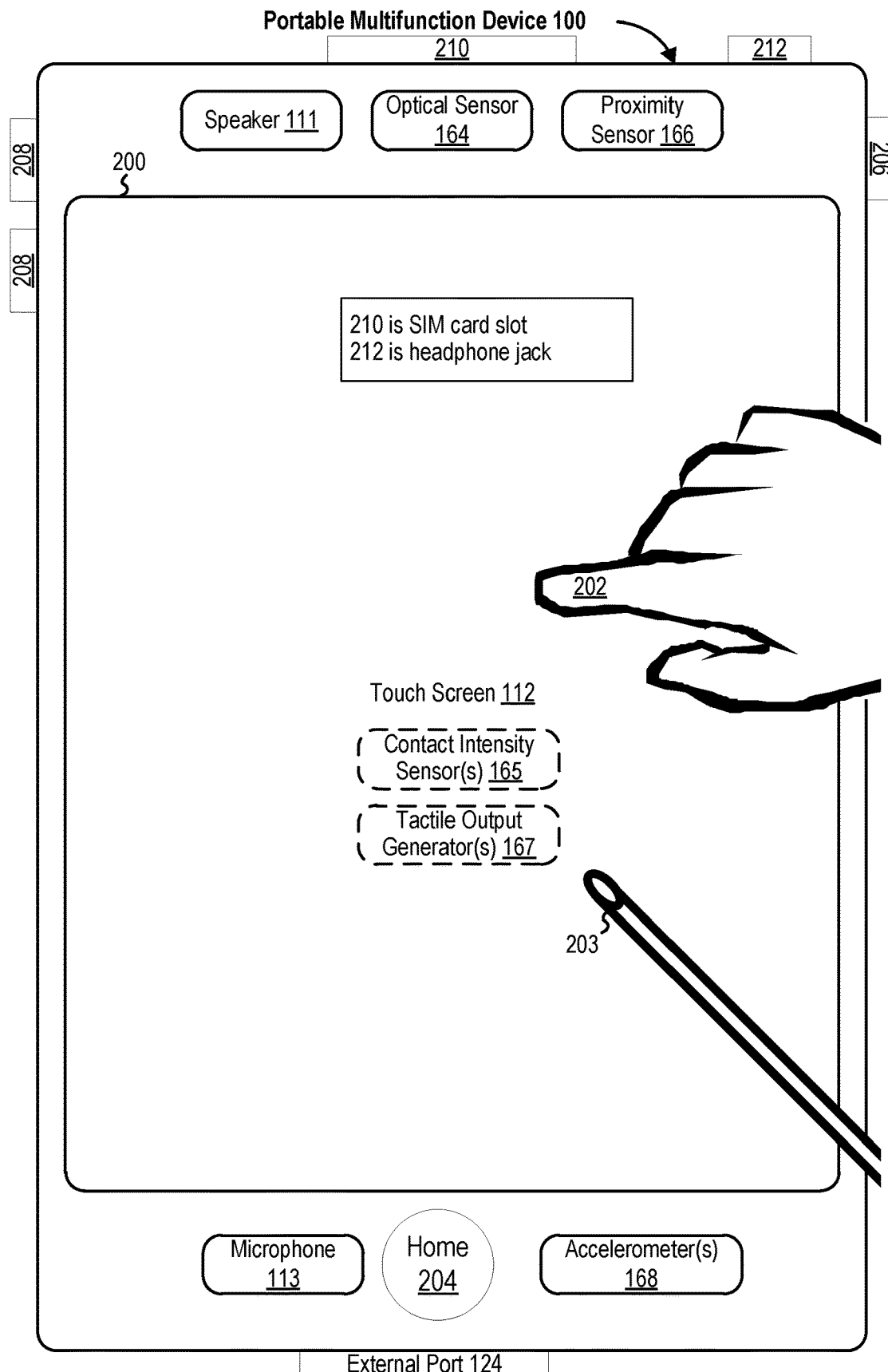
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
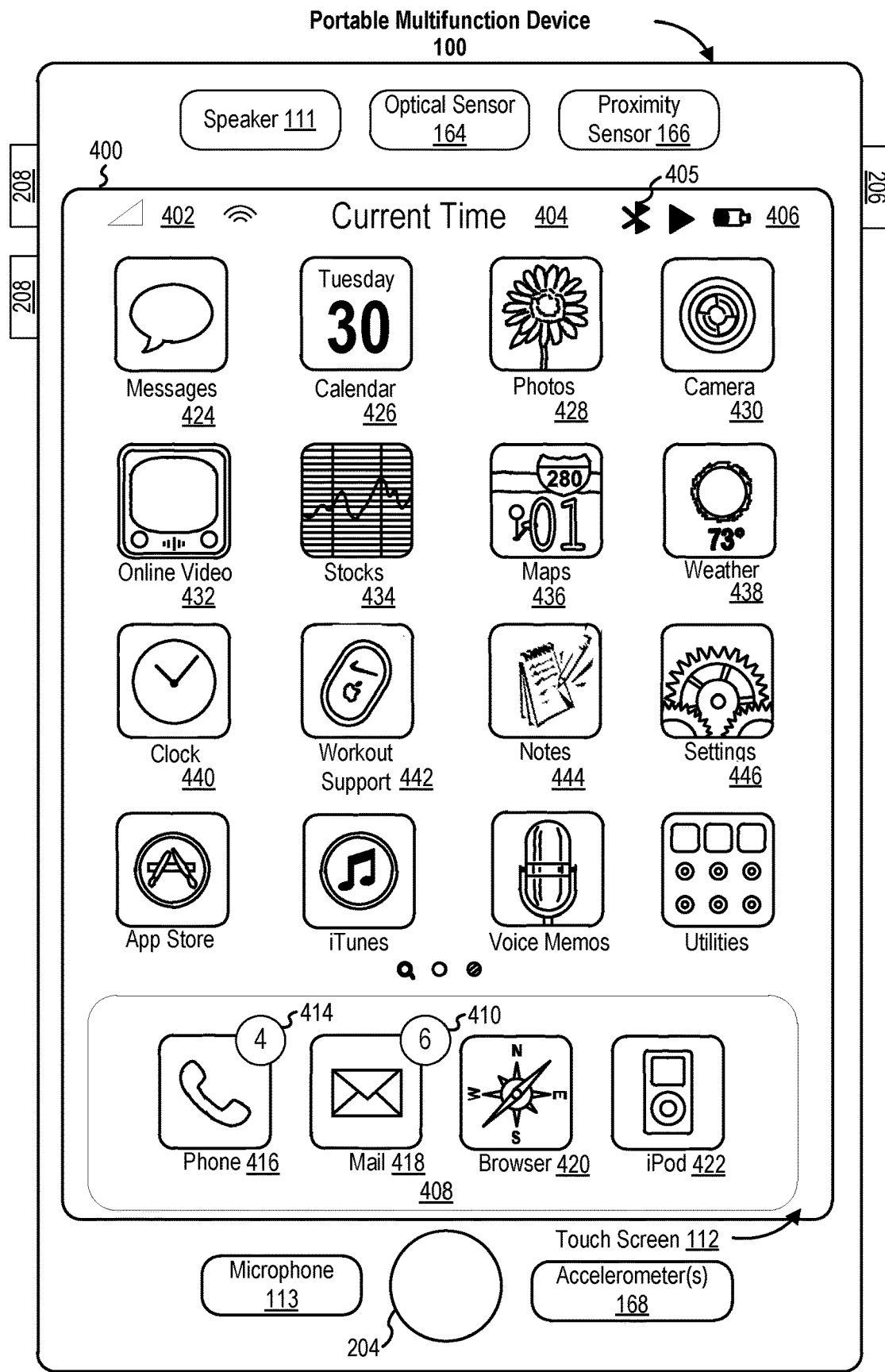
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
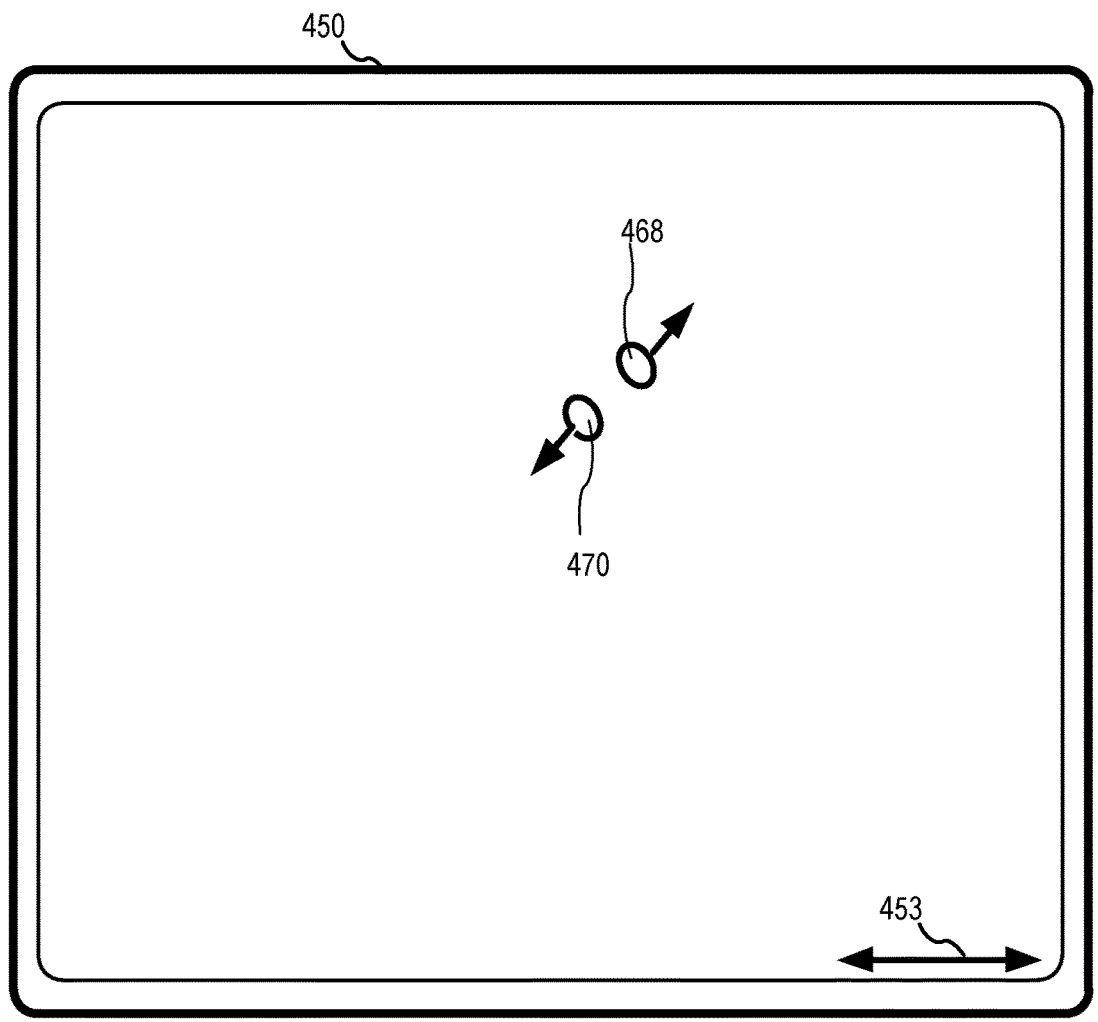
FIG. 4B illustrates an exemplary user interface for a multifunction device with a touch-sensitive surface that is separate from the display in accordance with some embodiments.
Figure 4B:
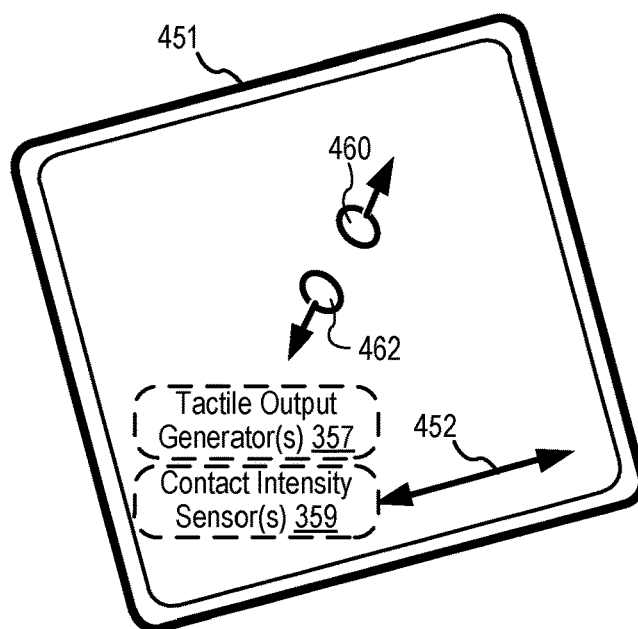

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
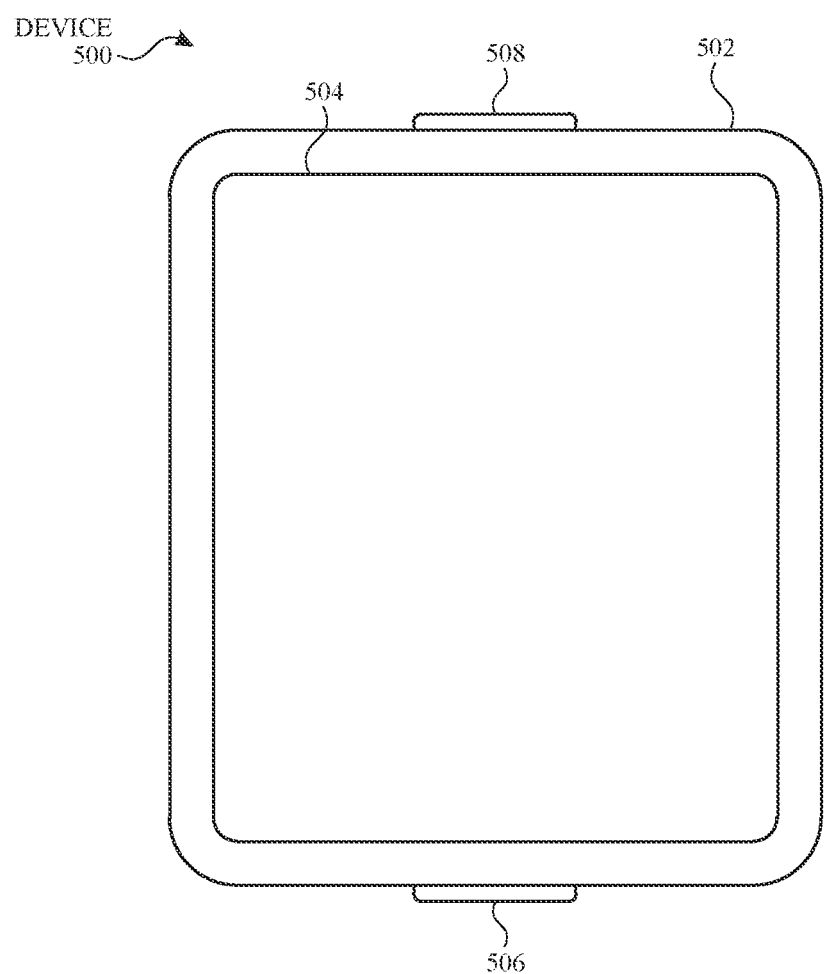
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
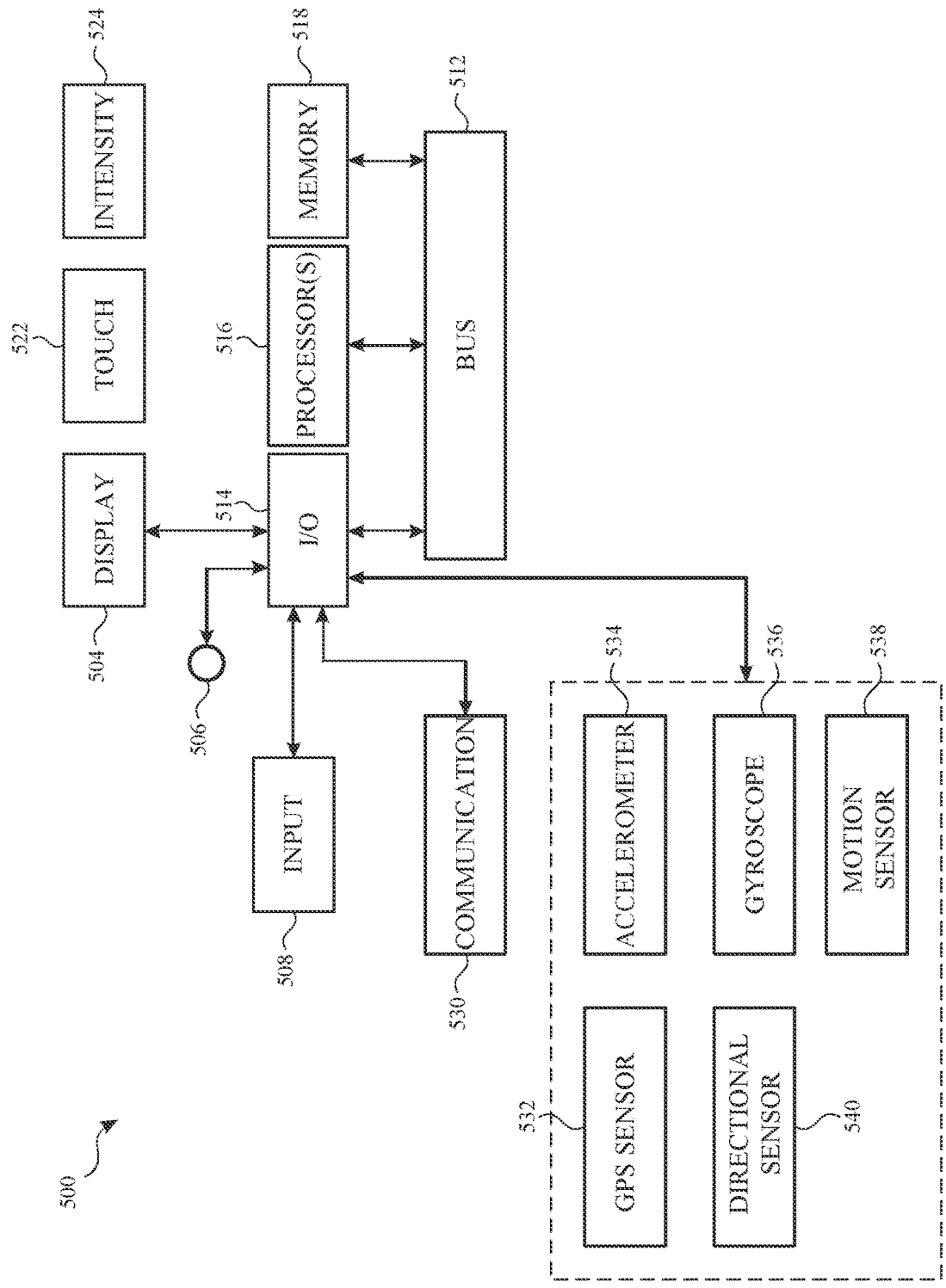
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIGS. 7A-7C), 900 (FIGS. 9A-9C), 1200 (FIGS. 12A-12B), 1400 (FIGS. 14A-14B), and 1500 (FIG. 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
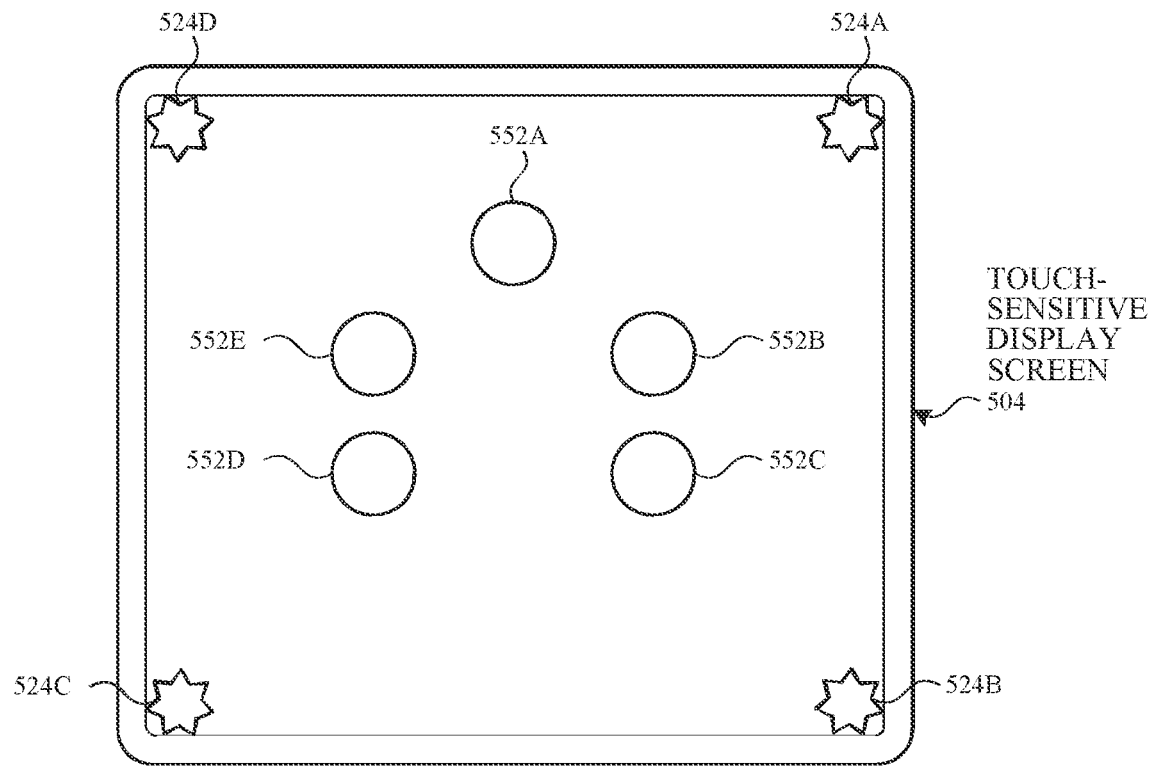
FIGS. 5C-5D illustrate exemplary components of a personal electronic device having a touch-sensitive display and intensity sensors in accordance with some embodiments.
Figure 5C:
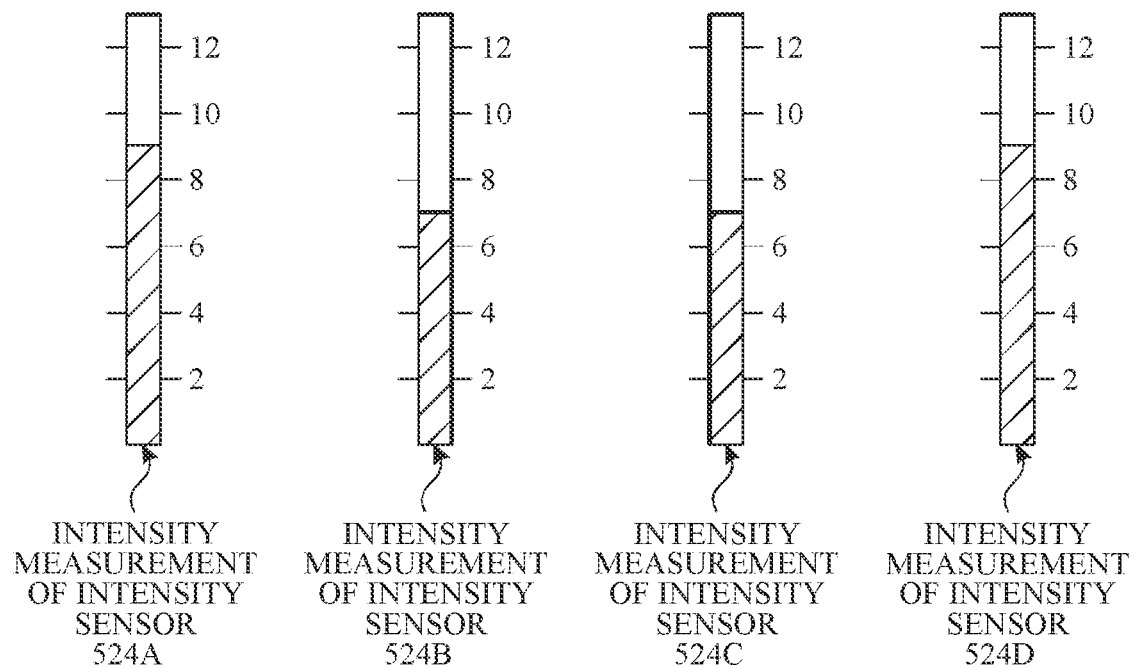
Figure 5D:
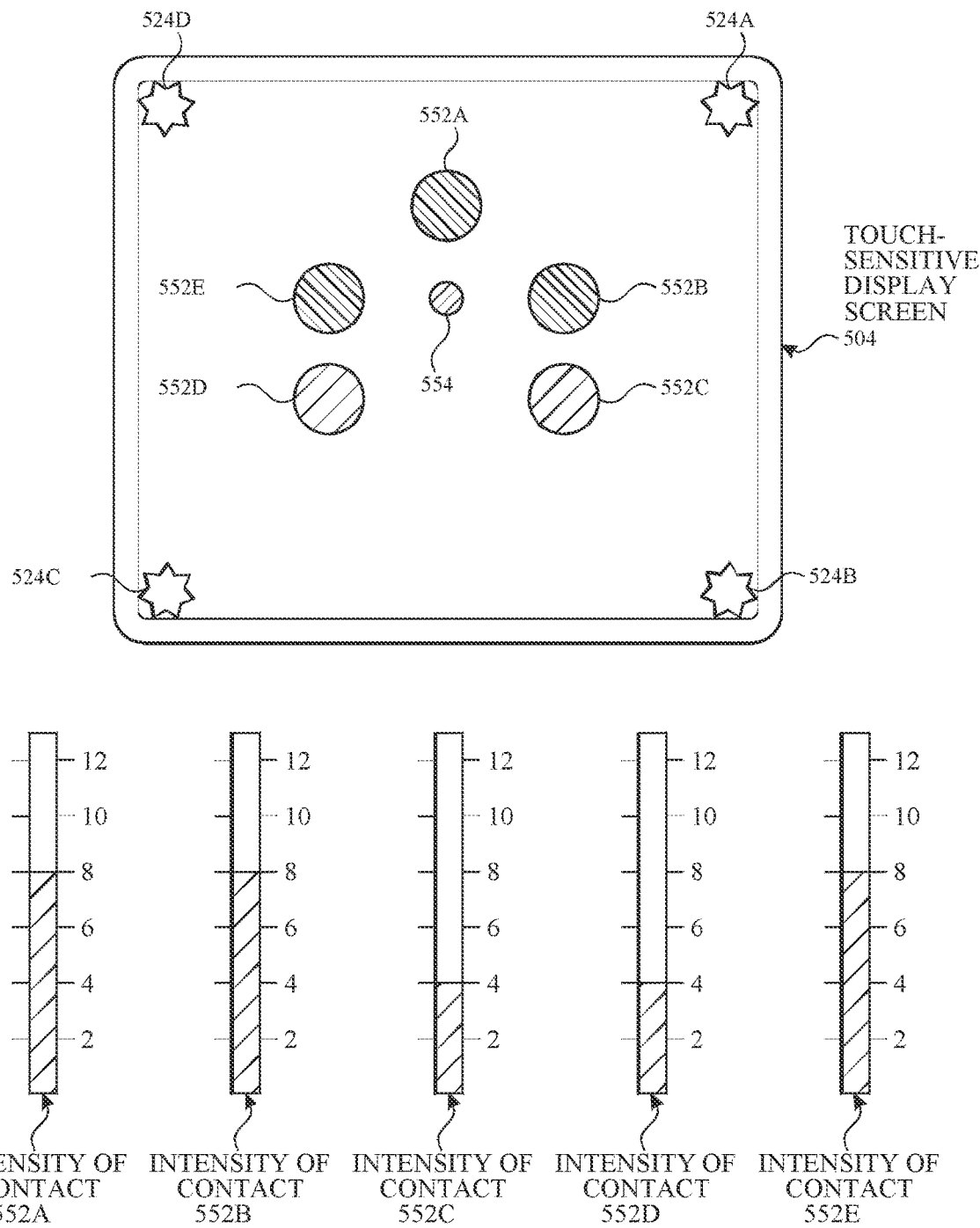

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
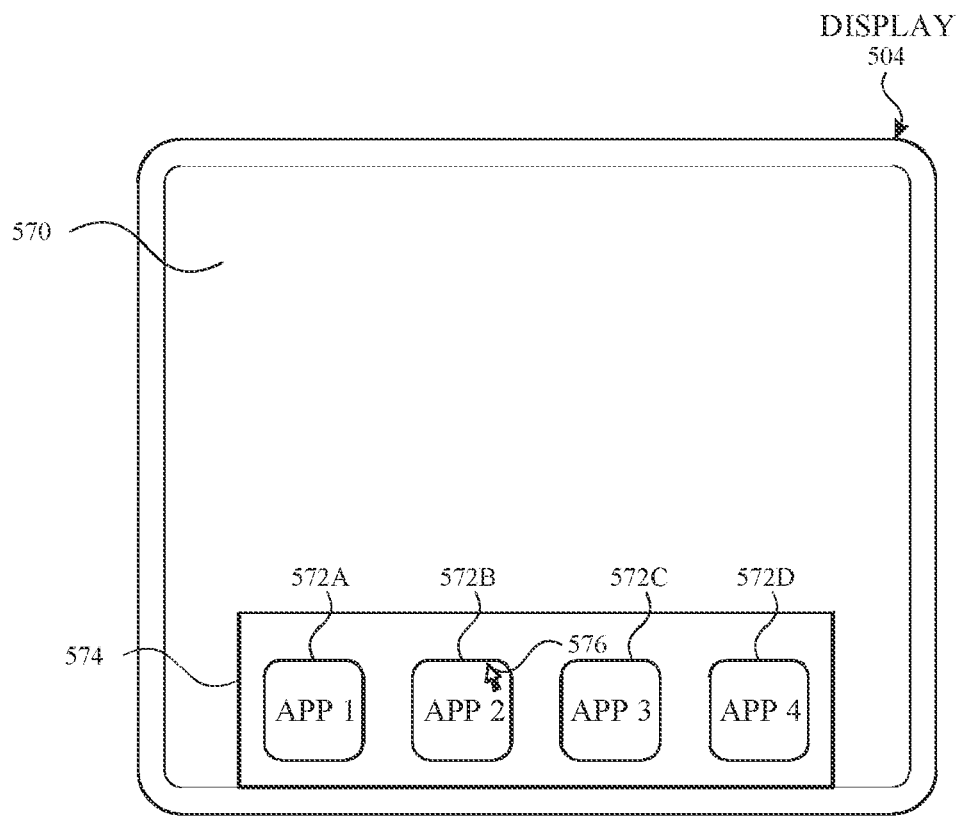
FIGS. 5E-5H illustrate exemplary components and user interfaces of a personal electronic device in accordance with some embodiments.
Figure 5E:
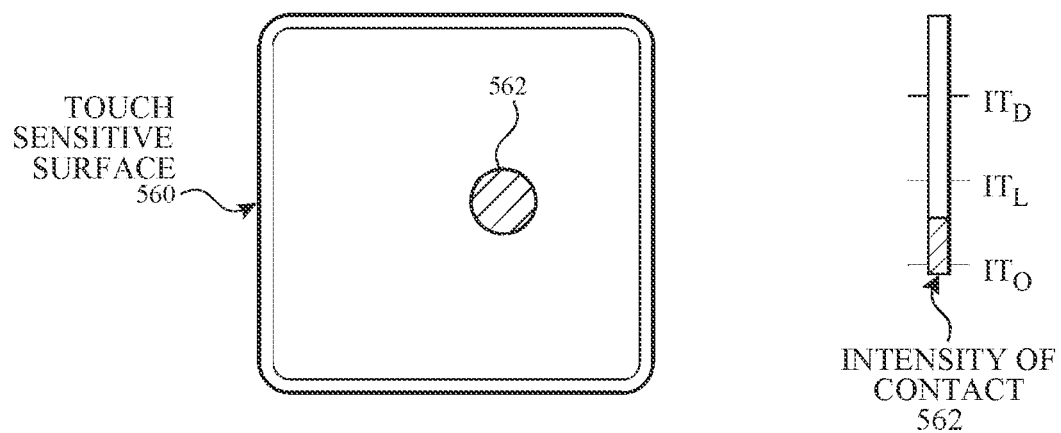
Figure 5F:
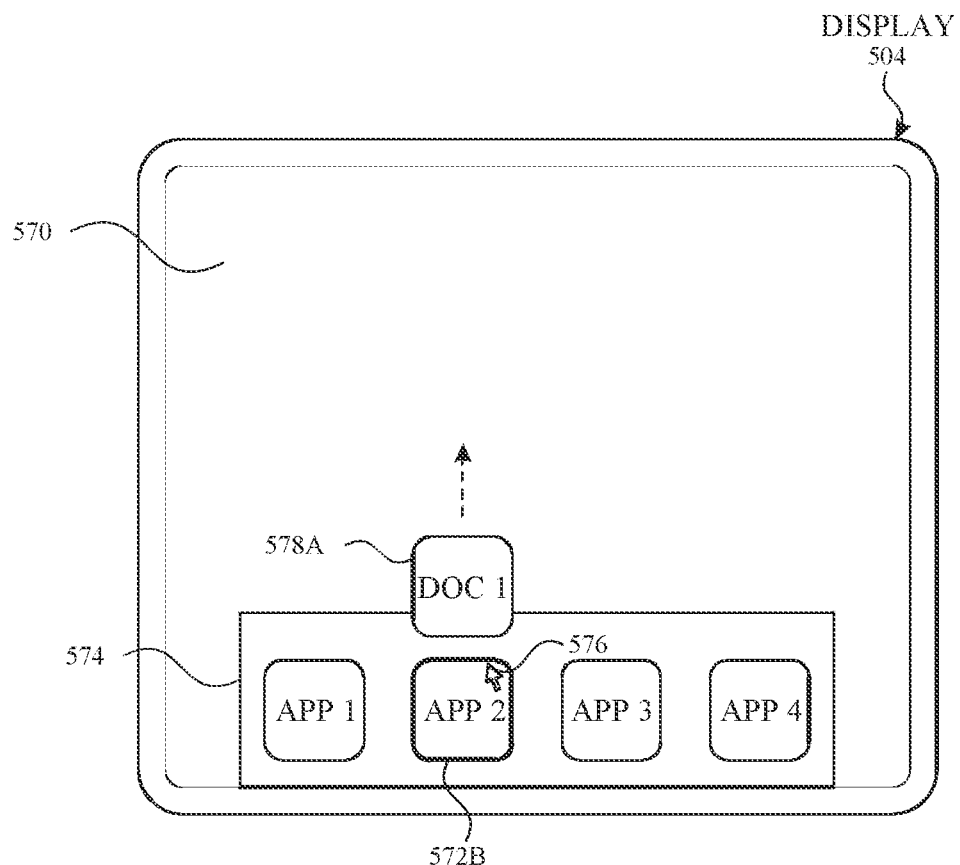
Figure 5F:
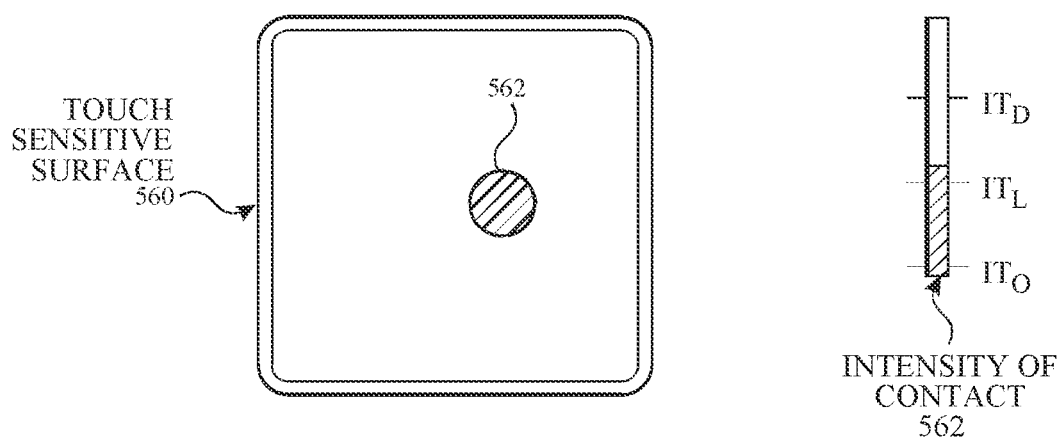
Figure 5G:
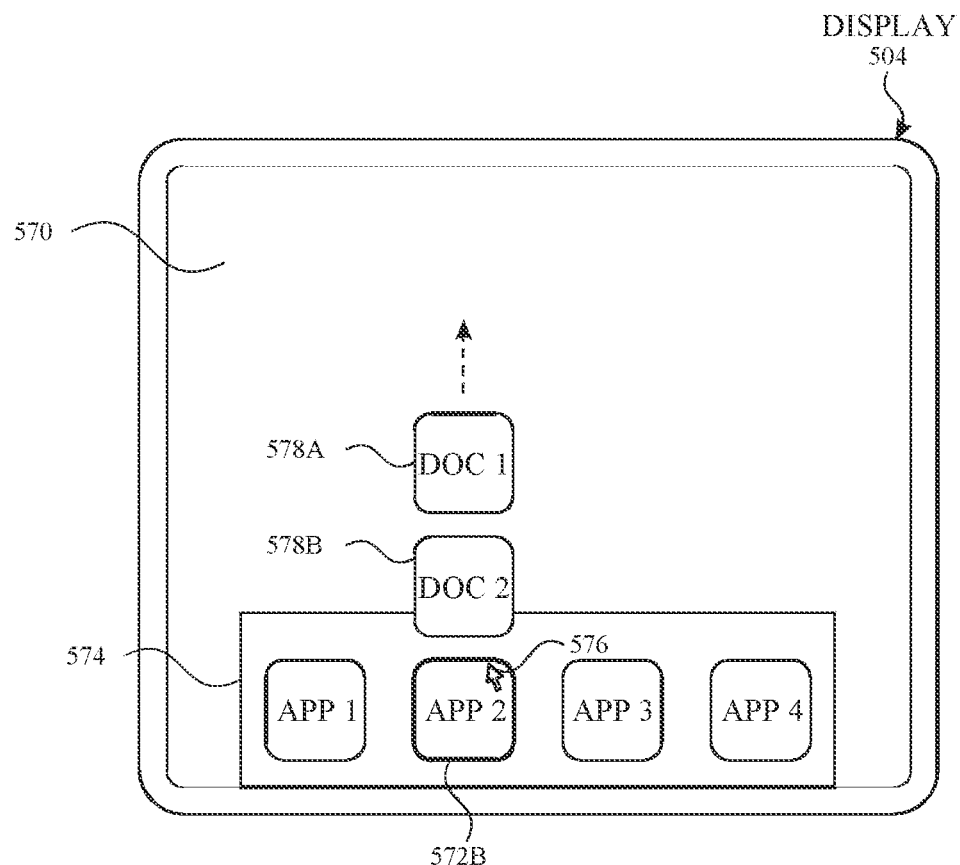
Figure 5G:
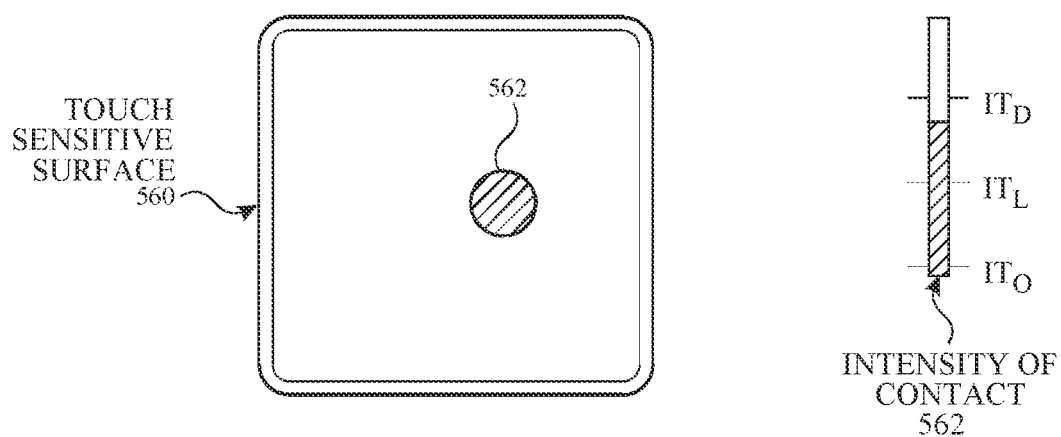
Figure 5H:
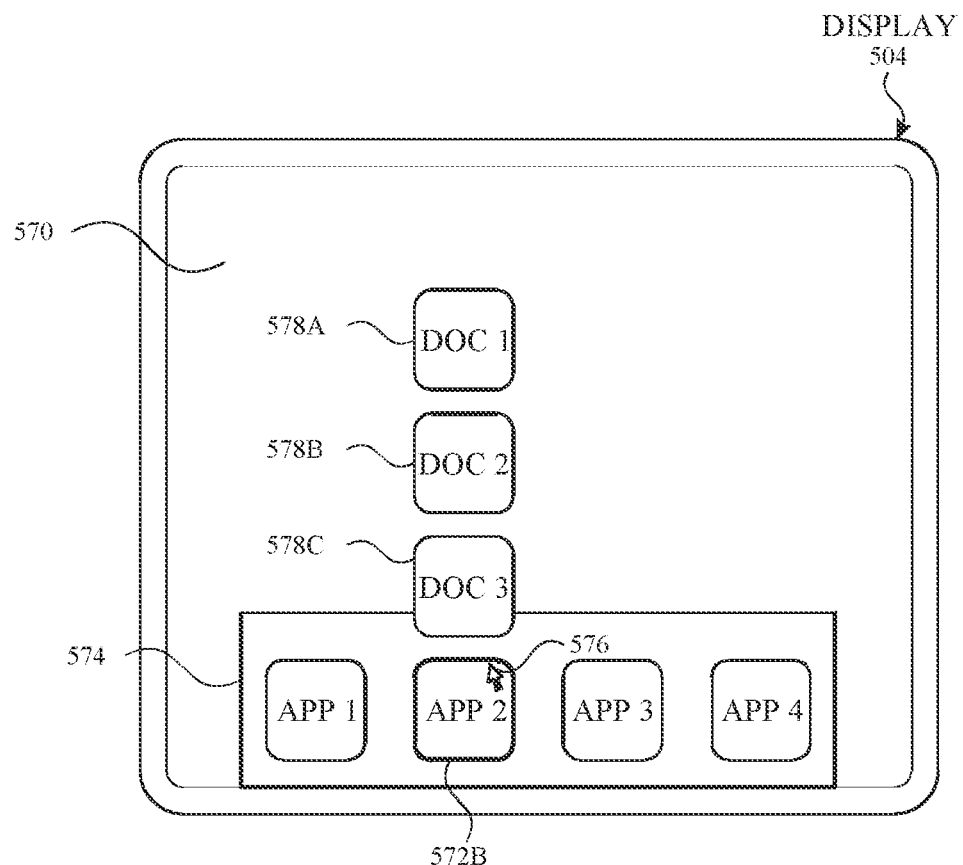
Figure 5H:
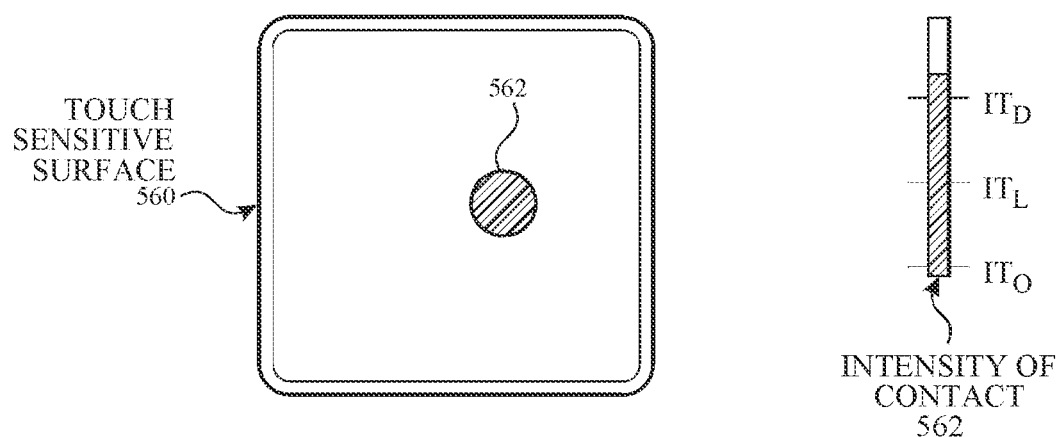

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT'D"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Spatial management of audio includes techniques for modifying characteristics of sound (e.g., by applying filters) such that a listener perceives the sound as being emitted from a particular location in space (e.g., three-dimensional (3D) space). Such techniques can be achieved using speakers, such as headphones, earbuds, or loudspeakers. In some examples, such as when the listener is using headphones, a binaural simulation is used to recreate binaural cues that give the listener the illusion that sound is coming from a particular location in space. For example, the listener perceives the source of the sound as coming from the left of the listener. For another example, the listener perceives the source of the sound as passing by from left to right in front of the listener. This effect can be enhanced by using head tracking to adjust the binaural filters to create the illusion that the location of the source of the sound stays static in space, even when the listener's head moves or rotates. In some examples, such as when the listen is using loudspeakers, a similar effect is achieved by using crosstalk cancellation to give the listener the illusion that sound is coming from a particular location in space.

Head-Related Transfer Functions (HRTFs) characterize how human ears receive sound from various points in space. HRTFs may be based on one or more of the direction, elevation, and distance the sound. By using HRTFs, a device (e.g., device 100) applies different functions to audio to recreate the directivity patterns of human ears. In some examples, a pair of HRTFs for two ears can be used to synthesize a binaural sound that the listener perceives as coming from a particular point in space in relation to the listener, such as above, below, in front of, behind, to the left, or to the right of the user, or a combination thereof. A personalized HRTF will provide better results for the listen for whom the HRTF is personalized, as compared to a generic HRTF. In some examples, HRTFs are applied for listeners that are using listening devices such as headphones, earphones, and earbuds.

For another example, when a device (e.g., device 100) produces sound using two or more loudspeakers, sound from each loudspeaker is heard through the listener's respective closest ear, but also through the contralateral ear, resulting in crosstalk. Effectively managing cancellation of this unintended crosstalk is helpful in modifying the sound such that a listener perceives the sound as being emitted from a particular location in space.

A device (e.g., device 100, 300, 500) can also concurrently modify the characteristics of multiple audio sources (e.g., by applying different filters to respective sources) to give the listener the illusion that the sounds from the different audio sources are coming from respective different locations in space. Such techniques can be achieved using headphones or loudspeakers.

In some examples, modifying a stereo sound source such that a listener perceives the sound as being emitted from a particular location in space (e.g., 3D space) includes creating a mono sound from the stereo sound. For example, the stereo sound includes a left audio channel and a right audio channel. The left audio channel includes a first instrument, for instance, without including a second instrument. The second audio channel includes the second instrument, for instance, without including the first instrument.

When placing the stereo sound source in space, the device optionally combines the left audio channel and the right audio channel to form a combined channel audio, and then applies an interaural time difference to the combined channel audio. Further, the device optionally (or alternatively) also applies an HRTF and/or cross cancellation to the combined channel audio before generating the combined channel audio at different speakers.

When not placing the stereo sound source in space, the device optionally does not combine the left audio channel and the right audio channel and does not apply any of an interaural time difference, an HRTF, or cross cancellation. Instead, the device produces stereo sound by producing the left audio channel using a left loudspeaker of device and producing the right channel using a right loudspeaker of device. As a result, the device produces the sound in stereo and the listener perceives the audio in stereo.

Many of the techniques described below use various processes to modify sounds such that a listener perceives the sounds as coming from particular locations in space.

Attention is now directed towards embodiments of user interfaces ("UI") and associated processes that are implemented on an electronic device, such as portable multifunction device 100, device 300, or device 500.

FIGS. 6A-6N illustrate exemplary techniques for transitioning between visual elements, in accordance with some embodiments. The techniques in these figures are used to illustrate the processes described below, including the processes in FIGS. 7A-7C.

FIGS. 6A-6G illustrate user 606 sitting in front of device 600 (e.g., a laptop computer) with a display 600a, left and right loudspeakers, and a touch-sensitive surface 600b (e.g., a touchpad). Throughout FIGS. 6A-6G and 6K-6N, an additional enlarged view of touch-sensitive surface 600b of device 600 is illustrated to the right of the user to provide the reader with a better understanding of the techniques described, in particular with respect to exemplary user inputs. Similarly, overhead view 650 is a visual depiction of the spatial organization of audio being produced by device 600 and is illustrated throughout FIGS. 6A-6G to provide the reader with a better understanding of the techniques, in particular with respect to locations from which the user 606 perceives sounds as coming from (e.g., as a result of device 600 placing the audio in space). Overhead view 650 is not part of the user interface of the device. Similarly, visual elements displayed outside of the display device are not part of the displayed user interface, as represented by dotted outlines, but are illustrated to provide the reader with a better understanding of the techniques. Similarly, visual elements displayed outside of the display of the device are not part of the displayed user interface, as represented by dotted outlines, but are illustrated to provide the reader with a better understanding of the techniques. Throughout FIGS. 6A-6G, device 600 is executing: (1) a web browser 604a that includes playback of a basketball game with game audio and game video, (2) a music player 604b that includes playback of music, and (3) video player 604c that includes playback of show audio and show video. Audio element 654a corresponds to audio sourced from web browser 604a, audio element 654b corresponds to audio sourced from music player 604b, and audio element 654c corresponds to audio sourced from video player 604c. Throughout FIGS. 6A-6G, device 600 concurrently produces audio sourced from each of web browser 604a, music player 604b, and video player 604c.

At FIG. 6A, device 600 displays, on display 600a, web browser 604a. While displaying web browser 604a, device 600 produces, using the left and right loudspeakers, the game audio sourced from web browser 604a. At FIG. 6A, while displaying web browser 604a, device 600 does not place the game audio of the web browser 604a in space (e.g., device 600 does not apply any of an interaural time difference, an HRTF, or cross cancellation). As a result, user 606 perceives the game audio in stereo and as being in front of the user 606, as represented in FIG. 6A by the location of audio element 654a with respect to user 606 in overhead view 650. For example, the left audio channel of the game audio includes a sports commentators and does not include noise from the crowd, while the right audio channel includes noise from the crowd and does not include the sports commentators. While device 600a displays web browser 604a, device 600 produces stereo audio using the game audio by producing the left audio channel using the left loudspeaker of device 600a and producing the right channel using the right loudspeaker of device 600a. As a result, user 606 perceives the game audio in stereo and as being in front of the user 606, as represented in FIG. 6A by the location of audio element 654a with respect to user 606 in overhead view 650. In some examples, the device would produce game audio for web browser 604a in the same manner if web browser 604a was part of a currently accessed desktop, even if web browser 604a was not actively being displayed (e.g., when a different visual element, such as a word processing application, is displayed on top of web browser 604a, thus blocking display of the web browser 604a on display 600a. Optionally, the audio of the various applications follow curved path 650a when device 600 relocates the audio in space. In some examples, device 600a places the various sound sources equidistant in space from neighboring sound sources. In some examples, device 600a moves the various sound sources in only two axes (e.g., left-right and front-back, but not up-down).

At FIG. 6A, device 600 is not displaying music player 604b. While not displaying music player 604b, device 600 produces, using left and right loudspeakers, music sourced from music player 604b. At FIG. 6A, device 600 places the music sourced from music player 604b in space (e.g., device 600 applies an interaural time difference, an HRTF, and/or cross cancellation to the music). Device 600 places the music such that the user perceives the music as coming from a location in space that is to the right of display 600a (and of user 606), as illustrated by audio element 654b. This enables the user to recognize that the music player 604b is executing and producing audio, even when the music player 604b is not displayed. Further, the placement of the music in space helps the user recognize how to access the display of the music player 604c, as discussed in FIGS. 6B-6G.

At FIG. 6A, device 600 is not displaying video player 604c. While not displaying video player 604c, device 600 produces, using left and right loudspeakers, audio sourced from video player 604c. At FIG. 6A, device 600 places show audio sourced from video player 604b in space (e.g., device 600 applies an interaural time difference, an HRTF, and/or cross cancellation to the music). Device 600 places the show audio such that the user perceives the show audio as coming from a location in space that is further to the right of display 600a (and user 606) than the music from music player 604d. This enables the user to recognize that the video player 604c is executing and producing audio, even when the video player 604c is not displayed. Further, the placement of the show audio in space helps the user recognize how to access the display of the video player 604c.

Additionally, device 600 optionally applies low-pass (or high-pass, or band-pass) filters to audio that correspond to applications that are off the display (e.g., not part of a currently accessed desktop), thereby attenuating (e.g., removing) audio above certain frequency thresholds before the audio is produced by the loudspeakers. As a result, the user perceives such audio as being background noise as compared to audio where the low-pass filter is not applied. This enables the user to more easily tune out the audio from certain applications, such as applications that are not currently displayed. In some embodiments, the same low-pass filter is applied to all audio corresponding to applications that are not displayed. In some embodiments, different low-pass filters are applied to respective audio based on how far off the display the corresponding application should be perceived by the user. In some embodiments, device 600 optionally attenuates audio that corresponds to applications that are off the display (e.g., across all frequencies of the audio).

At FIG. 6A, for example, device 600 does not apply a low-pass filter for the game audio sourced from web browser 604a, device 600 applies a first low-pass filter with a first cutoff frequency for music sourced from music player 604b, and device 600 applies a second low-pass with a second cutoff frequency (lower than the first cutoff frequency) for show audio sourced from video player 604c. Thus, at FIG. 6A, device 600 concurrently produces audio from each of web browser 604a, music player 604b, and video player 604c.

At FIGS. 6B-6C, device 600 receives a left-swipe user input 610a at touch-sensitive surface 600b. In response to receiving the left-swipe user input 610a, as illustrated in FIGS. 6B-6C, device 600 transitions display of web browser 604a off display 600a by sliding web browser 604a to the left and transitions display of music player 604b onto display 600a by sliding music player 604b to the left. Further in response to receiving the left-swipe user input 610a, as illustrated in overhead view 650 of FIGS. 6B-6C, device 600 changes the locations in space from which the user perceives audio from corresponding applications.

At FIG. 6D, device 600 is not displaying web browser 604a. While not displaying web browser 604a, device 600 places, using left and right loudspeakers, audio sourced from web browser 604a in space (e.g., device 600 applies an interaural time difference, an HRTF, and/or cross cancellation to the audio) such that the user perceives the game audio as coming from a location in space that is to the left of display 600a (and user 606). This enables the user to recognize that the web browser 604a is executing and producing audio, even when the web browser 604a is not displayed. Further, the placement of the game audio in space helps the user recognize how to access the display of web browser 604a (e.g., using a swipe-right user input).

At FIG. 6D, device 600 displays, on display 600a, music player 604b. While displaying music player 604b, device 600 produces, using the left and right loudspeakers, the audio sourced from music player 604b. At FIG. 6D, while displaying music player 604b, device 600 does not place the music sources from music player 604b in space (e.g., device 600 does not apply any of an interaural time difference, an HRTF, or cross cancellation). As a result, user 606 perceives the music in stereo and as being in front of the user 606, as represented in overhead view 650 of FIG. 6D by the location of audio element 654c with respect to user 606.

At FIG. 6D, device 600 is not displaying video player 604c. While not displaying video player 604c, device 600 places, using left and right loudspeakers, audio sourced from video player 604c in space (e.g., device 600 applies an interaural time difference, an HRTF, and/or cross cancellation to the audio) such that the user perceives the audio sourced from video player 604c as coming from a location in space that is to the right of display 600a (and user 606), and not as far right as previously perceived by the user in FIG. 6A. This enables the user to recognize that the video player 604c is executing and producing audio, even when video player 604c is not displayed. Further, the placement of the show audio in space helps the user recognize how to access the display of video player 604c (e.g., using a swipe-left user input).

At FIG. 6D, for example, device 600 does not apply a low-pass filter for the music sourced from music player 604b, device 600 applies the first low-pass filter with the first cutoff frequency for game audio sourced from web browser 604a, and device 600 applies the first low-pass with the first cutoff frequency for show audio sourced from video player 604c. Thus, at FIG. 6D, device 600 concurrently produces audio from each of web browser 604a, music player 604b, and video player 604c.

At FIGS. 6E-6F, device 600 receives a right-swipe user input 610b at touch-sensitive surface 600b. In response to receiving the right-swipe user input 610b, as illustrated in FIGS. 6E-6F, device 600 transitions display of web browser 604a onto display 600a by sliding web browser 604a to the right and transitions display of music player 604b off of display 600a by sliding music player 604b to the right. Further in response to receiving right-swipe user input 610b, as illustrated in overhead view 650 of FIGS. 6E-6F, device 600 changes the locations in space from which the user perceives audio from corresponding applications. In this example, the device modifies the audio such that the user perceives them as described in FIG. 6A.

FIG. 6G illustrates an example corresponding to FIG. 6A. In FIG. 6G, the user is listening to the audio produced by device 600a using headphones. As a result, rather than perceiving the game audio of web browser 604a as being in front of the user, the user perceives the game audio as being produced in the user head. Optionally, the audio of the various applications follow straight path 650b when device 600 relocates the audio in space. In some examples, device 600a places the various sound sources equidistant in space from neighboring sound sources. In some examples, device 600a moves the various sound sources in only two axes (e.g., left-right and front-back, but not up-down).

FIGS. 6H-6J illustrates device 660 (e.g., a mobile phone) with a display 660a (e.g., a touchscreen), a touch-sensitive surface 660b (e.g., part of the touchscreen), connected (e.g., wirelessly, wired) to headphones. In this example, user 606 is listening to device 660 using the headphones.

Overhead view 670 is a visual depiction of the spatial organization of audio being produced by device 660 and is illustrated throughout FIGS. 6H-6J to provide the reader with a better understanding of the techniques, in particular with respect to locations from which the user 606 perceives sounds as coming from (e.g., as a result of device 660 placing the audio in space). Overhead view 670 is not part of the user interface of device 660. Similarly, visual elements displayed outside of the display device are not part of the displayed user interface, as represented by dotted outlines, but are illustrated to provide the reader with a better understanding of the techniques. Throughout FIGS. 6H-6J, device 660 is executing a music player that includes playback of music with corresponding album art.

Audio element 674a corresponds to track 1 audio sourced from the music player, audio element 674b corresponds to track 2 audio sourced from the music player, audio element 674c corresponds to track 3 audio sourced from the music player, and audio element 674d corresponds to track 4 audio sourced from the music player.

At FIG. 6H, device 660 does not display, on display 660a, album art 664a for track 1. While not displaying album art 664a for track 1, device 660 produces, using the left and right speakers of the headphones, audio of track 1 by placing the audio of track 1 in space (e.g., device 660 applies an interaural time difference, an HRTF, and/or cross cancellation) such that the user perceives the audio as coming from a first point in space (e.g., to the left of the user, to the left of the device), as represented in FIG. 6H by the location of audio element 670a with respect to user 606 in overhead view 670. In this example, device 660 additionally modifies the audio for track 1 by attenuating the audio and/or applying a low-pass (or high-pass, or band-pass) filter to the audio. In some examples, device 660 does not produce the audio of track 1 when the corresponding album art is off the display.

At FIG. 6H, device 660 displays, on display 660a, album art 664b for track 2. While displaying album art 664b for track 2, device 600 produces, using the left and right headphones, audio of track 2 by placing the audio of track 2 in space (e.g., device 600 applies an interaural time difference, an HRTF, or cross cancellation) such that the user perceives the audio as coming from a second point in space (e.g., different from the first point in space, to the right of the first point in space, in front of the user, at a location corresponding to device 660), as represented in FIG. 6H by the location of audio element 670b with respect to user 606 in overhead view 670. In this example, device 660 does not modify the audio for track 2 by attenuating the audio or applying a low-pass (or high-pass, or band-pass) filter to the audio.

At FIG. 6H, device 660 does not display, on display 660a, album art 664c for track 3. Device 660 also does not produce, using the left or right speakers of the headphones, audio of track 3.

At FIGS. 6I-6J, device 660 receives left-swipe user input 666 at touch-sensitive surface 660a. In response to receiving the left-swipe user input 666, as illustrated in FIGS. 6I-6J, device 660 transitions display of album art 664b off of display 660a by sliding album art 664b to the left and transitions display of album art 664c onto display 660a by sliding the album art 664c to the left. Further in response to receiving left-swipe user input 666, device 660 begins producing audio for track 3 (concurrently with track 2) and changes the locations in space from which the user perceives audio from track 2 and track 3, as illustrated in overhead view 670 of FIGS. 6I-6J In some examples, producing audio for track 3 in response to receiving the left-swipe user input 666 includes skipping a predetermined amount of time of the audio (e.g., the first 0.5 seconds of track 2). This provides the user with a sense that track 3 was previously playing, even when device 660 was not previously producing audio for track 3.

At FIG. 6J, device 660 ceases to produce audio for track 1. Device 660 produces audio for track 2, using the left and right speakers of the headphones, by placing the audio of track 2 in space (e.g., device 660 applies an interaural time difference, an HRTF, and/or cross cancellation) such that the user perceives the audio as coming from the first point in space (e.g., to the left of the user, to the left of the device), as represented in FIG. 6J by the location of audio element 670b with respect to user 606 in overhead view 670. In this example, device 660 additionally modifies the audio for track 2 by attenuating the audio and/or applying a low-pass (or high-pass, or band-pass) filter to the audio. In some examples, device 660 fades out the audio of track 2 (ceasing to produce audio) as the corresponding album art moves off the display.

At FIG. 6J, device 660 displays, on display 660a, album art 664c for track 3. While displaying album art 664b for track 3, device 600 produces, using the left and right headphones, audio of track 3 by placing the audio of track 3 in space (e.g., device 600 applies an interaural time difference, an HRTF, or cross cancellation) such that the user perceives the audio as coming from the second point in space (e.g., different from the first point in space, to the right of the first point in space, in front of the user, at a location corresponding to device 660), as represented in FIG. 6H by the location of audio element 670c with respect to user 606 in overhead view 670. In this example, device 660 does not modify the audio for track 3 by attenuating the audio or applying a low-pass (or high-pass, or band-pass) filter to the audio.

As a result, user 606 perceives the music as passing in front of the user as the user swipes through various album art.

FIGS. 6K-6N illustrate user 606 sitting in front of device 600 (e.g., a laptop computer) with a display 600a, left and right loudspeakers, and a touch-sensitive surface 600b (e.g., a touchpad). Throughout FIGS. 6K-6N, an additional enlarged view of touch-sensitive surface 600b of device 600 is illustrated to the right of the user to provide the reader with a better understanding of the techniques described, in particular with respect to user inputs (or lack thereof). Similarly, overhead view 680 is a visual depiction of the spatial organization of audio being produced by device 600 and is illustrated throughout FIGS. 6K-6N to provide the reader with a better understanding of the techniques, in particular with respect to locations from which the user 606 perceives sounds as coming from (e.g., as a result of device 600 placing the audio in space). Overhead view 680 is not part of the user interface of device 600. Similarly, visual elements displayed outside of the display device are not part of the displayed user interface, as represented by dotted outlines, but are illustrated to provide the reader with a better understanding of the techniques.

At FIG. 6K, a music player 604b is playing music. While displaying music player 604a, device 600 produces, using the left and right speakers, audio sourced from music player 604a. For example, device 600 does not place the audio sourced from music player 604a in space (e.g., device 660 does not apply any of an interaural time difference, an HRTF, or cross cancellation). As a result, user 606 perceives stereo music as being in front of user 606, as represented in FIG. 6K by the location of audio element 680a with respect to user 606 in overhead view 680. Throughout FIGS. 6K-6N, audio element 680a corresponds to audio being provided by music player 604b.

At FIG. 6L, device 600 receives a notification (e.g., a message notification received, via a network connection). In response to receiving the notification (and without receiving user input), device 600 transitions to producing, using the left and right speakers, the music sourced from music player 604a by placing the music in space (e.g., device 600 applies an interaural time difference, an HRTF, or cross cancellation) such that the user perceives the audio as coming from a point in space that is to the left of device 600, as represented in FIGS. 6L-6M by the locations of audio element 680a with respect to user 606 in overhead view 680. Device 600 maintains display of music player 604a on display 600a. In some examples, device 600 also displays the notification in response to receiving the notification. Throughout FIGS. 6K-6N, audio element 680b corresponds to audio being provided by the notification.

In further response to receiving the notification (and without receiving user input), device 600 transitions from not producing audio for the notification to producing, using the left and right speakers, audio for the notification by placing the audio for the notification in space (e.g., device 600 applies an interaural time difference, an HRTF, or cross cancellation) such that the user perceives the audio for the notification as coming from a point in space that is to the right of device 600, as represented in FIG. 6L by the location of audio element 680b with respect to user 606 in overhead view 680. In some examples, device 600 emphasizes the audio for the notification by ducking the music sourced from music player 604a. For example, device 600 attenuates the music sourced from music player 604a while producing audio for the notification. Device 600 then transitions to producing the audio for the notification without placing the audio in space (e.g., device 600 does not apply any of an interaural time difference, an HRTF, or cross cancellation), as represented in FIG. 6M by the location of audio element 680b with respect to user 606 in overhead view 680.

Subsequently, device 600 produces, using the left and right speakers, audio sourced from music player 604a without placing the audio sourced from music player 604a in space (e.g., device 600 does not apply any of an interaural time difference, an HRTF, or cross cancellation), as illustrated in FIG. 6N.

In some examples, devices 600 and 660 include a digital assistant that produces audio feedback, such as returning the results of a query by speaking the results. In some examples, devices 600 and 660 produce audio for the digital assistant by placing the audio for the digital assistant at a location in space (e.g., over the right shoulder of the user) such that the user perceives the digital assistant as remaining stationary in space even when other audio moves in space. In some examples, devices 600 and 660 emphasize the audio for the digital assistant by ducking one or more (or all) other audio.

FIGS. 7A-7C is a flow diagram illustrating a method for transitioning between visual elements using an electronic device in accordance with some embodiments. Method 700 is performed at a device (e.g., 100, 300, 500, 600, 660) with a display, wherein the electronic device is operably connected with two or more speakers (e.g., left and right speakers, left and right headphones, left and right earphones, left and right earbuds). Some operations in method 700 are, optionally, combined, the orders of some operations are, optionally, changed, and some operations are, optionally, omitted.

As described below, method 700 provides an intuitive way for transitioning between visual elements. The method reduces the cognitive burden on a user for transitioning between visual elements, thereby creating a more efficient human-machine interface. For battery-operated computing devices, enabling a user to transitioning between visual elements faster and more efficiently conserves power and increases the time between battery charges.

The electronic device displays (702), at a first location on the display, a first visual element (e.g., 604a, a video playback window, album art, of a first application).

The electronic device accesses (704) first audio (e.g., 654a, from first source audio) corresponding to the first visual element (e.g., audio of the video in the playback window, audio of the song from the album corresponding to the album art, audio generated by, or received from, the first application).

In accordance with some embodiments, the electronic device accesses (706) second audio (e.g., 654b, from second source audio) corresponding to a second visual element (e.g., 604b).

While (708) displaying, at the first location (e.g., a location on the display that is substantially centered horizontally on the display) on the display, the first visual element (e.g., 604a), the electronic device produces audio, at the two or more speakers using the first audio (e.g., 654a), in a first mode (e.g., without modifying the first audio, without apply any of an interaural time difference, an HRTF, or cross cancellation, 654a as depicted in FIG. 6A).

In accordance with some embodiments, the first mode is configured (712) such that audio produced using the first mode is perceived by the user as being produced from a first direction (and, optionally, location) that corresponds to (e.g., aligned with) the display.

While (708) displaying, at the first location (e.g., a location on the display that is substantially centered horizontally on the display) on the display, the first visual element (e.g., 604a), the electronic device produces audio (e.g., a discrete audio output or a combined audio output that includes a component based on the second audio), at the two or more speakers using the second audio (e.g., 654b), in a third mode (e.g., apply an interaural time difference, an HRTF, and/or cross cancellation, 654b as depicted in FIG. 6A) different from the first mode and a second mode. The third mode is configured such that audio produced in the third mode is perceived by the user as being produced from a direction (and optionally, location) that is off (e.g., not aligned with, to the right of) the display (e.g., modifying the source audio before producing the audio such that the audio is perceived by a user as being produced from a direction that is to the right of the display or user). In some examples, the first mode places audio in front of the user or display, the second more places audio to the left of the user or display, and the third mode places audio to the right of the user or display.

While (708) displaying, at the first location (e.g., a location on the display that is substantially centered horizontally on the display) on the display, the first visual element (e.g., 604a), the electronic device forgoes (716) displaying, on the display, a second visual element (e.g., 604b at FIG. 6A, a second video playback window, second album art, of a second application) that corresponds to the second audio (e.g., 654b, from second source audio) (e.g., audio of the video in the playback window, audio of the song from the album corresponding to the album art, audio generated by, or received from, the second application).

While (708) displaying, at the first location (e.g., a location on the display that is substantially centered horizontally on the display) on the display, the first visual element (e.g., 604a), the electronic device receives (718) first user input (e.g., 610a, a swipe input on touch-sensitive surface 600b).

In response (720) to receiving the first user input (e.g., 610a), the electronic device transitions (e.g., by sliding) display of the first visual element (e.g., 604a at FIG. 6B) from the first location on the display to the first visual element (e.g., 604a at FIG. 6C) not being displayed on the display (e.g. by sliding off an edge of the display (e.g., a left edge)).

Further in response (720) to receiving the first user input (e.g., 610a) and while not displaying, on the display, the first visual element (e.g., 604a at FIG. 6C), the electronic device produces (724) audio, at the two or more speakers, using the first audio (e.g., 654a) in the second mode that is different from the first mode. The second mode is configured such that audio produced in the second mode is perceived by the user as being produced from a direction (and optionally, location) that is off (e.g., not aligned with, to the left of) the display (e.g., modifying the source audio before producing the audio such that the audio is perceived by a user as being produced from a direction that is off the display in a direction corresponding to the last displayed position of the first visual element (e.g., to the left of the display or user), apply an interaural time difference, an HRTF, and/or cross cancellation, 654a as depicted in FIG. 6C). Producing audio relating to content with varying characteristics enables the user to visualize where the content is in relation to the user without requiring display of the content. This enables the user to quickly and easily recognize what inputs are required to access the content (e.g., to cause display of the content). Producing audio with varying characteristics also provides the user with contextual feedback about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In some examples, the volume of audio produced using the first mode is higher than the volume of audio produced using the second mode or using the third mode. In some examples, the volume of audio produced using the second mode is the same as the volume of audio produced using the first mode.

In some examples, a frequency filter, such as a low-pass filter, a high-pass filter, or a bandpass filter, is not applied to audio produced in the first mode (e.g., when the audio is perceived as being centered, such as in front of the user). In some examples, a first frequency filter, such as a low-pass filter, a high-pass filter, or a bandpass filter, is applied to audio produced using the first mode. In some examples, a second frequency filter, such as a low-pass filter, a high-pass filter, or a bandpass filter, is applied to audio produced using the second mode. In some examples, a third frequency filter, such as a low-pass filter, a high-pass filter, or a bandpass filter, is applied to audio produced using the third mode. In some examples, the second frequency filter is the same as the third frequency filter. In some examples, frequency filters are applied to audio produced using the second mode and the third mode, but not to audio produced using the first mode.

In accordance with some embodiments, while displaying, at the first location on the display, the first visual element (e.g., 604a in FIG. 6A, a video playback window, album art, of a first application), the electronic device forgoes displaying, on the display, a second visual element (e.g., 604b at FIG. 6A, a second video playback window, second album art, of a second application) that corresponds to second audio (e.g., 654b, from second source audio) (e.g., audio of the video in the playback window, audio of the song from the album corresponding to the album art, audio generated by, or received from, the second application). Not displaying content saves display space and allows the device to provide the user with other visual feedback on the display. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, further in response (720) to receiving the first user input (e.g., 610a), the electronic device transitions(726) (e.g., by sliding) display of the second visual element (e.g., 604b) from not being displayed on the display to a fourth location on the display (e.g., 604b at FIG. 6C, same as the first location) (e.g. by sliding the second visual element onto the display from an edge (such as the right edge) of the display).

In accordance with some embodiments, further in response (720) to receiving the first user input (e.g., 610a), concurrent with producing audio using the first audio (e.g., 654a at FIG. 6C) in the second mode, the electronic device produces (728) audio, at the two or more speakers, using the second audio (e.g., 654b at FIG. 6C) in the first mode (e.g., without modifying the second audio). In other examples, the second audio is produced in a mode different from the first mode.

In accordance with some embodiments, the second mode is configured such that audio produced using the second mode is perceived by the user as being produced from a second direction (e.g., different from the first direction). In accordance with some embodiments, the third mode is configured such that audio produced using the third mode is perceived by the user as being produced from a third direction different from the second direction (and, optionally, different from the first direction). Thus, optionally, a perceived location of source for audio produced using the various modes differs.

In accordance with some embodiments, subsequent to displaying, at the first location (e.g., a location on the display that is substantially centered horizontally on the display) on the display, the first visual element (e.g., 604a at FIG. 6A) and prior to the first visual element not being displayed on the display (e.g., 604a at FIG. 6C), the electronic device displays, at a second location (e.g., a location on the display that is to the left of the first location on the display, a location on the display that is not substantially centered horizontally on the display, a location on the display that is adjacent to an edge (e.g., a left edge) of the display) on the display, the first visual element (e.g., 604a at FIG. 6B). In accordance with some embodiments, subsequent to displaying, at the first location (e.g., a location on the display that is substantially centered horizontally on the display) on the display, the first visual element (e.g., 604a at FIG. 6A) and prior to the first visual element not being displayed on the display (e.g., 604a at FIG. 6C), while displaying the first visual element (e.g., 604a at FIG. 6B) at the second location on the display, the electronic device produces audio, at the two or more speakers, using the first audio (e.g., 654a at FIG. 6B) in a fourth mode that is different from the first mode, the second mode, and the third mode (e.g., modifying the source audio before producing the audio such that the audio is perceived by a user as being produced from a direction that is different from the location at which the audio was perceived when produced in the first mode, such as at or near the left side of the display).

In accordance with some embodiments, the first mode does not include a modification of an interaural time difference of audio. In some examples, audio produced in the first mode (e.g., 654a at FIG. 6A) is not modified using any of an HRTF, an interaural time different of audio, or cross cancellation. In some examples, while the first visual element is displayed, the electronic device plays the first audio using a HRTF configured such that the first audio is perceived as being in front of the user, such as within a range of 10 degrees left and 10 degrees right of the direction the user is facing. In some examples, while displaying, on the display, the first visual element, the electronic device produces the first audio using an HRTF that modifies the interaural time difference of the first audio by less then a first predetermined amount (e.g., minimal changes).

In accordance with some embodiments, the second mode includes a modification of an interaural time difference of audio. In some examples, the second mode includes a first degree modification of the interaural time difference of audio and the second mode includes a second degree modification, larger than the first degree, of the interaural time difference of audio. In some examples, the third mode includes a modification of an interaural time difference of audio. In some examples, audio produced in the second mode (e.g., 654b at FIG. 6C) is modified using one or more of an HRTF, an interaural time different of audio, and cross cancellation. In some examples, audio produced in the third mode (e.g., 654b at FIG. 6A) is modified using one or more of an HRTF, an interaural time different of audio, and cross cancellation. Producing audio relating to content with varying characteristics enables the user to visualize where the content is in relation to the user without requiring display of the content. This enables the user to quickly and easily recognize what inputs are required to access the content (e.g., to cause display of the content). Producing audio with varying characteristics also provides the user with contextual feedback about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In accordance with some embodiments, modification of the interaural time difference of audio includes: combining a first channel audio (e.g., a right channel) of the audio and a second channel audio (e.g., a left channel) of the audio to form a combined channel audio, updating the second channel audio to include the combined channel audio at a first delay (e.g., 0 ms delay, less than a delay amount), updating the first channel audio to include the combined channel audio at a second delay (e.g., a 100 ms delay, more than the delay amount) different from the first delay.

In some examples, modifying the interaural time difference of audio includes introducing a time delay to a first channel audio (e.g., a right channel) without introducing a time delay to the second channel audio (e.g., a left channel) that is different from the first audio channel.

In accordance with some embodiments, in response to beginning to receive (e.g., beginning to detect) the first user input (e.g., a swipe input), the electronic device transitions from not producing audio using second audio (e.g., from second source audio) (e.g., audio of the video in the playback window, audio of the song from the album corresponding to the album art, audio generated by, or received from, the second application) that corresponds to a second visual element (e.g., a second video playback window, second album art, of a second application) to producing, at the two or more speakers, audio using second audio that corresponds to the second visual element. For example, there is no audio being produced at the speakers using the second audio before the first input is received. When the beginning of the first input is detected (or after a portion of the first input is detected, or after the first input is detected), the device produces, at the two or more speakers, audio using second audio that corresponds to the second visual element. In some examples, the second audio is an audio file (e.g., a song) and transitioning to producing audio using the second audio includes forgoing producing audio using a first predetermined portion (e.g., the first 0.1 seconds) of the second audio. For example, this provides an effect that the audio was playing before the audio is heard by the user.

In accordance with some embodiments, producing audio using the second mode (and, optionally, third mode) includes one or more of attenuating the audio, applying a high-pass filter to the audio, applying a low-pass filter to the audio, and changing a volume balance among the two or more speakers. Optionally, producing audio using the one or more of: attenuating the audio, applying a high-pass filter to the audio, applying a low-pass filter to the audio, and changing a volume balance among the two or more speakers. Producing audio relating to content with varying characteristics enables the user to visualize where the content is in relation to the user without requiring display of the content. This enables the user to quickly and easily recognize what inputs are required to access the content (e.g., to cause display of the content). Producing audio with varying characteristics also provides the user with contextual feedback about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In some examples, producing audio using the second mode (or the third and fourth modes) includes applying crosstalk cancelation technique to the audio such that the audio is configured to be perceived by the user as coming from a particular direction. In some examples, producing audio using the third mode includes applying crosstalk cancelation technique to the audio such that the audio is configured to be perceived as coming from a particular direction. In some examples, producing audio using the first mode does not include applying a crosstalk cancelation technique to the audio.

Note that details of the processes described above with respect to method 700 (e.g., FIGS. 7A-7C) are also applicable in an analogous manner to the methods described below. For example, methods 900, 1200, 1400, and 1500 optionally include one or more of the characteristics of the various methods described above with reference to method 700. For example, the same or similar techniques are used to place audio in space. For another example, the same audio sources may be used in the various techniques. For yet another example, currently playing audio in each of the various methods can be manipulated using the techniques described in other methods. For brevity, these details are not repeated below.

FIGS. 8A-8K illustrate exemplary techniques for previewing audio, in accordance with some embodiments. The techniques in these figures are used to illustrate the processes described below, including the processes in FIGS. 9A-9C.

FIGS. 8A-8K illustrate device 800 (e.g., a mobile phone) with a display, a touch-sensitive surface, and left and right speakers (e.g., headphones). Overhead view 850 is a visual depiction of the spatial organization of audio being produced by device 800 and is illustrated throughout FIGS. 8A-8K to provide the reader with a better understanding of the techniques, in particular with respect to locations from which the user 856 perceives sounds as coming from (e.g., as a result of device 800 placing audio in space). Overhead view 850 is not part of the user interface of device 800. In some examples, the techniques described below enable users to more easily and efficiently preview and select music for playback.

Figure 8A:
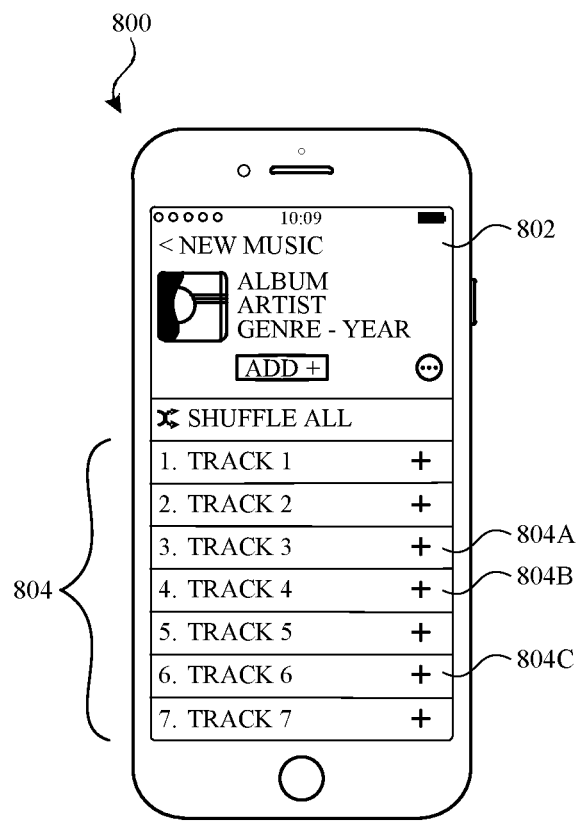
FIGS. 8A-8K illustrate exemplary techniques for previewing audio, in accordance with some embodiments.
Figure 8A:
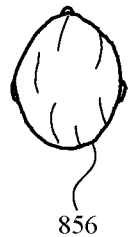
Figure 9A:
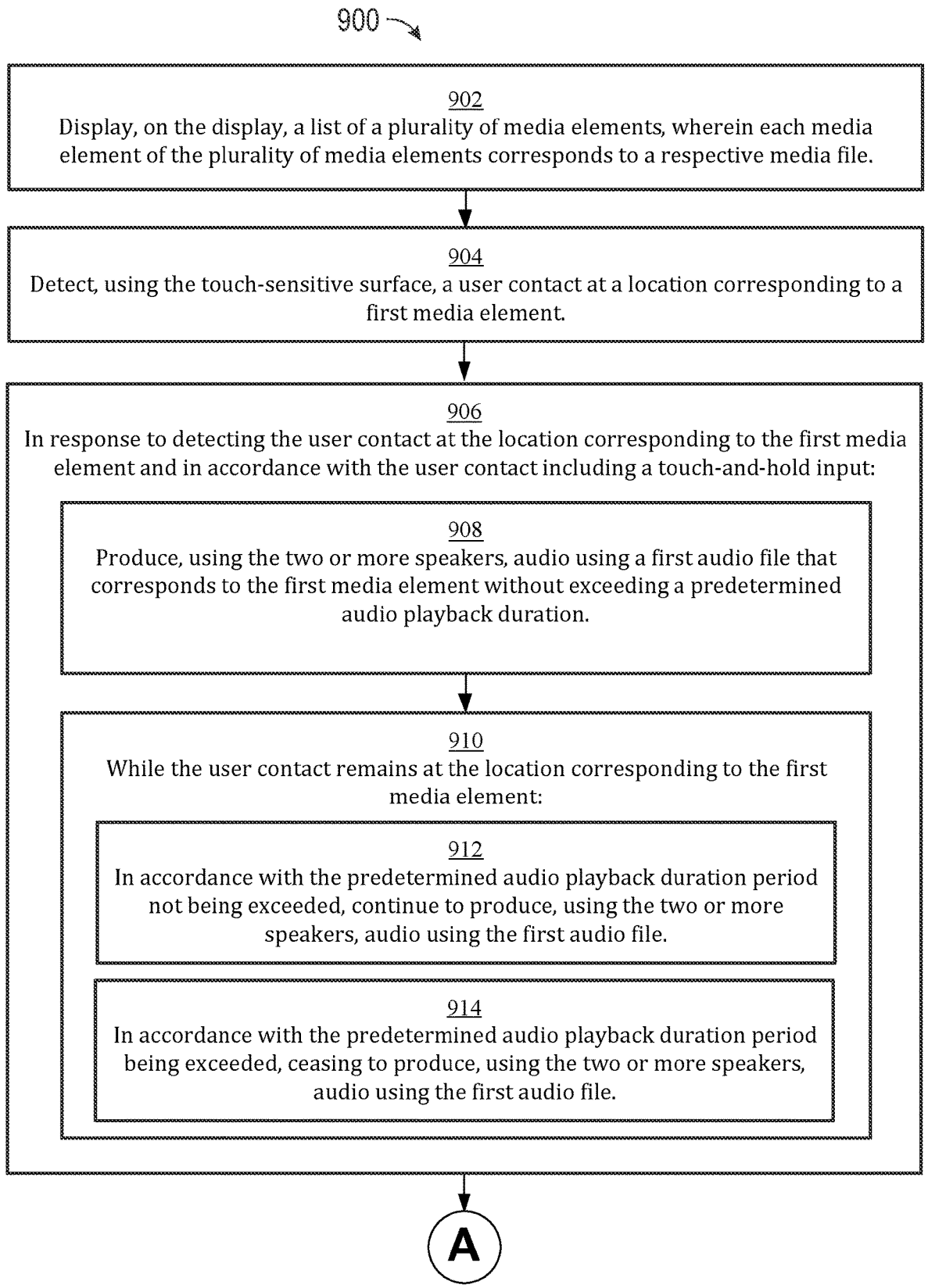
FIGS. 9A-9C is a flow diagram illustrating a method for previewing audio using an electronic device in accordance with some embodiments.
Figure 9B:
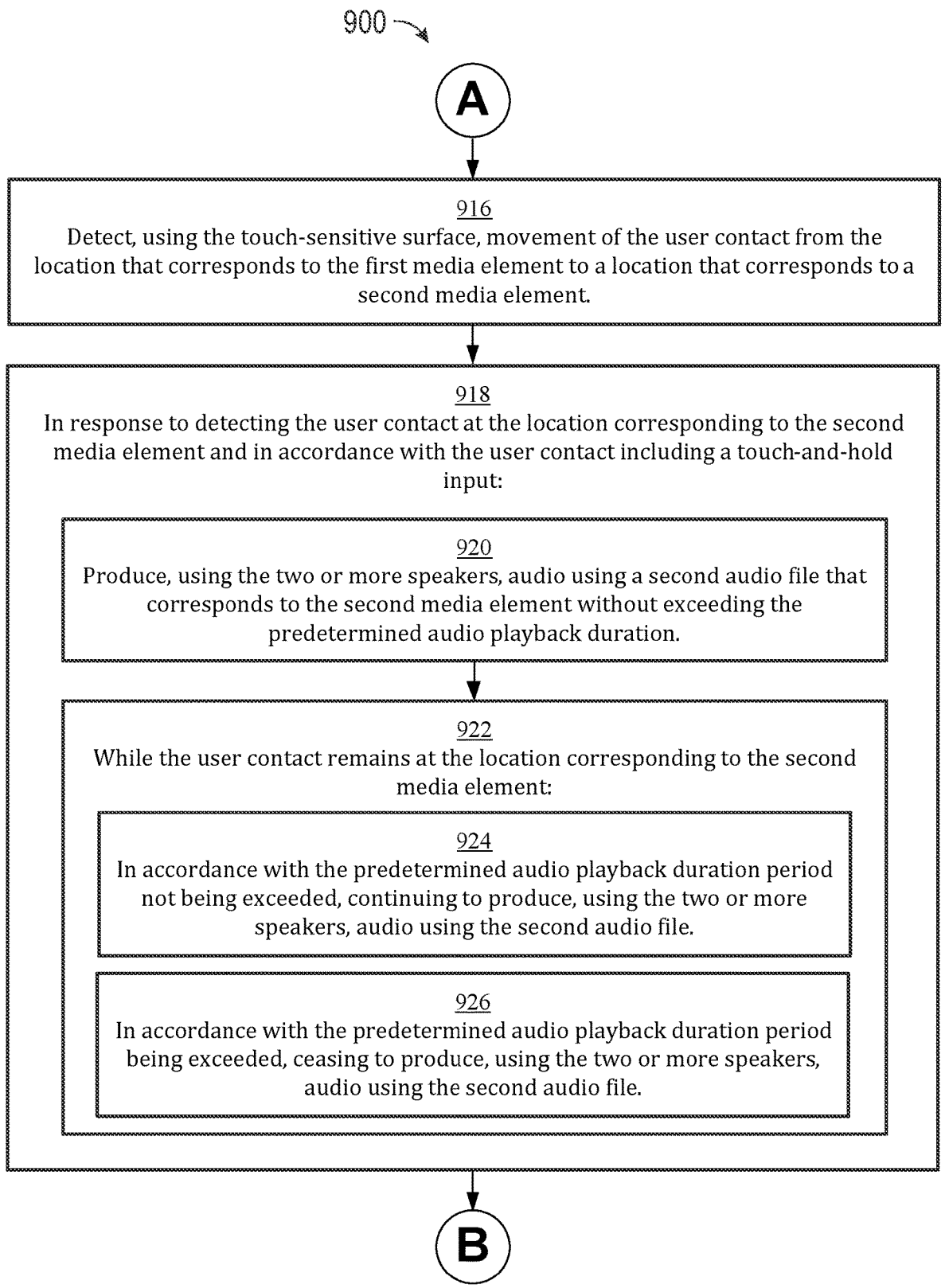
Figure 9C:
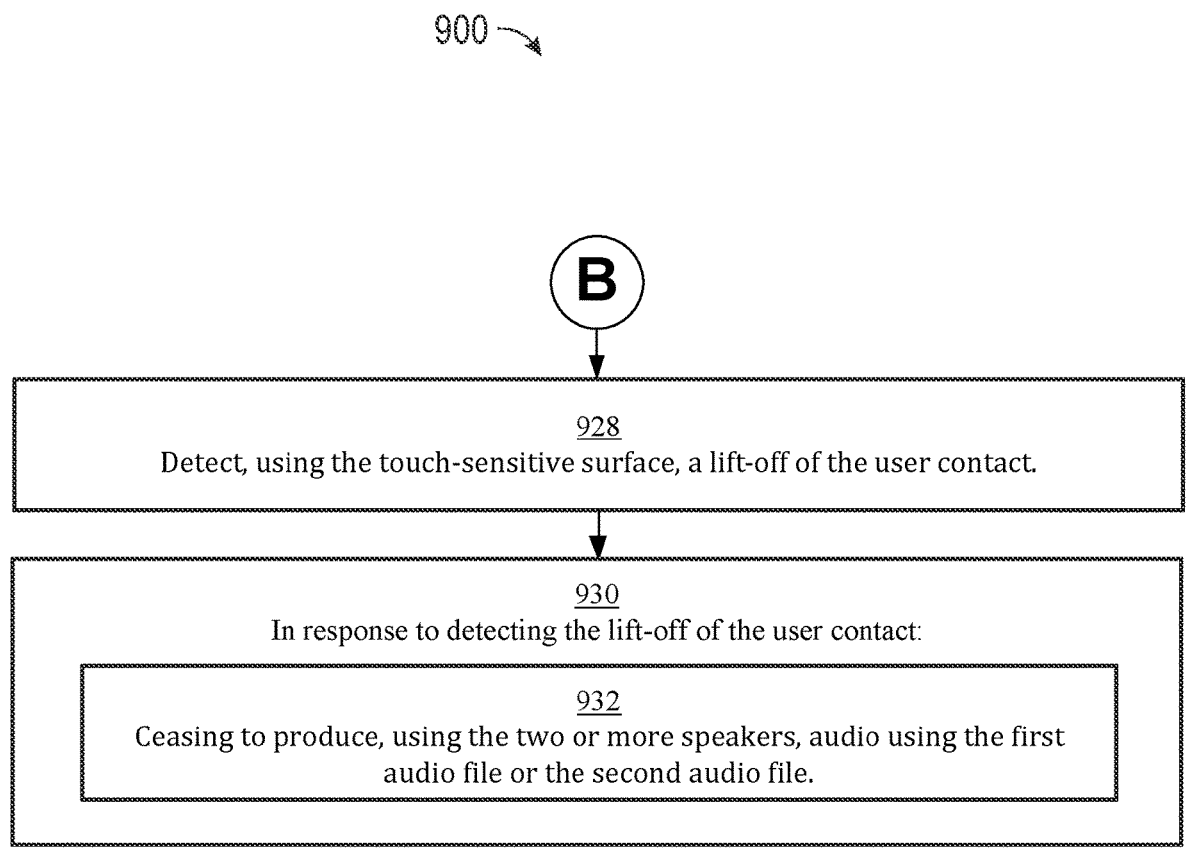

At FIG. 8A, device 800 displays a music player 802 for playing music. Music player 802 includes a plurality of affordances 804, each of which correspond to a different song that can be played using device 800. As illustrated in overhead view 850, device 800 is not playing any audio.

Figure 8B:
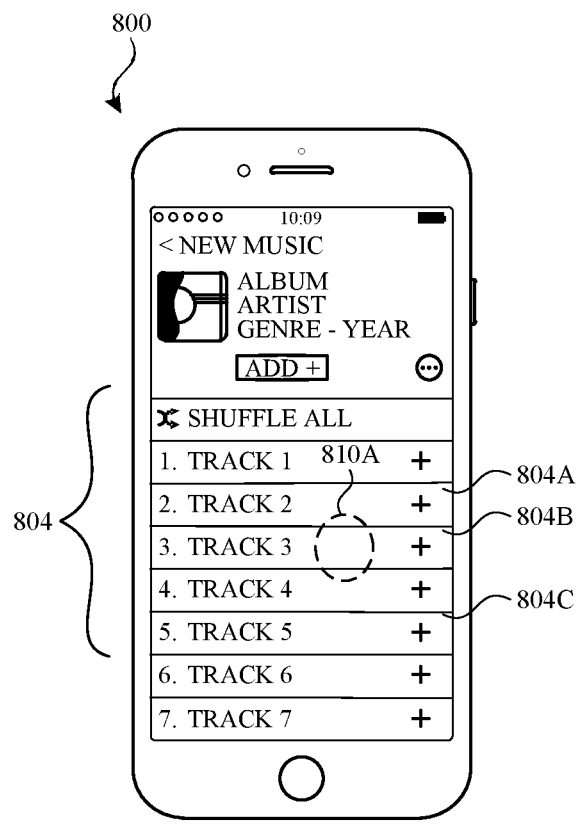
Figure 8B:
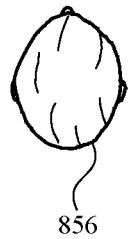

At FIG. 8B, device 800 detects a tap-and-hold input 810a on affordance 804a for track 3. As illustrated in overhead view 850, device 800 is not playing any audio.

Figure 8C:
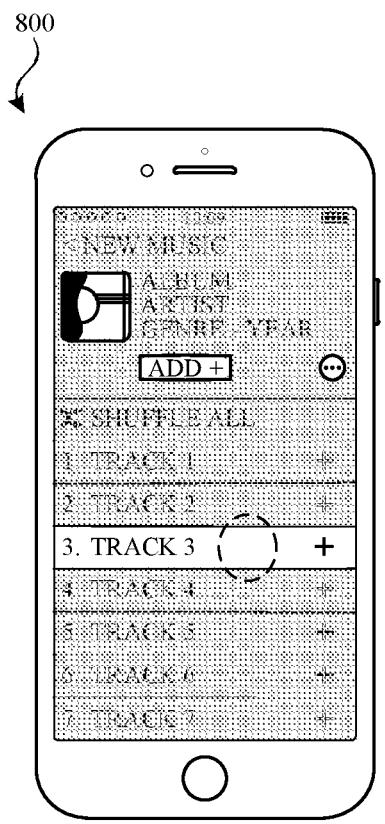
Figure 8C:
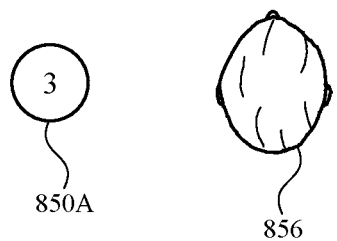

At FIG. 8C, in response to detecting input 810a on affordance 804a and while continuing to detecting input 810a on affordance 804a, device 800 updates the plurality of affordances 804 to differentiate affordance 804a for track 3. In the example of FIG. 8C, device 800 blurs out the plurality of affordance 804 other than the selected affordance 804a for track 3. This indicates to the user that the song corresponding to affordance 804a will be previewed.

For example, previews are limited to a predetermined audio playback duration (e.g., less then the duration of the song). After the predetermined audio playback duration is reached during playback of a song, the device ceases to play that song. In some examples, after ceasing to play the song, the device proceeds to providing a preview of a different song. In some examples, after ceasing to play the song, the device proceeds to providing another preview of the same song (e.g., loop the same portion of the song).

As illustrated in overhead view 850 of FIG. 8C, in response to detecting input 810a on affordance 804a and while continuing to detecting input 810a on affordance 804a, device 800 produces, using the two or more speakers, a preview of audio of track 3 by placing the audio of track 3 in space (e.g., device 800 applies an interaural time difference, an HRTF, and/or cross cancellation to the music). Device 800 places the audio of track 3 such that the user perceives the music as coming from a location in space that is to the left of the user 856 (or device 800), as illustrated by audio element 850a in overhead view 850 of FIG. 8C. At FIGS. 8C-8D, device 800 continues to detect input 810a on affordance 804a and updates the location in space of the audio of track 3 at which the user perceives the music such that the user perceives the music as moving toward the user.

Figure 8D:
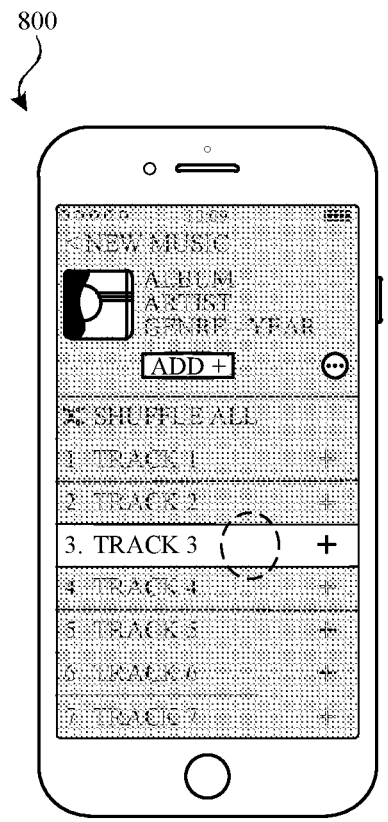
Figure 8D:
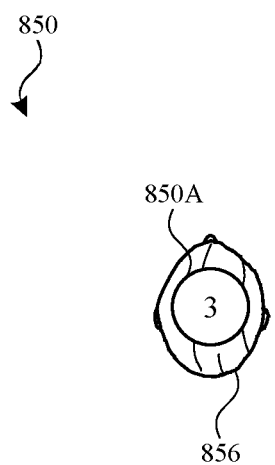

At FIG. 8D, device 800 continues to produce the audio for track 3 but has stopped placing the audio in space and, as a result, the user perceives the audio as being in the user's head, as illustrated by audio element 850a in overhead view 850 of FIG. 8D. For example, at FIG. 8D, device 800 produces audio of track 3, using the left and right speakers, without placing the audio (e.g., device 800 does not apply any of an interaural time difference, an HRTF, or cross cancellation).

Device 800 continues to play the preview of track 3 for the user until (1) the predetermined audio playback duration is reached, (2) the devices detects movement of the input 810a on the touch-sensitive surface to an affordance corresponding to a different song, or (3) the device detects lift-off of the input 810a.

Figure 8E:
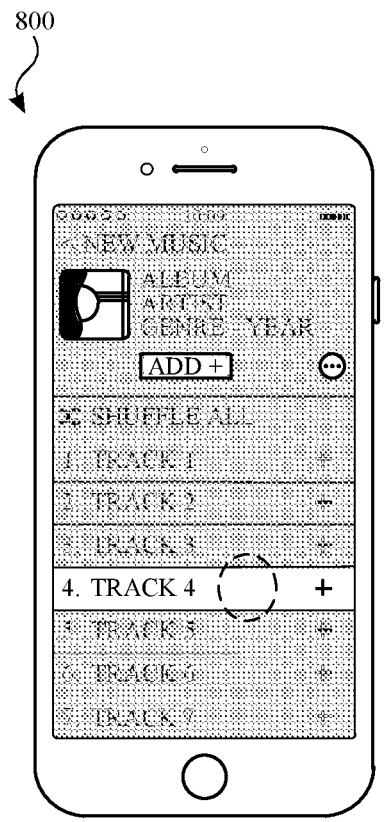
Figure 8E:
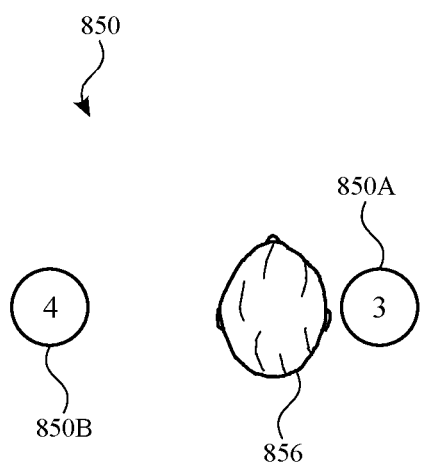

At FIG. 8E, device 800 detects movement of input 810a from affordance 804a to affordance 804b (without detecting a lift-off of input 810a). Note that device 800 does not scroll (or otherwise move) the plurality of affordances 804 in response to detecting the movement of input 810a. In response to detecting the input at affordance 804b, device 800 updates the visual aspects of the device and the spatial placement of the audio. Device 800 blurs out affordance 804a for track 3 and unblurs affordance 804b for track 4.

Figure 8F:
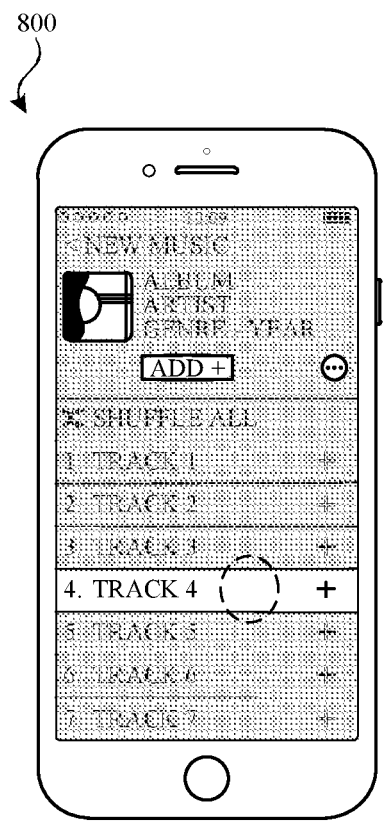
Figure 8F:
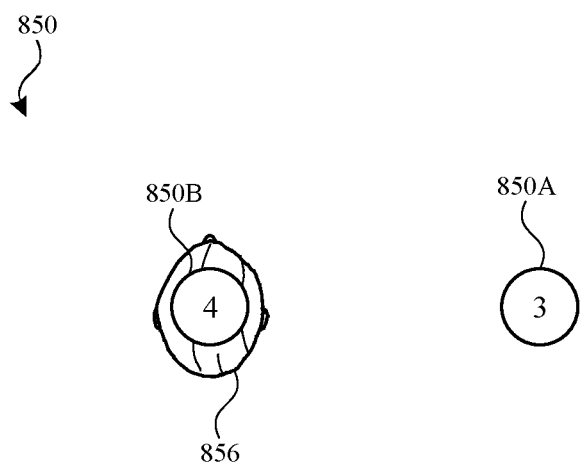

Device 800 also transitions to producing audio of track 3, using the left and right speakers, by placing the audio in space (e.g., device 800 applies an interaural time difference, an HRTF, and/or cross cancellation), such that the user perceives the audio as leaving the user's head and moving off to the right of the user, as illustrated by audio element 850a in overhead view 850 of FIGS. 8E-8F. Device 800 also optionally begins attenuating the audio of track 3 and then ceasing to produce the audio of track 3, as illustrated by audio element 850a no longer being illustrated in overhead view 850 of FIG. 8G. Further in response to detecting the input at affordance 804b, device 800 produces a preview of audio of track 4 by placing the audio in space (e.g., device 800 applies an interaural time difference, an HRTF, and/or cross cancellation), such that the user perceives the audio of track 4 as coming from the left of the user and moving into the head of the user, as illustrated by audio element 850b in overhead view 850 of FIGS. 8E-8G. As before, the preview is limited to the predetermined audio playback duration (e.g., less then the duration of the song). After the predetermined audio playback duration is reached, the device ceases to play the song.

Figure 8G:
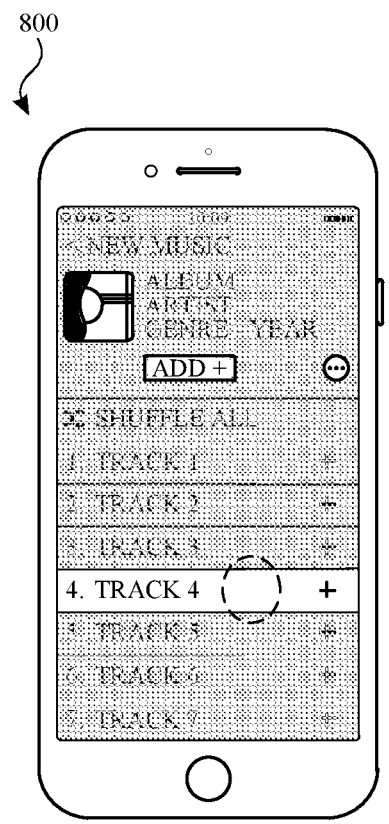
Figure 8G:
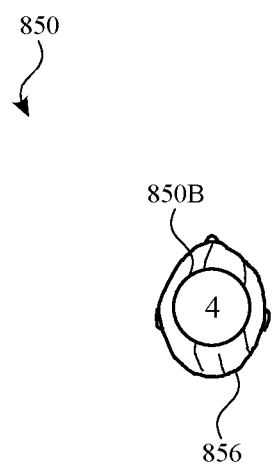

At FIGS. 8F-8G, device 800 produces audio of track 4, using the left and right speakers, without placing the audio (e.g., device 800 does not apply any of an interaural time difference, an HRTF, or cross cancellation). For example, as a result of not placing the audio in space, a user of device 800 wearing headphones perceives the audio as being in the head of the user, as illustrated by audio element 850b in overhead view 850 of FIGS. 8F-8G.

Figure 8H:
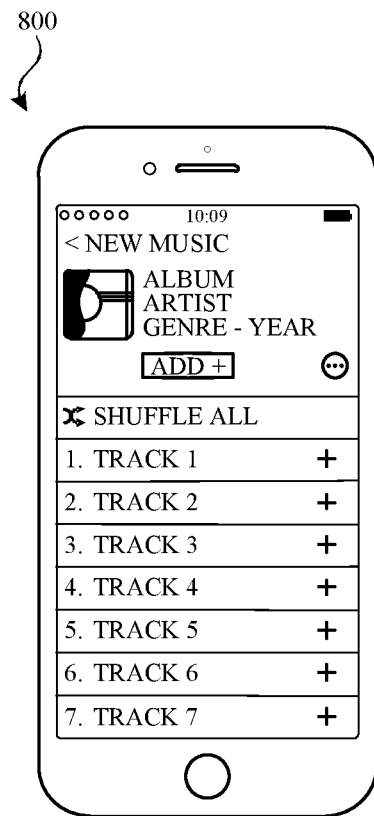
Figure 8H:
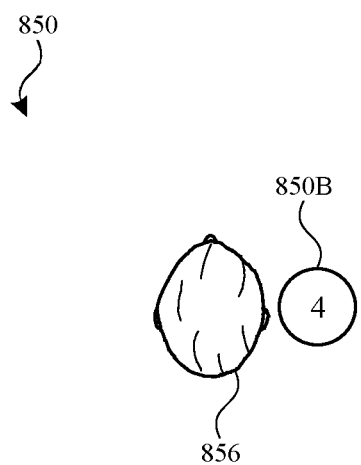
Figure 8I:
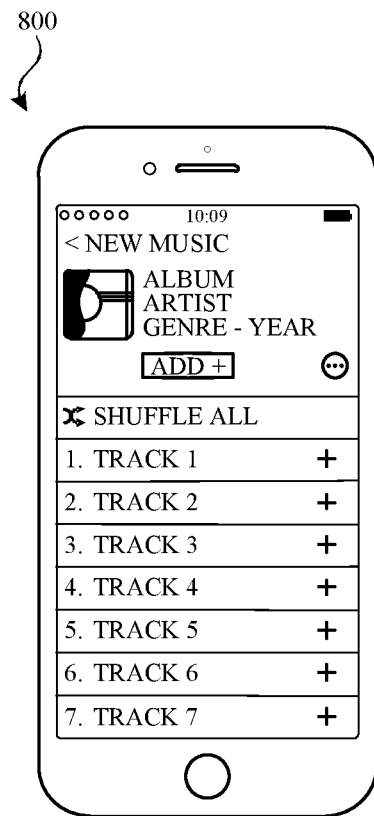
Figure 8I:

At FIG. 8H, device 800 detects lift-off of input 810a. In response to detecting lift-off of input 810a, device 800 transitions to producing audio of track 4, using the left and right speakers, by placing the audio in space (e.g., device 800 applies an interaural time difference, an HRTF, and/or cross cancellation), such that the user perceives the audio as leaving the user's head and moving off to the right of the user, as illustrated by audio element 850b in overhead view 850 of FIG. 8H. In response to detecting lift-off of input 810a, device 800 ceases to blur out the plurality of affordances, as illustrated in FIG. 8H. Further in response to detecting lift-off of input 810a, device 800 optionally begins attenuating the audio of track 4 and then ceasing to produce the audio of track 4, as illustrated by audio element 850b no longer being illustrated in overhead view 850 of FIG. 8I.

Figure 8J:
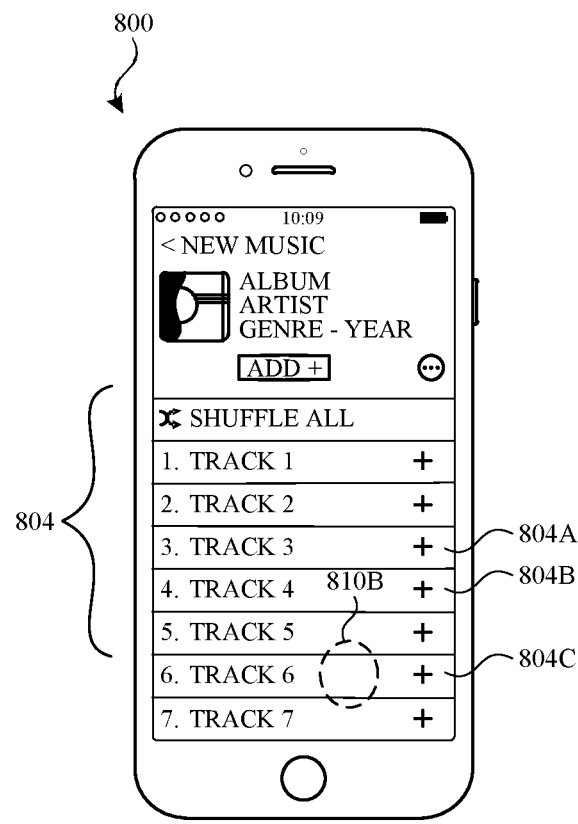
Figure 8J:
Figure 8K:
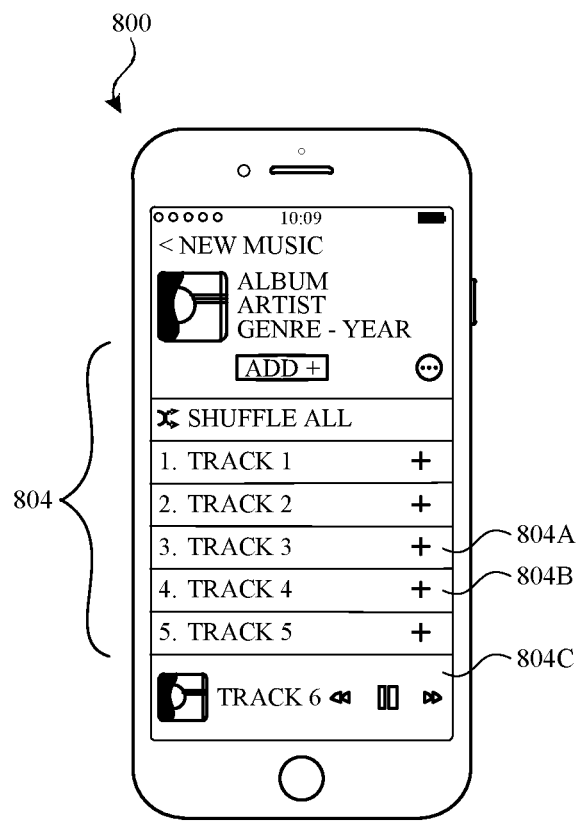
Figure 8K:
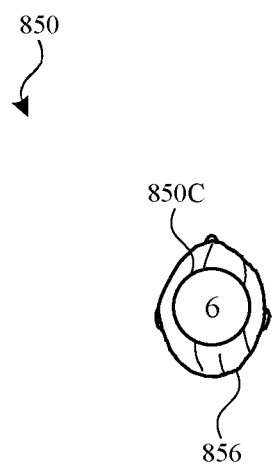

At FIG. 8J, device 800 detects a tap input 810b on affordance 804c for track 6. At FIG. 8K, as illustrated in overhead view 850, device 800 begins produces, using the two or more speakers, audio of track 6 without placing the audio of track 6 in space, as illustrated by audio element 850c in overhead view 850 of FIG. 8J. As a result, the user perceives the audio as being in the user's head. For example, at FIG. 8J, device 800 produces stereo audio of track 6, using the left and right speakers, without placing the audio (e.g., device 800 does not apply any of an interaural time difference, an HRTF, or cross cancellation). Device 800 does not blur out any of the plurality of affordances 804 in response to detecting tap input 810b. Device 800 also optionally updates affordance 804c to include media controls and/or additional information about the track. Track 6 continues to play until reaching the end of the track without playback being limited to a preview of the predetermined audio playback duration.

In some examples, device 800 includes a digital assistant that produces audio feedback, such as returning the results of a query by speaking the results. In some examples, device 800 produces audio for the digital assistant by placing the audio for the digital assistant at a location in space (e.g., over the right shoulder of the user) such that the user perceives the digital assistant as remaining stationary in space even when other audio moves in space. In some examples, device 800 emphasizes the audio for the digital assistant by ducking one or more (or all) other audio.

FIGS. 9A-9C is a flow diagram illustrating a method for previewing audio using an electronic device in accordance with some embodiments. Method 900 is performed at a device (e.g., 100, 300, 500, 800) with a display and a touch-sensitive surface. The electronic device is operably connected with two or more speakers (e.g., left and right speakers, left and right headphones, left and right earphones, left and right earbuds). Some operations in method 900 are, optionally, combined, the orders of some operations are, optionally, changed, and some operations are, optionally, omitted.

As described below, method 900 provides an intuitive way for previewing audio. The method reduces the cognitive burden on a user for previewing audio, thereby creating a more efficient human-machine interface. For battery-operated computing devices, enabling a user to previewing audio faster and more efficiently conserves power and increases the time between battery charges.

The electronic device displays (902), on the display, a list (e.g., in a column) of a plurality of media elements (e.g., 804). Each media element (e.g., 804a-804c) (or at least two media elements) of the plurality of media elements corresponds to a respective media file (e.g., an audio file, a song, a video file). In some examples, the respective media files are all different from each other.

The electronic device detects (904), using the touch-sensitive surface, a user contact (e.g., 810a, a touch-and-hold user input, a touch input that is sustained for greater than a predetermined period of time that is more than 0 seconds) at a location corresponding to a first media element (e.g., 804a).

In response (906) to detecting the user contact (e.g., 810a at FIGS. 8B-8C) at the location corresponding to the first media element (e.g., 804a) and in accordance with the user contact (e.g., 810a) including a touch-and-hold input (e.g., as determined by the electronic device), the electronic device produces, using the two or more speakers, audio (e.g., 850a) using a first audio file that corresponds to the first media element without exceeding a predetermined audio playback duration. For example, the audio plays for a maximum of 5 seconds. For example, the device produces a preview of the audio. In some examples, the predetermined audio playback duration is less than the duration of the audio file.

Further in response (906) to detecting the user contact (e.g., 810a at FIGS. 8B-8C) at the location corresponding to the first media element (e.g., 804a) and in accordance with the user contact (e.g., 810a) including a touch-and-hold input (e.g., as determined by the electronic device) and while (910) the user contact (e.g., 810a) remains (without a lift-off event) at the location corresponding to the first media element (e.g., 804a), and in accordance with the predetermined audio playback duration period not being exceeded, the electronic device continues (912) to produce, using the two or more speakers, audio (e.g., 850a) using the first audio file.

Further in response (906) to detecting the user contact (e.g., 810a at FIGS. 8B-8C) at the location corresponding to the first media element (e.g., 804a) and in accordance with the user contact (e.g., 810a) including a touch-and-hold input (e.g., as determined by the electronic device) and while (910) the user contact (e.g., 810*a*) remains (without a lift-off event) at the location corresponding to the first media element (e.g., 804*a*), and in accordance with the predetermined audio playback duration period being exceeded, the electronic device ceases (914) to produce, using the two or more speakers, audio (e.g., 850*a*) using the first audio file (and, optionally, without beginning to produce audio using a different audio file).

The electronic device detects (916), using the touch-sensitive surface, movement (e.g., 810*a* at FIGS. 8D-8E, downward movement toward the bottom of the display and away from the top of the display) of the user contact from the location that corresponds to the first media element (e.g., 804*a*) to a location that corresponds to a second media element (e.g., 804*b*).

In response (918) to detecting the user contact (e.g., 810*a* at FIG. 8F) at the location corresponding to the second media element and in accordance with the user contact (e.g., 810*a*) including a touch-and-hold input, the electronic device produces (920), using the two or more speakers, audio (e.g., 850*b*) using a second audio file (different from the first audio file) that corresponds to the second media element (e.g., 804*b*) without exceeding the predetermined audio playback duration. For example, the audio plays for a maximum of 5 seconds (less than the total duration of the second audio file).

Further in response (918) to detecting the user contact (e.g., 810*a* at FIG. 8F) at the location corresponding to the second media element and in accordance with the user contact (e.g., 810*a*) including a touch-and-hold input, while (922) the user contact remains (e.g., without a lift-off event) at the location corresponding to the second media element (e.g., 804*b*), and in accordance with the predetermined audio playback duration period not being exceeded, the electronic device continues (924) to produce, using the two or more speakers, audio (e.g., 850*b*) using the second audio file.

Further in response (918) to detecting the user contact (e.g., 810*a* at FIG. 8F) at the location corresponding to the second media element and in accordance with the user contact (e.g., 810*a*) including a touch-and-hold input, while the user contact remains (e.g., without a lift-off event) at the location corresponding to the second media element (e.g., 804*b*), and in accordance with the predetermined audio playback duration period being exceeded, the electronic device ceases (926) to produce, using the two or more speakers, audio (e.g., 850*b*) using the second audio file (and, optionally, without beginning to produce audio using a different audio file).

The electronic device detects (928), using the touch-sensitive surface, a lift-off of the user contact (e.g., 810*a* at FIGS. 8G and 8H).

In response (930) to detecting the lift-off of the user contact, the electronic device ceases (932) to produce, using the two or more speakers, audio (e.g., 850*a* and 850*b* at FIG. 8I) using the first audio file or the second audio file (and, optionally, ceasing to produce any audio using audio files that correspond to the plurality of media elements). Thus, playback of any song being previewed ceases.

In accordance with some embodiments, further in accordance with (906) the user contact including a touch-and-hold input (e.g., as determined by the electronic device), producing audio using the first audio file without exceeding a predetermined audio playback duration includes transitioning the audio among a plurality of modes, including: a first mode, a second mode that is different from the first mode (e.g., 850*a* at FIG. 8D, 850*b* at FIG. 8F), and a third mode that is different from the first mode and the second mode.

Producing audio with varying characteristics also provides the user with contextual feedback about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In accordance with some embodiments, the first mode is configured such that audio produced using the first mode is perceived by the user as being produced from a first direction (e.g., 850*a* at FIG. 8C, 850*b* at FIG. 8E) (and optionally, location). In some examples, the first direction is a direction originating at a location that is to the left of the user (e.g., not in front of the user). In some examples, the electronic device modifies the source audio before producing the audio such that the audio is perceived by a user as being produced from a direction originating at a location that is to the left of the display or user.

In accordance with some embodiments, the second mode is configured such that audio produced using the second mode is perceived by the user as being in the user's head (e.g., stereo, not a point source). For example, the second mode does not include applying any of HRTF, interaural time difference of audio, or cross cancellation.

In accordance with some embodiments, the third mode is configured such that audio produced using the third mode is perceived by the user as being produced from a third direction different from the first direction (e.g., 850*a* at FIG. 8F, 850*b* at FIG. 8H). In some examples, the third direction is a direction originating at a location that is to the right of the user (e.g., not in front of the user). In some examples, the electronic device modifies the source audio before producing the audio such that the audio is perceived by a user as being produced from a direction originating at a location that is to the right of the display or user.

In accordance with some embodiments, the first mode includes a first modification of an interaural time difference of audio and the third mode includes a second modification of an interaural time difference of audio, different from the first modification. In some examples, the first mode includes a first degree modification of the interaural time difference of audio and the third mode includes a second degree modification, larger than the first degree, of the interaural time difference of audio. In some examples, the first mode includes a modification of an interaural time difference of audio such that the audio is perceived by a user as being produced from a direction originating at a location that is to the left of the display or user. In some examples, the third mode includes a modification of an interaural time difference of audio such that the audio is perceived by a user as being produced from a direction originating at a location that is to the right of the display or user. Modifying an interaural time difference of audio enables the user to perceive the audio as coming from a particular direction. This directional information in the audio provides the user with additional feedback about the about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In some embodiments, audio produced in the first mode (e.g., 850*a* at FIG. 8C) is modified using one or more of an HRTF, an interaural time different of audio, and cross cancellation. In some examples, audio produced in the second mode (e.g., 850a at FIG. 8D) is not modified using any of an HRTF, an interaural time different of audio, or cross cancellation. In some examples, audio produced in the third mode (e.g., 850a at FIG. 8F) is modified using one or more of an HRTF, an interaural time different of audio, and cross cancellation.

In accordance with some embodiments, the second mode does not include a modification of an interaural time difference of audio. In some examples, audio produced in the second mode is not modified using an HRTF. In some examples, audio produced in the second mode (e.g., 850a at FIG. 8D) is not modified using any of an HRTF, an interaural time different of audio, or cross cancellation.

In accordance with some embodiments, modification of the interaural time difference of audio includes: combining a first channel audio (e.g., a right channel) of the audio and a second channel audio (e.g., a left channel) of the audio to form a combined channel audio, updating the second channel audio to include the combined channel audio at a first delay (e.g., 0 ms delay, less than a delay amount), updating the first channel audio to include the combined channel audio at a second delay (e.g., a 100 ms delay, more than the delay amount) different from the first delay. In some examples, modifying the interaural time difference of audio includes introducing a time delay to a first channel audio (e.g., a right channel) without introducing a time delay to the second channel audio (e.g., a left channel) that is different from the first audio channel. Modifying an interaural time difference of audio enables the user to perceive the audio as coming from a particular direction. This directional information in the audio provides the user with additional feedback about the about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In accordance with some embodiments, further in response (906) to detecting the user contact (e.g., 810a) at the location corresponding to the first media element (e.g., 804a), changing a first visual characteristic (e.g., focus/blur level) of the displayed media elements in the plurality of media elements (e.g., 804b at FIG. 8C) other than the first media element (e.g., 804a at FIG. 8C). In response to detecting the user contact (e.g., 810a) at the location corresponding to the second media element (e.g., 804ba), reverting the change of the first visual characteristic of the second media element (e.g., 804b at FIG. 8E) and changing the first visual characteristic of the first media element (e.g., 804a at FIG. 8E). In some examples, the electronic device fades the media elements that are not activated. In some examples, the electronic device adds a blur effect to the media elements that are not activated. In some examples, the electronic device changes a color of the media elements that are not activated. Visually differentiating content being played from content not being played provides the user with feedback about the state of the device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting the user contact at the location corresponding to the first media element, the electronic device changes a second visual characteristic of the first media element without changing the second visual characteristic of the displayed media elements in the plurality of media elements other than the first media element. In response to detecting the user contact at the location corresponding to the second media element, the electronic device reverts the change of the second visual characteristic of the first media element and changes the second visual characteristic of the second media element. In some examples, the electronic device highlights the media element that is activated. In some examples, the electronic device brightens the media element that is activated. In some examples, the electronic device changes a color of the media elements that is activated. Visually differentiating content being played from content not being played provides the user with feedback about the state of the device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting the user contact at the location corresponding to the first media element and in accordance with the user contact including a tap input (e.g., as determined by the electronic device), the electronic device produces audio using the first audio file that corresponds to the first media element without automatically ceasing to produce audio using the first audio after the predetermined audio playback duration and without automatically ceasing to produce audio using the first audio file upon detecting lift-off of the user contact. For example, the audio plays for longer than the preview time of 5 seconds.

In accordance with some embodiments, in accordance with the user contact including a tap input (e.g., as determined by the electronic device), producing audio using the first audio file includes producing audio using the first audio file in the second mode without transitioning the audio among the first mode and the third mode of the plurality of modes.

Note that details of the processes described above with respect to method 900 (e.g., FIGS. 9A-9C) are also applicable in an analogous manner to the methods described below and above. For example, methods 700, 1200, 1400, and 1500 optionally include one or more of the characteristics of the various methods described above with reference to method 900. For example, the same or similar techniques are used to place audio in space. For another example, the same audio sources may be used in the various techniques. For yet another example, currently playing audio in each of the various methods can be manipulated using the techniques described in other methods. For brevity, these details are not repeated below.

FIGS. 10A-10K illustrate exemplary techniques for discovering music, in accordance with some embodiments. The techniques in these figures are used to illustrate the processes described below, including the processes in FIGS. 12A-12B.

FIGS. 10A-10K illustrate device 1000 (e.g., a mobile phone) with a display, a touch-sensitive surface, and left and right speakers (e.g., headphones). Overhead view 1050 is a visual depiction of the spatial organization of audio being produced by device 1000 and is illustrated throughout FIGS. 10A-10K to provide the reader with a better understanding of the techniques, in particular with respect to locations from which the user 1056 perceives the sounds as coming from (e.g., as a result of device 1000 placing audio in space). Overhead view 1050 is not part of the user interface of device 1000. Similarly, visual elements displayed outside of the display device are not part of the displayed user interface, as represented by dotted outlines, but are illustrated to provide the reader with a better understanding of the techniques. In some examples, the techniques described below enable users to more easily and efficiently discover new songs from a song repository.

Figure 10A:
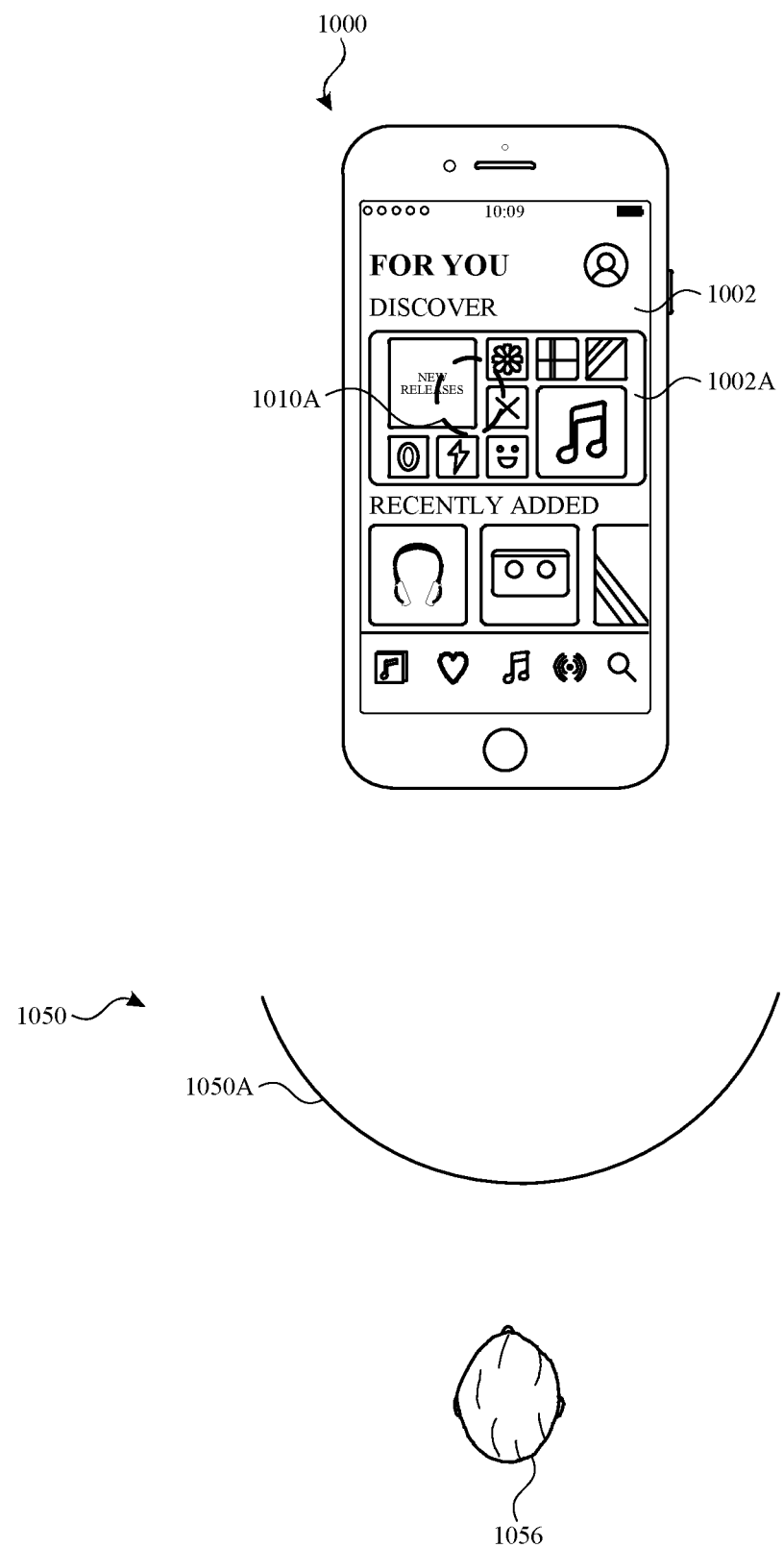
FIGS. 10A-10K illustrate exemplary techniques for discovering music, in accordance with some embodiments.

At FIG. 10A, device 1000 displays a music player 1002 that includes an affordance 1002a for discovering new audio content. At FIG. 10A, device 1000 is not producing any audio, as illustrated by the lack audio elements in overhead view 1050 of FIG. 10A. While device 1000 is not producing any audio, device 1000 detects tap input 1010a on affordance 1002a. In response to detecting tap input 1010a on affordance 1002a, device 1000 enters a discovery mode.

Figure 10B:
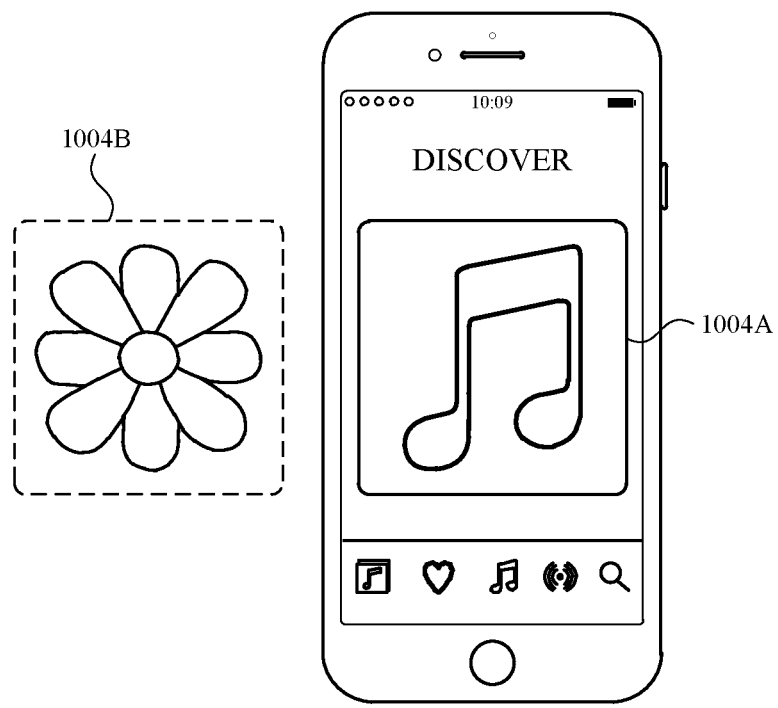
Figure 10B:
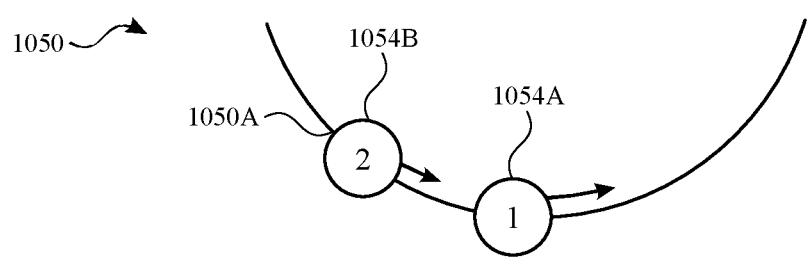
Figure 10B:
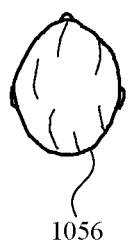

At FIG. 10B, device 1000 replaces display of affordance 1002a with display of album art 1004a. Album art 1004a corresponds to a first song (e.g., the album art is of the album that the song belongs to) and album art 1004b corresponds to a second song different from the first song. Audio element 1054a corresponds to the first song and audio element 1054b corresponds to the second song.

At FIG. 10B, device 1000 produces audio of the first song and the second song, using the left and right speakers, by placing audio of the first song and the second song in space (e.g., device 1000 applies an interaural time difference, an HRTF, and/or cross cancellation) along path 1050a. For example, path 1050a is a fixed path that is curved, along which the device places the audio of the various songs while in the discovery mode. Device 100 produces audio of the first song and the second song and updates the placement of the audio such that the user perceives the audio of the song as drifting in front of the user from left to right along path 1050a, as illustrated by audio element 1054a and audio element 1054b in overhead view 1050 of FIGS. 10B-10G. In some examples, the direction at which the songs move along the path 1050a is not based on input provided by the user (e.g., not based on tap input 1010a).

Figure 10C:
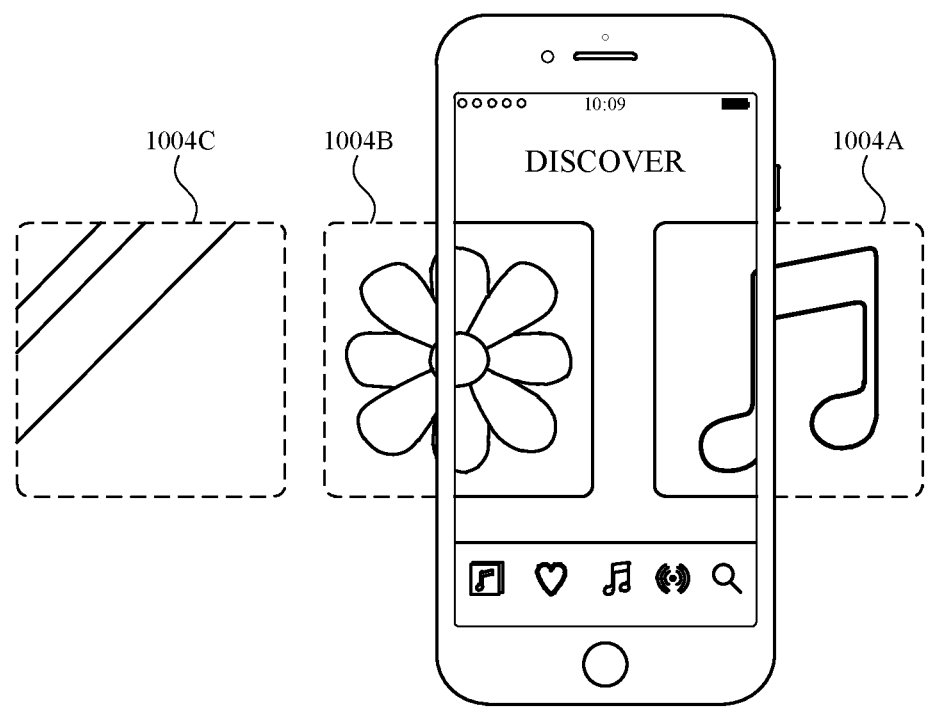
Figure 10C:
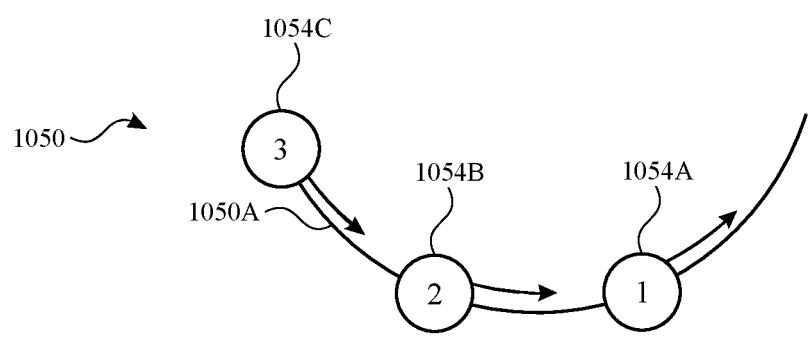
Figure 10C:

At FIG. 10C, as the first song and the second song progress along path 1050a, device 1000 begins producing audio of a third song, using the left and right speakers, by placing and transitioning the audio in space (e.g., device 1000 applies an interaural time difference, an HRTF, and/or cross cancellation), such that the user perceives the audio as drifting in front of the user from left to right along path 1050a, as illustrated by audio element 1054c in overhead view 1050 of FIGS. 10C-10G.

Figure 10D:
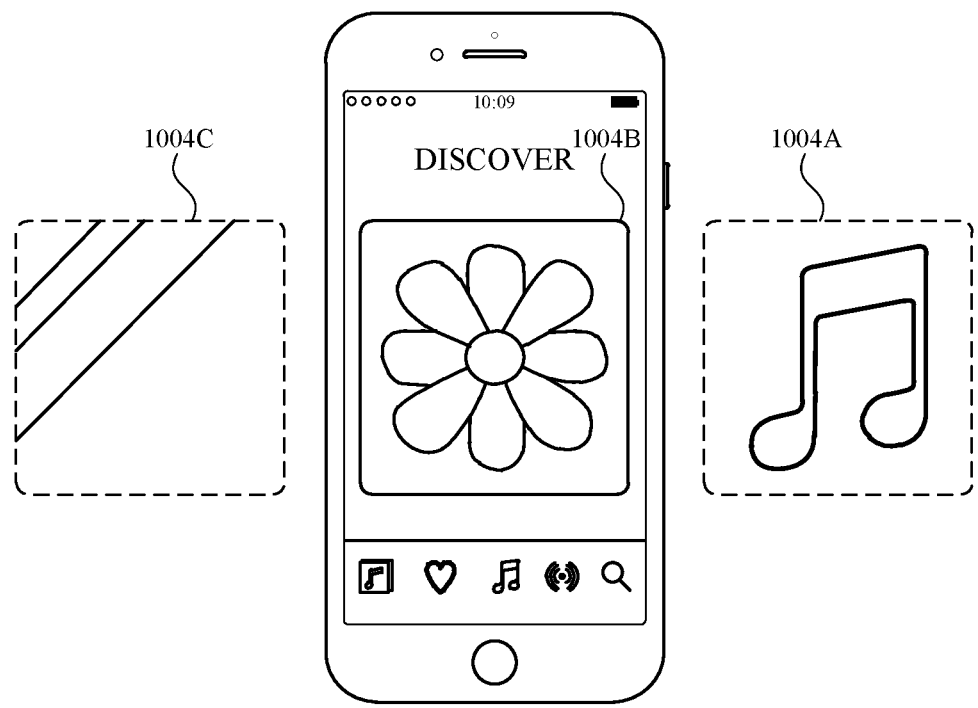
Figure 10D:
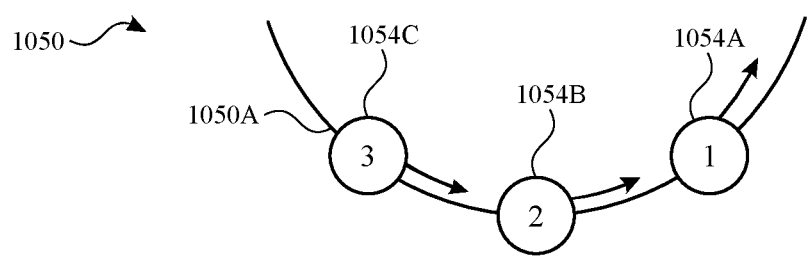
Figure 10D:
Figure 10E:
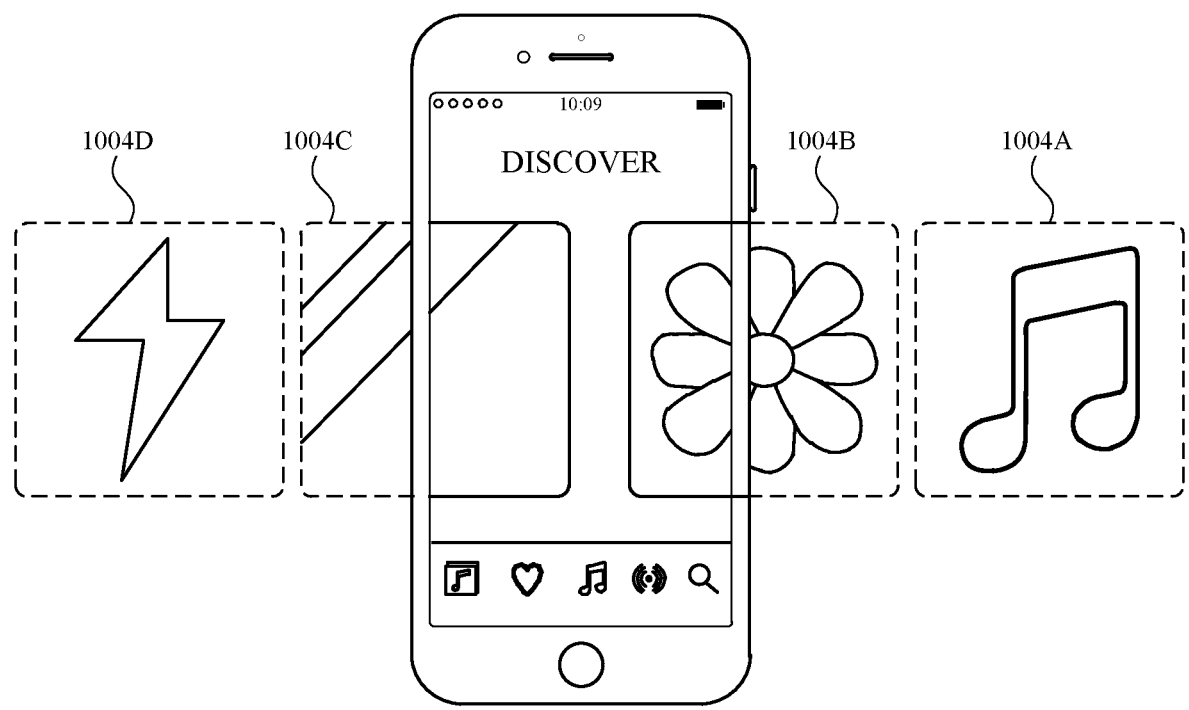
Figure 10E:
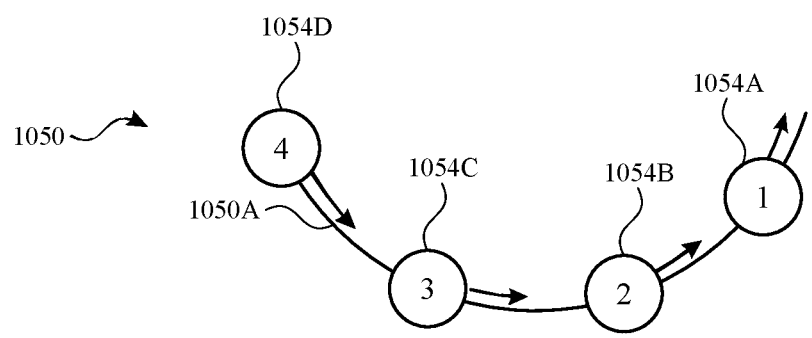
Figure 10E:
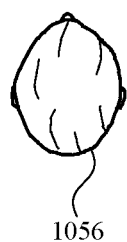
Figure 10F:
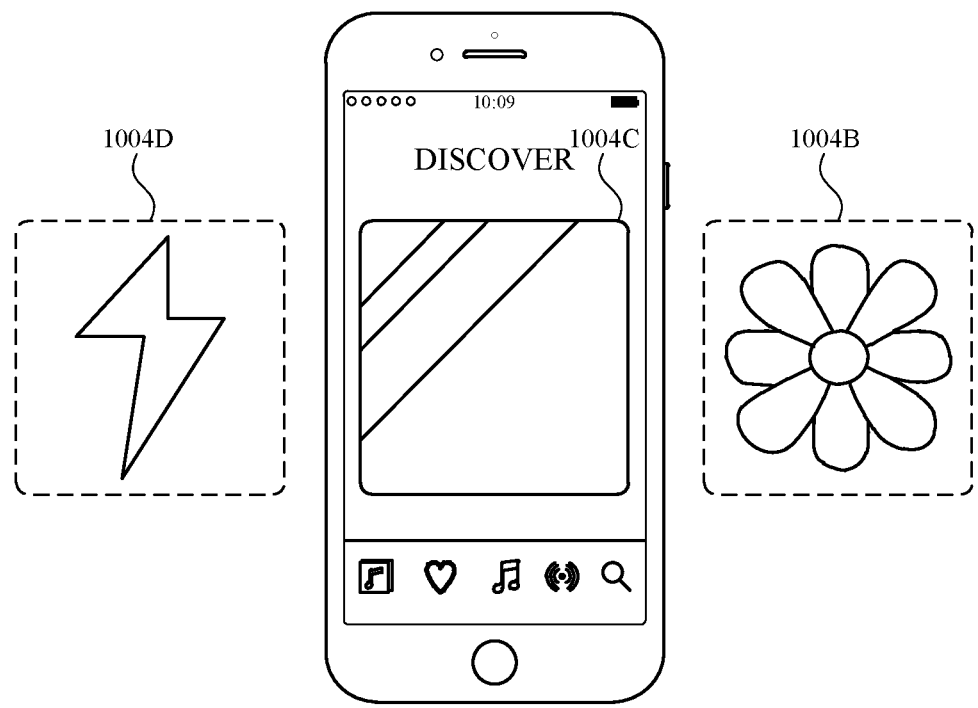
Figure 10F:
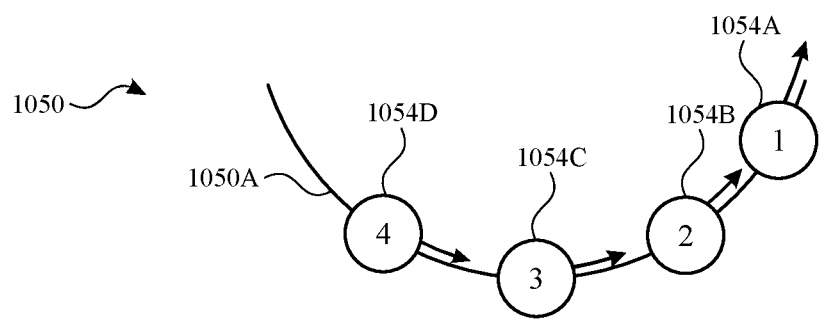
Figure 10F:

At FIGS. 10D-10F, device 1000 begins producing additional audio of songs (while continuing to produce audio of the first song and the second song), using the left and right speakers, by placing and transitioning the audio of the respective songs in space (e.g., device 1000 applies an interaural time difference, an HRTF, and/or cross cancellation) such that the user perceives the audio as drifting in front of the user from left to right along path 1050a, as illustrated by audio elements 1054a-1054e in overhead view 1050 of FIGS. 10C-10G. In some examples, device 1000 places the songs at equal distances apart (e.g., perceived from the user as being 2 meters to 3 meters apart) along path 1050a. In some examples, the distance between songs changes (e.g., increases) as the songs get closer to a point on path 1050a (e.g., a point in front of the user) and the distance between songs changes (e.g., decreases) as the songs get further from the point on path 1050a. In some examples, each song moves at the same speed along path 1050a. In some examples, device 1000 ceases to produce songs that reach a certain point along path 1050a (e.g., they get more than a threshold distance away from the user). In some examples, device 1000 attenuates songs based on their position along path 1050a (e.g., the further from the user the more attenuated the song).

As illustrated in FIGS. 10B-10I, album art 1004a-1004e correspond to the various songs. Device 1000 displays respective album art for songs placed in front of the user. For example, device 1000 displays album art that corresponds to songs that are placed along a certain subset of path 1050a. The displayed album art moves in the same direction on the display as the various audio moves along path 1050a (e.g., left to right).

The first song (visualized as audio element 1054a in overhead view 1050) corresponds to album art 1004a (e.g., the album art is of the album that the song belongs to). The second song (visualized as audio element 1054b in overhead view 1050) corresponds to album art 1004b. The third song (visualized as audio element 1054c in overhead view 1050) corresponds to album art 1004c. The fourth song (visualized as audio element 1054d in overhead view 1050) corresponds to album art 1004d. The fifth song (visualized as audio element 1054e in overhead view 1050) corresponds to album art 1004e.

Figure 10G:
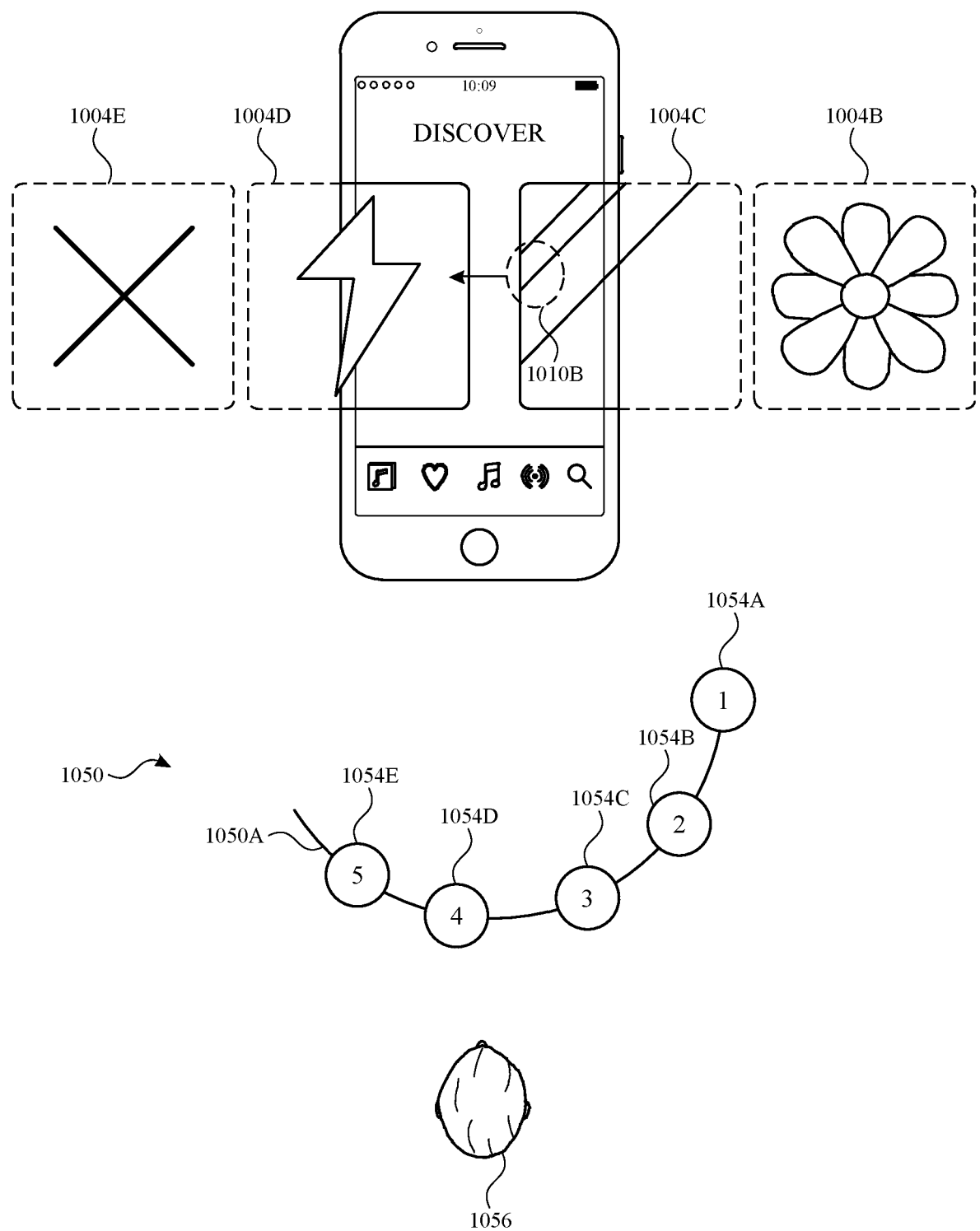
Figure 10H:
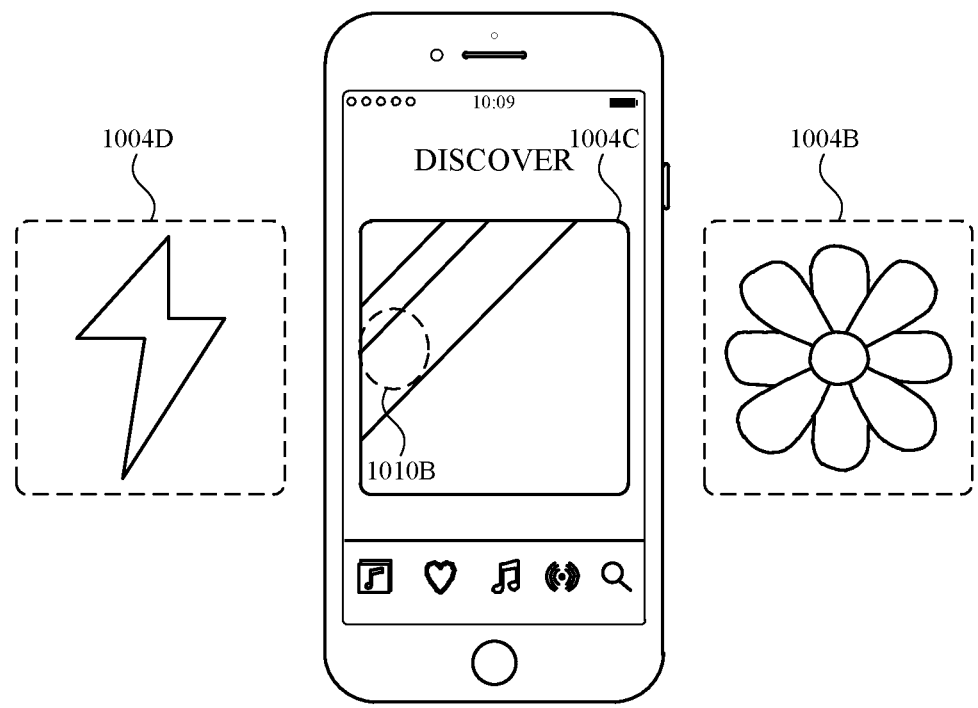
Figure 10H:
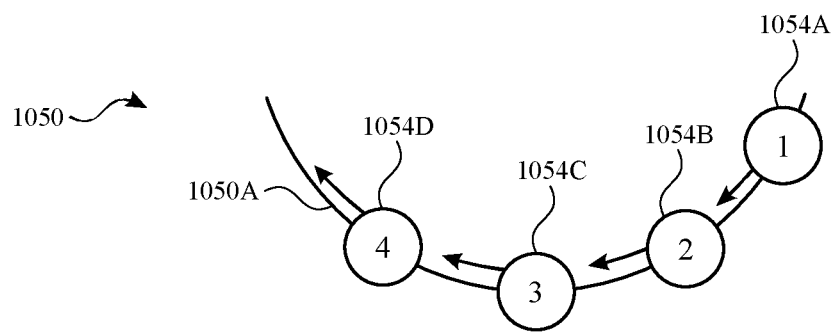
Figure 10H:
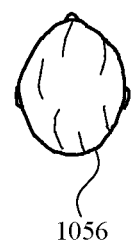

At FIGS. 10G-10H, device 1000 detects a left-swipe input 1010b. In response to detecting the left-swipe input 1010b, device 1000 changes the direction at which the album art moves on the display to correspond to the left-swipe input 1010b and changes the direction along which the various audio moves along path 1050a to correspond to the left-swipe input 1010b. At FIG. 10G, when the user places their finger on the touch-sensitive surface, the album art 1004d and 1004c stops moving on the display and the audio corresponding to audio elements 1054a-1054e stop moving along path 1050a. At FIG. 10H, as device 1000 detects the left-swipe input 1010b from the right to the left, device 100 updates the display such that album art 1004d and 1004c moving on the display from the right to the left and the audio corresponding to audio elements 1054a-1054e move along path 1050a from the right to the left. In some examples, the speed at which the album art 1004a-1004e move across the display and the speed at which audio corresponding to audio elements 1054a-1054e move along path 1050a are based on one or more characteristics (e.g., length, speed, characteristic intensity) of left-swipe input 1010b. In some examples, a faster swipe results in faster movement of the album art on the display and the audio along path 1050a. In some examples, a longer swipe results in faster movement of the album art on the display and the audio along path 1050a.

Figure 10I:
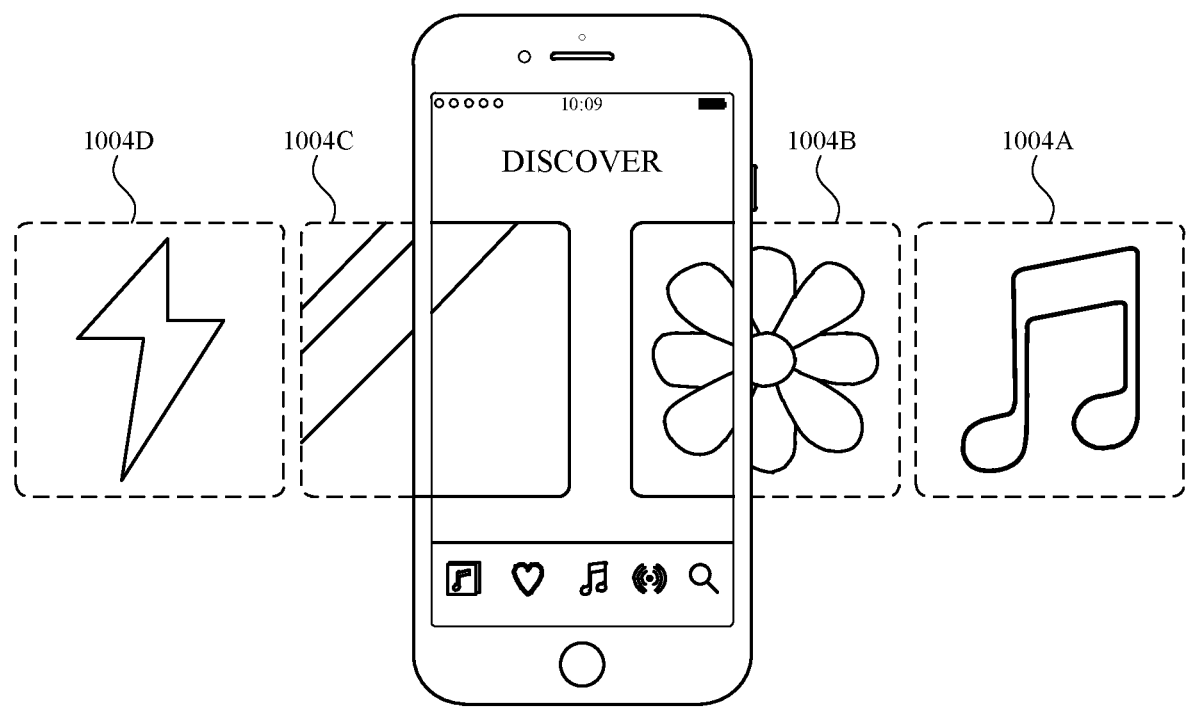
Figure 10I:
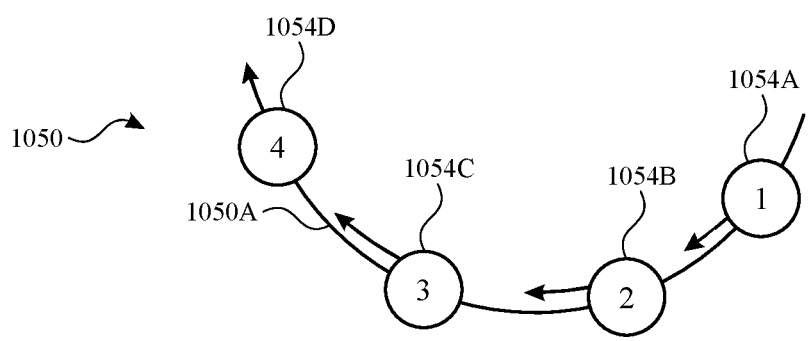
Figure 10I:

At FIG. 10I, after device 1000 stops detecting left-swipe input 1010b, device 1000 continues to display album art 1004a-1004e moving across the display from the left to the right and audio corresponding to audio elements 1054a-1054e continue to move along path 1050a from the left to the right. Thus, the left-swipe input 1010b has changed the direction at which the user perceives the audio move along path 1050a and has changed the direction at which device 1000 moves the corresponding album art on the display.

Figure 10J:
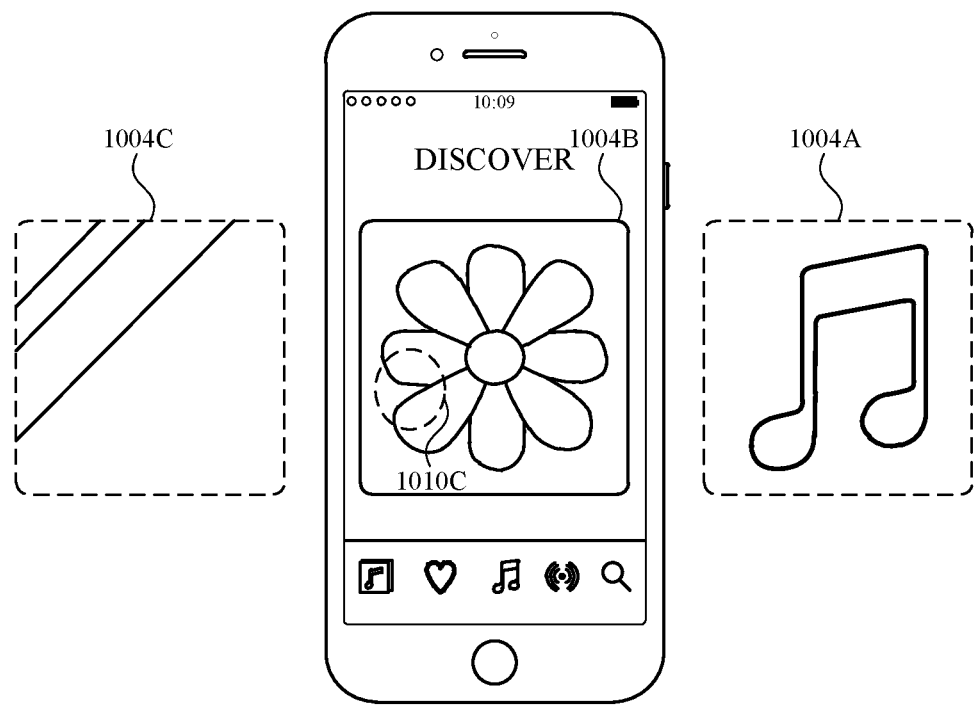
Figure 10J:
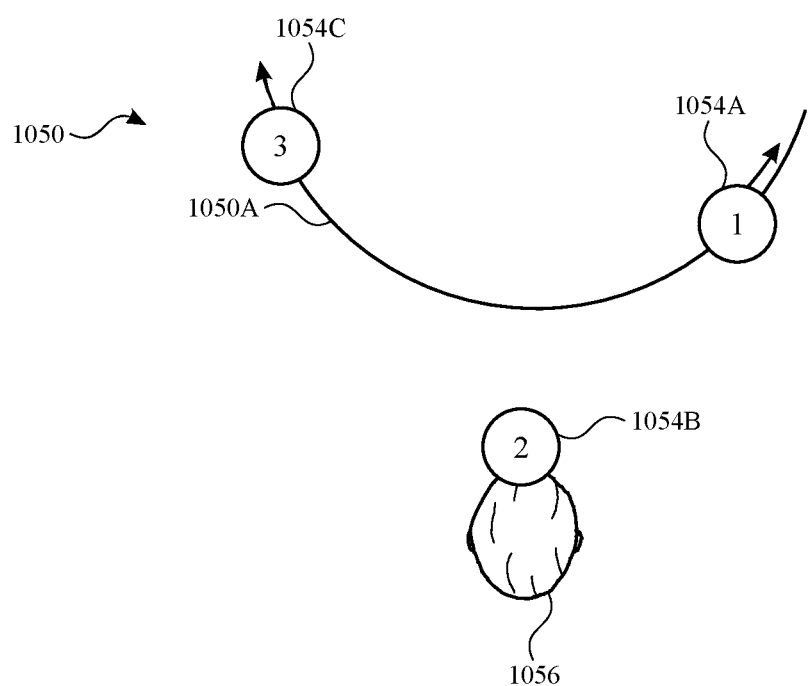
Figure 10K:
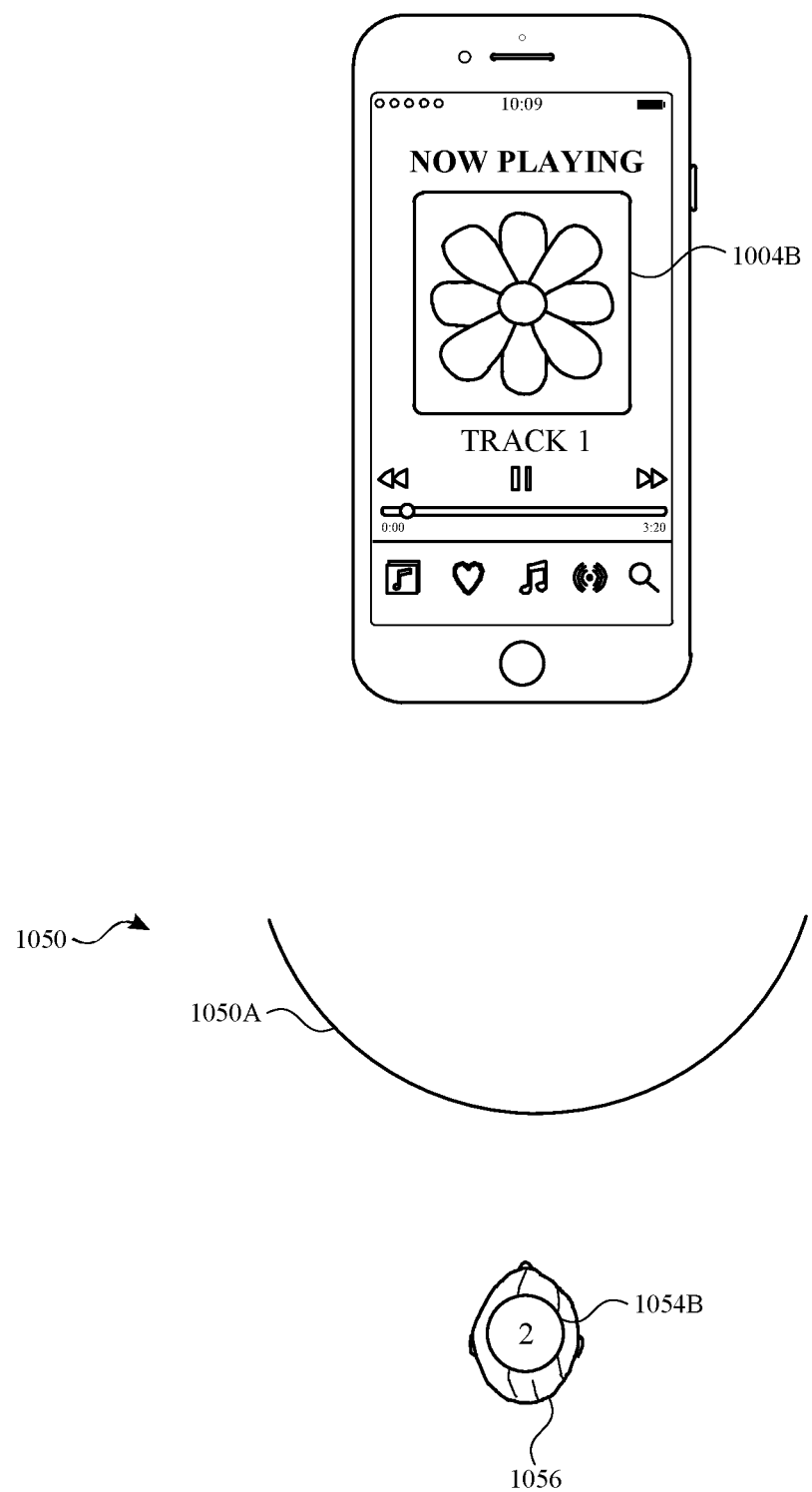

At FIG. 10J, device 1000 detects tap input 1010c on album art 1004b. In response to detecting tap input 1010c on album art 1004b, as illustrated in FIGS. 10J-10K, device 1000 transitions to producing, using the left and right speakers, audio of the second song that corresponds to album art 1004b without placing the audio (e.g., device 1000 does not apply any of an interaural time difference, an HRTF, or cross cancellation). For example, as a result of not placing the audio in space, a user of device 1000 wearing headphones perceives the audio of the second song as being in the head of the user, as illustrated by audio element 1054*b* in overhead view 1050 of FIG. 10K. Further in response to detecting tap input 1010*c* on album art 1004*b*, as illustrated in FIGS. 10J-10K, device 1000 moves the audio corresponding to audio elements 1054*c* and 1054*a* in opposite directions away from the user before ceasing to produce the audio corresponding to audio elements 1054*c* and 1054*a*. Thus, the user perceives the audio of the unselected songs as floating away.

In some examples, device 1000 includes a digital assistant that produces audio feedback, such as returning the results of a query by speaking the results. In some examples, device 1000 produces audio for the digital assistant by placing the audio for the digital assistant at a location in space (e.g., over the right shoulder of the user) such that the user perceives the digital assistant as remaining stationary in space even when other audio moves in space. In some examples, device 1000 emphasizes the audio for the digital assistant by ducking one or more (or all) other audio.

FIGS. 11A-11G illustrate exemplary techniques for discovering music, in accordance with some embodiments. FIGS. 11A-11G illustrate exemplary user interfaces for display by a device (e.g., a laptop) with a display, a touch-sensitive surface (e.g., 1100), and left and right speakers (e.g., headphones). Touch-sensitive surface 1100 of the device is illustrated to provide the reader with a better understanding of the techniques described, in particular with respect to exemplary user inputs. Touch-sensitive surface 1100 is not part of the displayed user interface of the device. Overhead view 1150, which is illustrated throughout FIGS. 11A-11G, is displayed by the device. Overhead view 1150 is also a visual depiction of the spatial organization of audio being produced by the device and provides the reader with a better understanding of the techniques, in particular with respect to locations from which the user 1106 perceives the sounds as coming from (e.g., as a result of the device placing audio in space). The arrows of audio elements 1150*a*-1150*g* indicate the direction and speed with which the audio elements 1150*a*-1150*g* are moving (including visual display and as perceived by the user through the speakers) and provide the reader with a better understanding of the techniques. In some examples, the displayed user interface does not include the arrows of audio elements 1150*a*-1150*g*. Similarly, visual elements displayed outside of the display of the device are not part of the displayed user interface, but are illustrated to provide the reader with a better understanding of the techniques. In some examples, the techniques described below enable users to more easily and efficiently discover new songs from a song repository.

FIGS. 11A-11D illustrate the device displaying representation 1106 of the user in space. The device also illustrated audio elements 1150*a*-1150*f*, which correspond to songs 1-6, respectively, in the same space. The device concurrently produces, using left and right speakers) audio for each of songs 1-6 by placing and transitioning the individual songs in space (e.g., the device applies an interaural time difference, an HRTF, and/or cross cancellation) such that the user perceives the audio of the songs drifting past the user, as illustrated by audio elements 1150*a*-1150*f* in overhead view 1150 of FIGS. 11A-11D. In some examples, the audio elements are displayed such that they are equidistant from each other. In some examples, the audio produced is placed such that the user perceives the song sources as being equidistant from each other. In FIG. 6A, for example, the user perceives song 1 (corresponding to audio element 1150*a*) and song 2 (corresponding to audio element 1150*b*) as being substantially in front of the user, song 6 (corresponding to audio element 1150*f*) as being substantially to the right of the user, and song 4 (corresponding to audio element 1150*d*) as being substantially to the left of the user. As the device continues producing the songs, the user perceives the audio sources passing by. For example, in FIG. 11D, the user perceives song 6 as being substantially behind the user. This allows the user to concurrently to listen various songs.

Figure 11A:
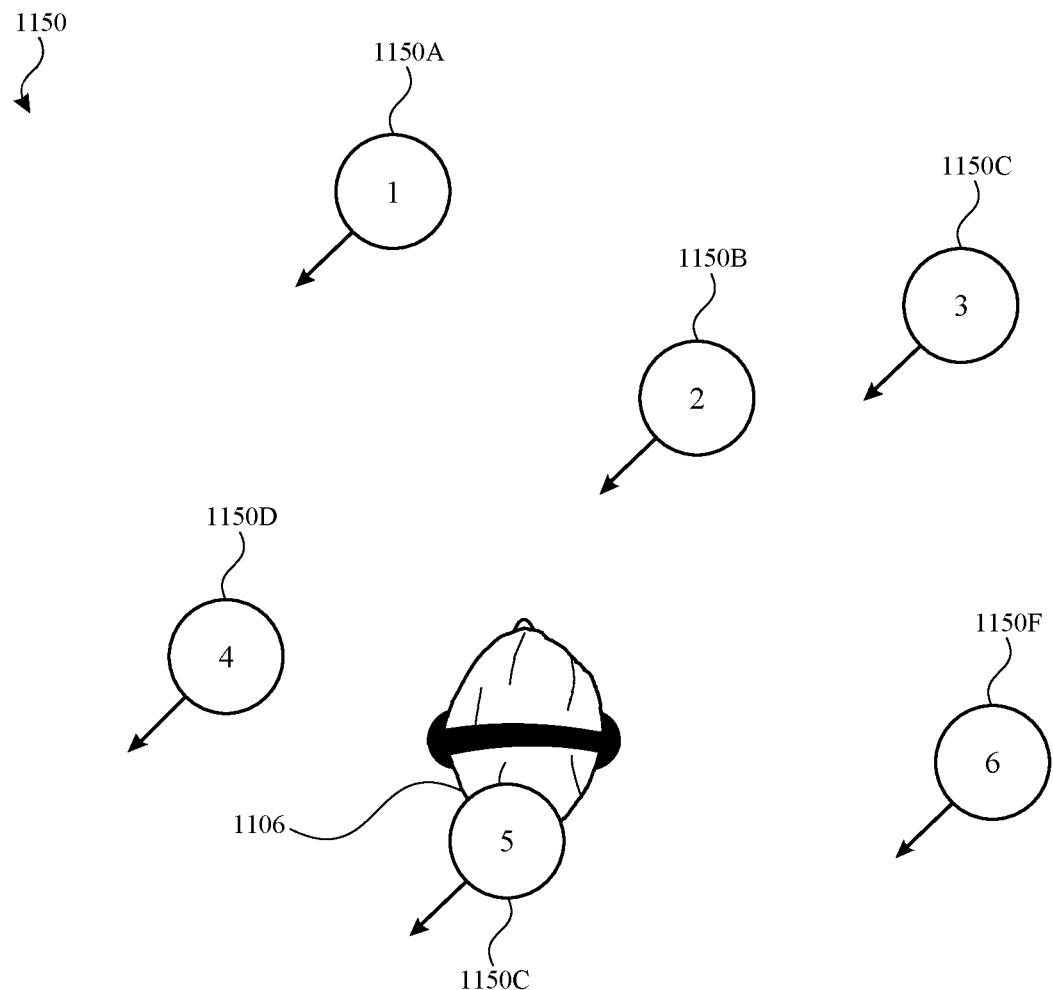
FIGS. 11A-11G illustrate exemplary techniques for discovering music, in accordance with some embodiments.
Figure 11B:
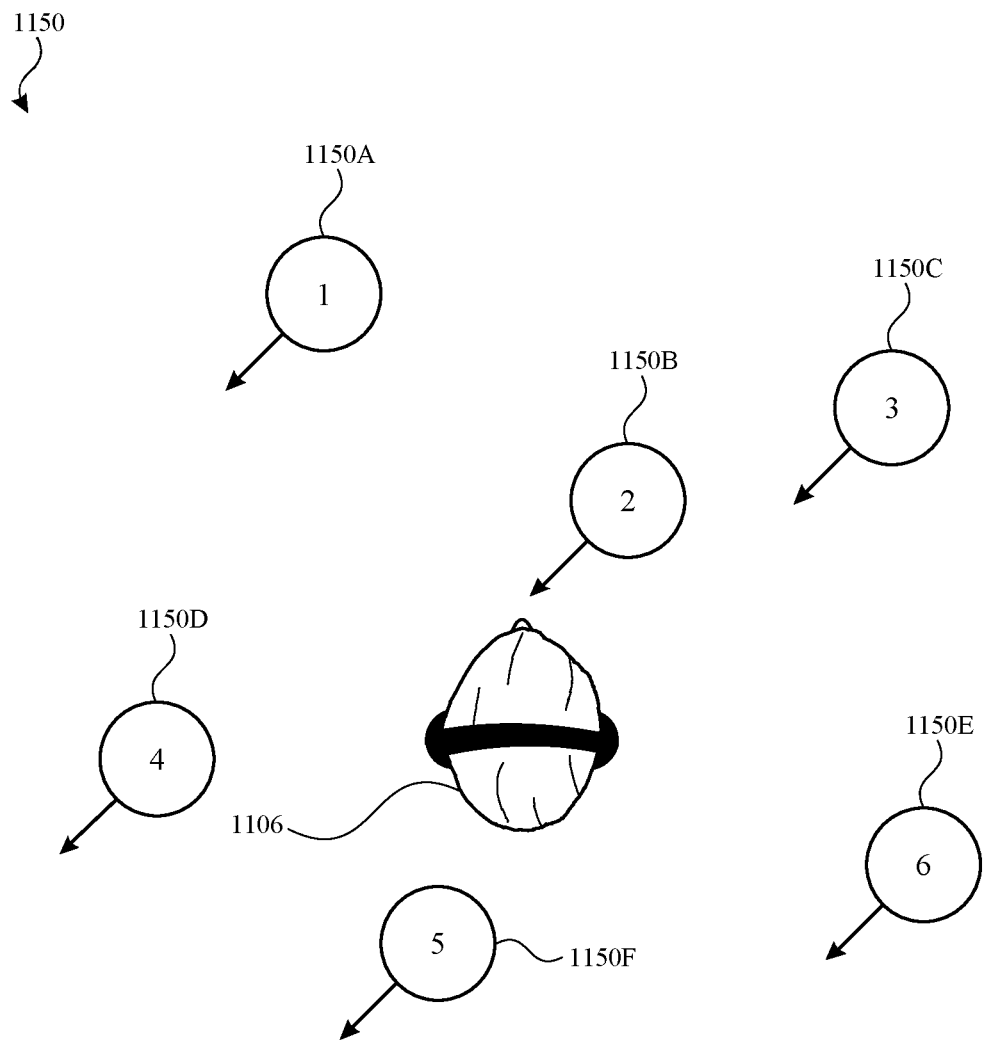
Figure 11C:
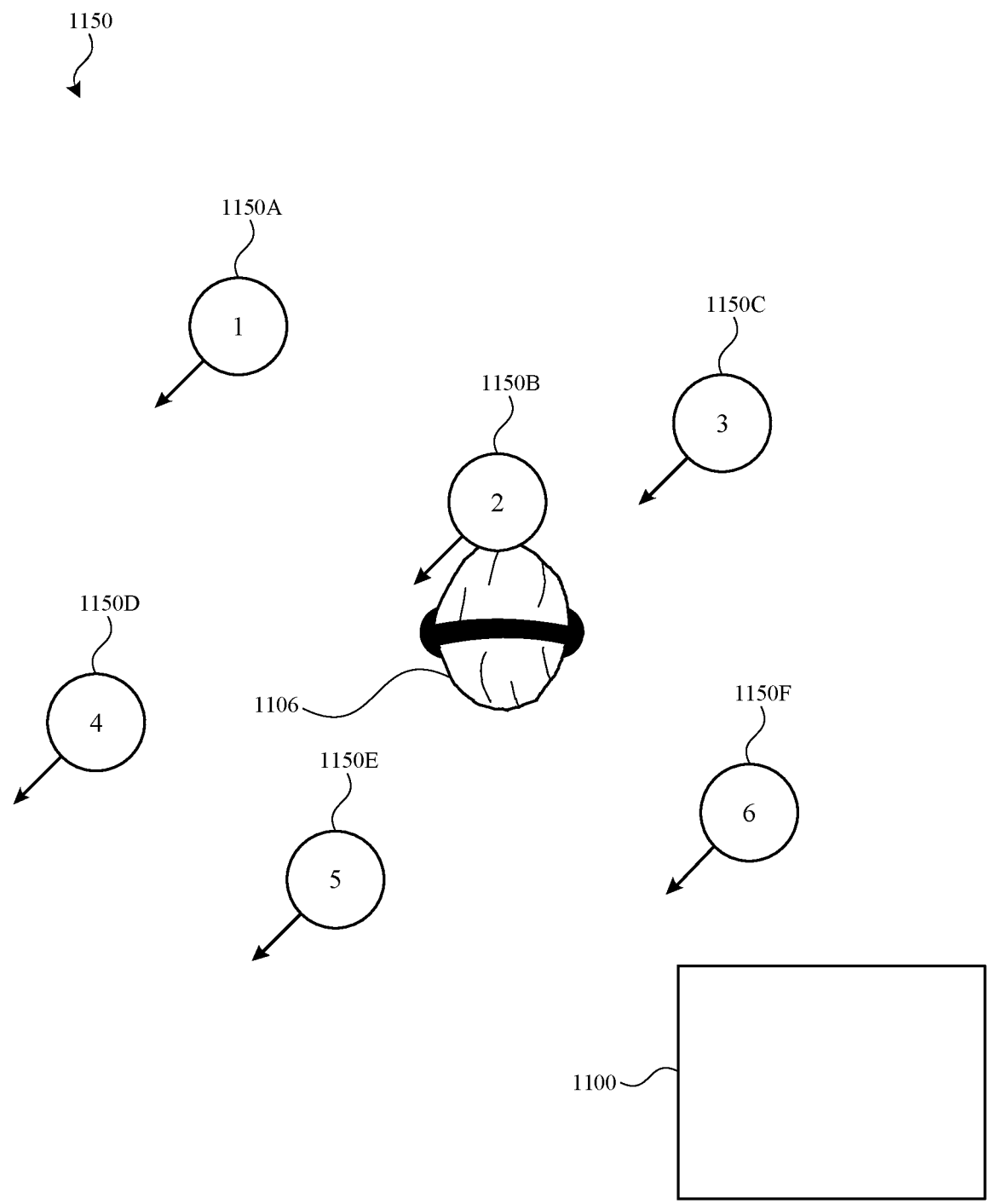
Figure 11D:
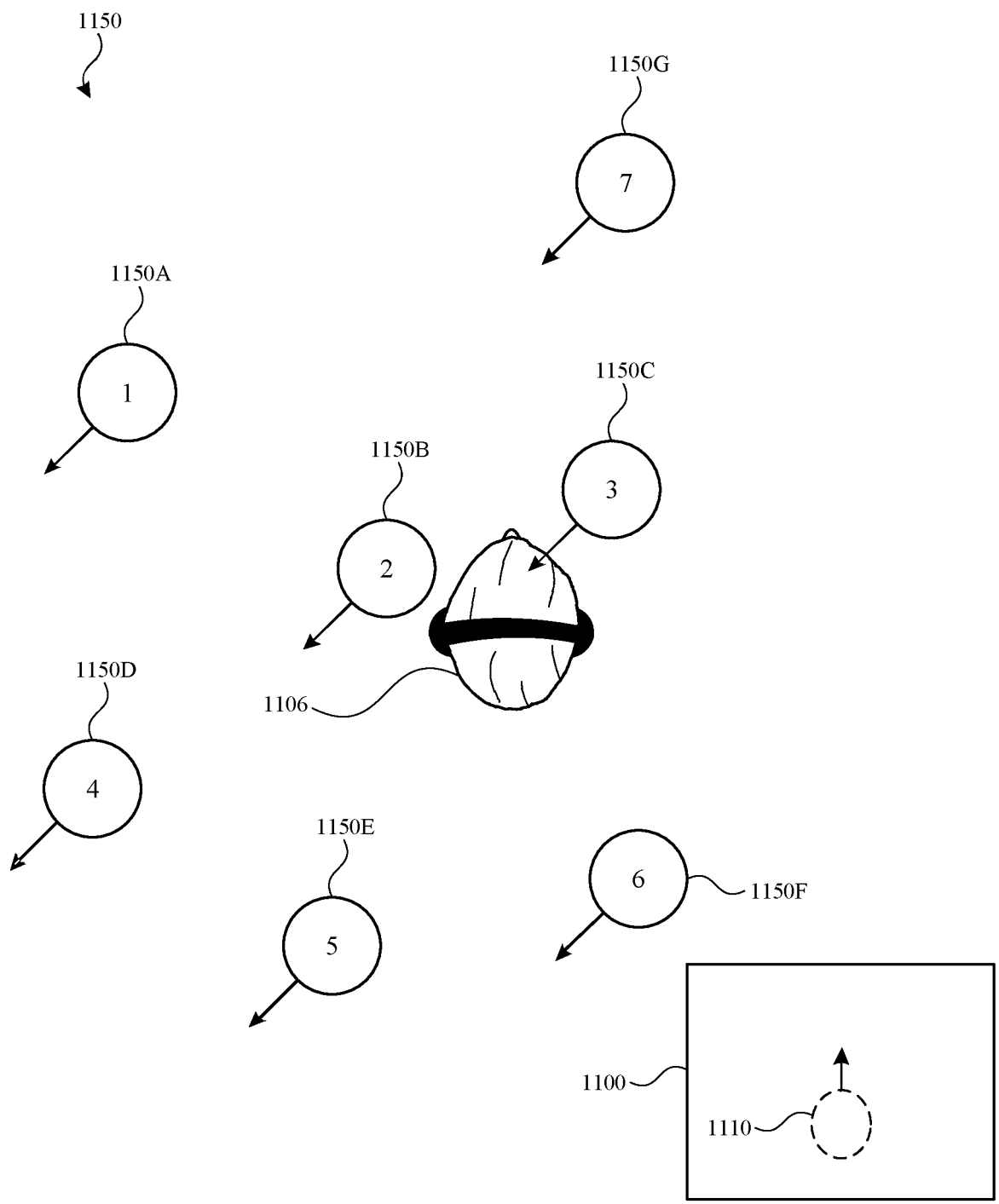
Figure 11E:
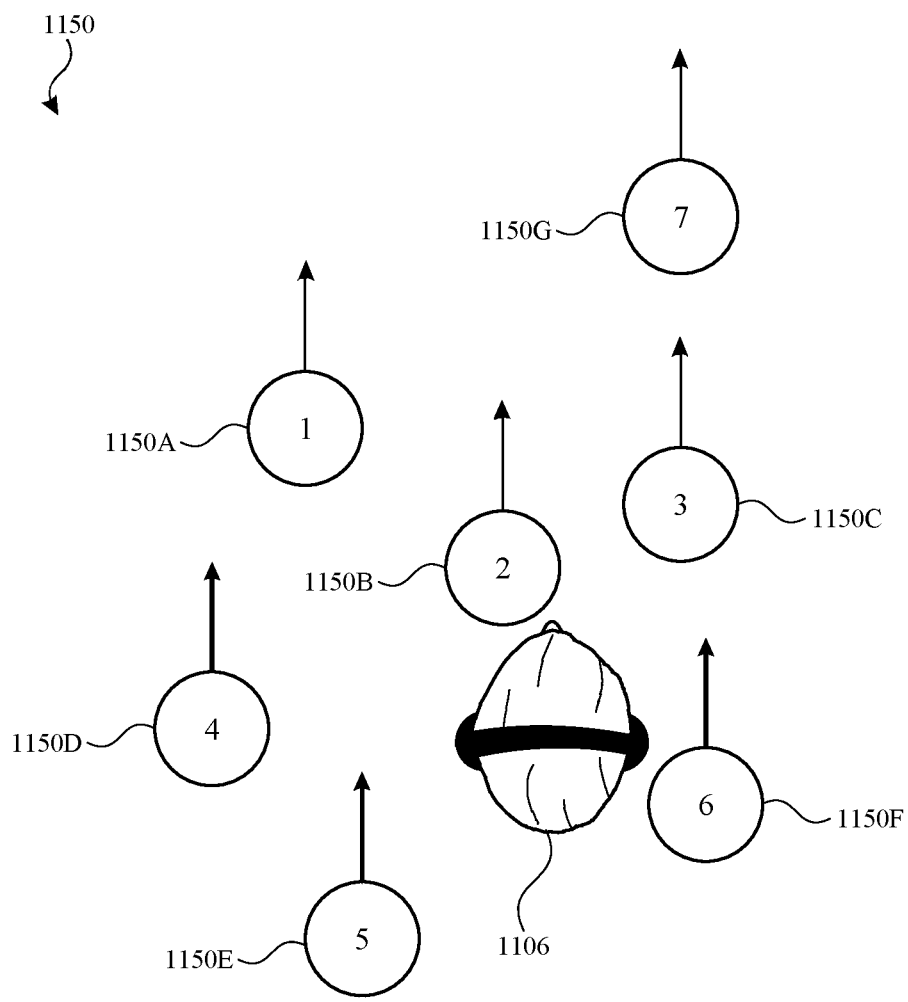
Figure 11E:
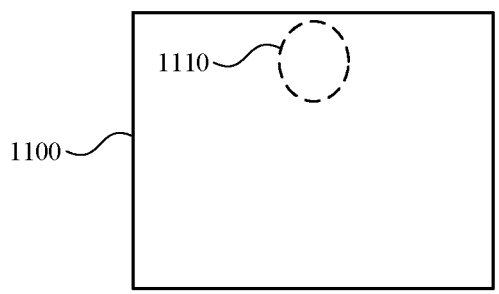
Figure 11F:
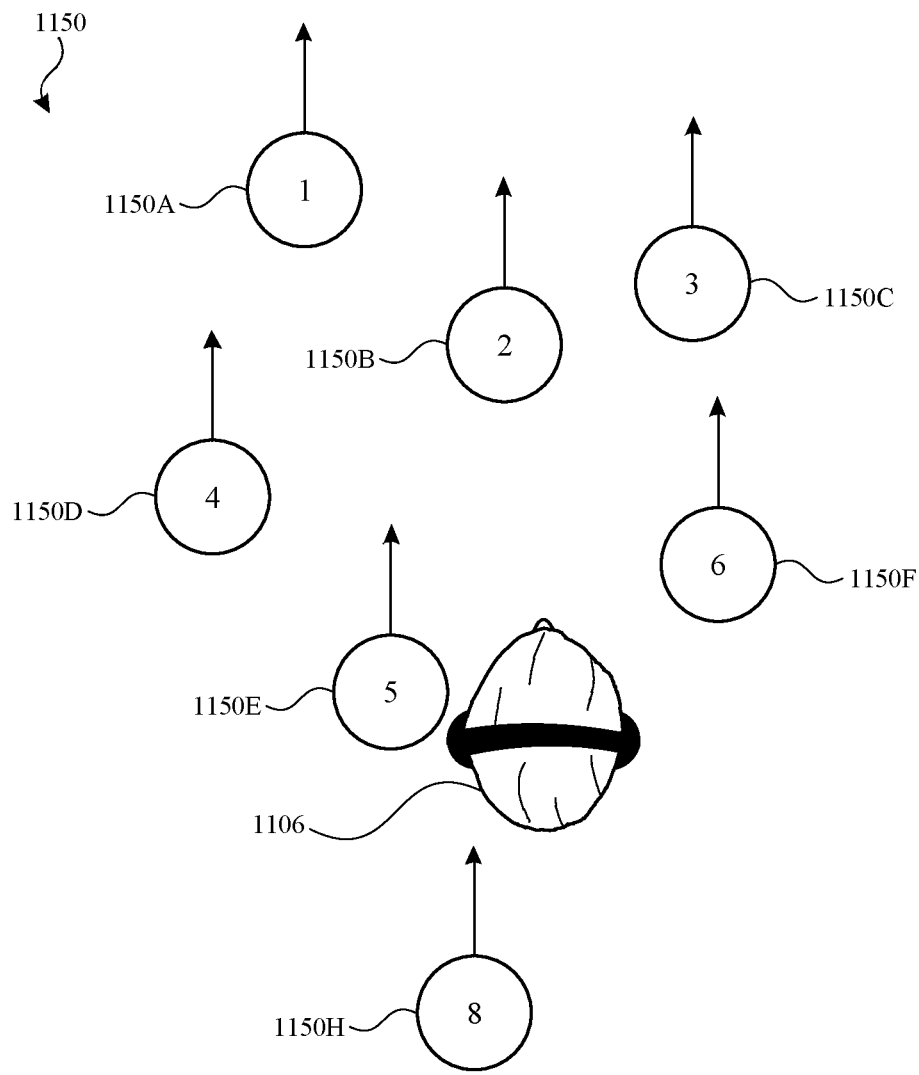
Figure 11F:
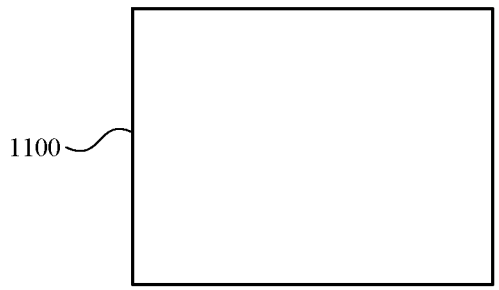
Figure 11G:
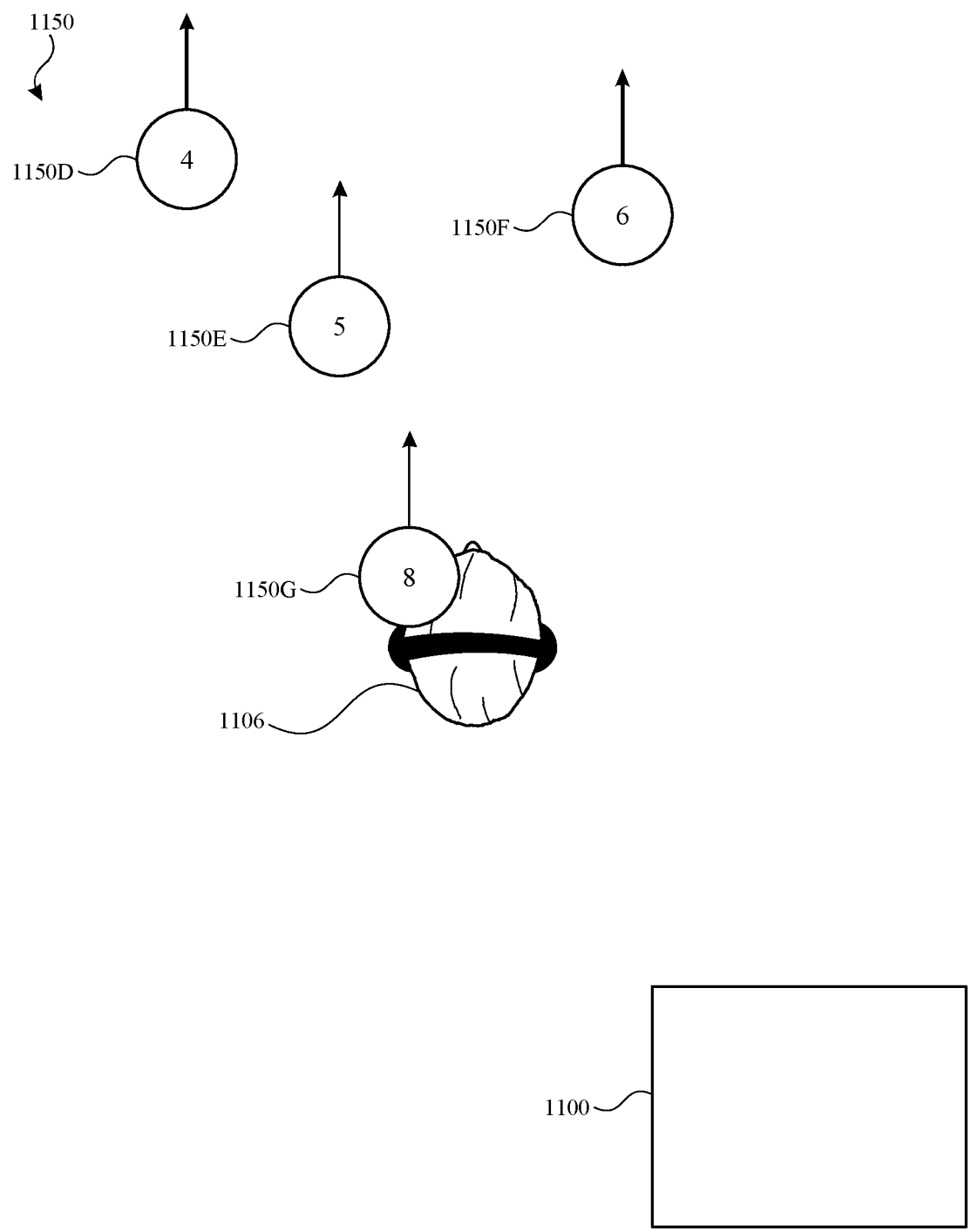
Figure 12A:
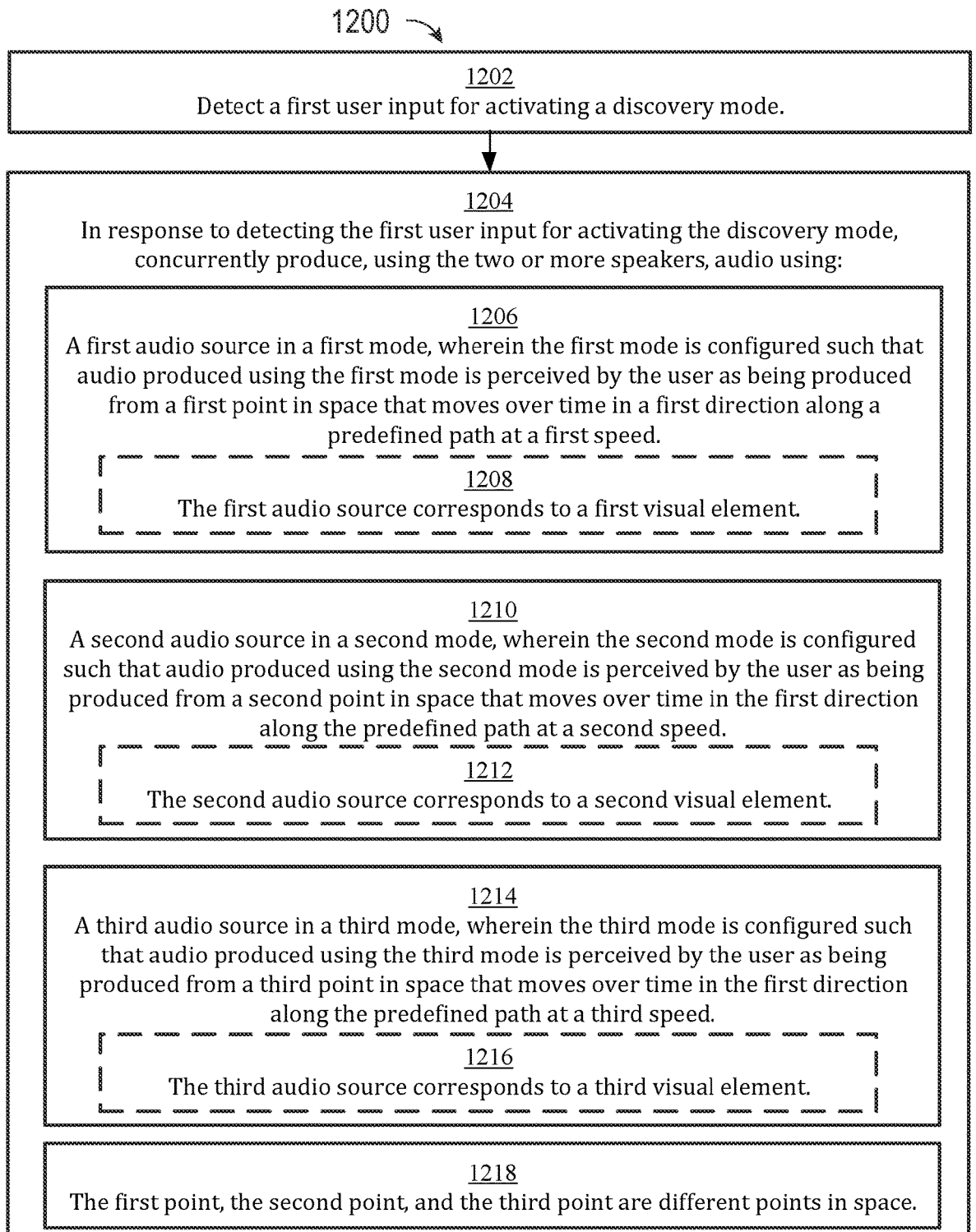
FIGS. 12A-12B is a flow diagram illustrating a method for discovering music using an electronic device in accordance with some embodiments.
Figure 12B:

At FIGS. 11D-11E, the device receives, at touch-sensitive surface 1100, swipe input 1110. In response to receiving swipe input 1110, as illustrated in FIGS. 11E-11F, the device updates, on the display, the direction and/or speed of displayed visual elements 1150*a*-1150*h* (e.g., in accordance with a direction and/or speed of swipe input 1110). Further in response to receiving swipe input 1110, the device transitions the audio produced for individual songs in space (e.g., the device applies an interaural time difference, an HRTF, and/or cross cancellation) such that the user perceives the audio of the songs as drifting past the user with an updated direction and/or speed (e.g., in accordance with the direction and/or speed of swipe input 1110).

In some examples, the device includes a digital assistant that produces audio feedback, such as returning the results of a query by speaking the results. In some examples, device produces audio for the digital assistant by placing the audio for the digital assistant at a location in space (e.g., over the right shoulder of the user) such that the user perceives the digital assistant as remaining stationary in space even when other audio moves in space. In some examples, the device emphasizes the audio for the digital assistant by ducking one or more (or all) other audio.

In some examples, the device detects a tap input on (e.g., at a location on the touch-sensitive surface corresponding to) a displayed audio element. In response to detecting the tap input on the audio element, the device transitions to producing, using the left and right speakers, audio of the respective song that corresponds to selected audio element without placing the audio in space (e.g., device 1000 does not apply any of an interaural time difference, an HRTF, or cross cancellation). For example, as a result of not placing the audio in space, a user wearing headphones perceives the audio of the selected song as being in the head of the user. Further in response to detecting the tap input on the displayed audio element, the device ceases to produce audio of the remaining audio elements. Thus, the user is enabled to select an individual song to listen to.

FIGS. 12A-12B is a flow diagram illustrating a method for discovering music using an electronic device in accordance with some embodiments. Method 1200 is performed at a device (e.g., 100, 300, 500, 1000) with a display and a touch-sensitive surface. The electronic device is operably connected with two or more speakers (e.g., left and right speakers, left and right headphones, left and right earphones, left and right earbuds). Some operations in method 1200 are, optionally, combined, the orders of some operations are, optionally, changed, and some operations are, optionally, omitted.

As described below, method 1200 provides an intuitive way for discovering music. The method reduces the cognitive burden on a user for discovering music, thereby creating a more efficient human-machine interface. For battery-operated computing devices, enabling a user to discover music faster and more efficiently conserves power and increases the time between battery charges.

The electronic device detects (1202) a first user input (e.g., 1010*a*) for activating a discovery mode (e.g., by tapping a "discover" affordance, providing voice input to a digital assistant, such as "Sample some songs").

In response (1204) to detecting the first user input (e.g., 1010*a*) for activating the discovery mode, the electronic device concurrently produces (1204), using the two or more speakers, audio (e.g., 1054*a*, 1054*b*, 1054*c*) using: a first audio source (e.g., audio file, music file, media file) in a first mode (1206), a second audio source (e.g., audio file, music file, media file) in a second mode (1210), and a third audio source (e.g., audio file, music file, media file) in a third mode (1214)

The first mode (1206) is configured such that audio produced using the first mode is perceived by the user as being produced from a first point in space that moves over time in a first direction (e.g., a left to right direction) along a predefined path (e.g., 1050*a*) at a first speed.

In accordance with some embodiments, the first audio source (e.g., audio file, music file, media file) corresponds (1208) to a first visual element (e.g., 1004*a*, audio of the video in the playback window, audio of the song from the album corresponding to the album art, audio generated by, or received from, the first application).

The second mode (1210) is configured such that audio produced using the second mode is perceived by the user as being produced from a second point in space that moves over time in the first direction (e.g., a left to right direction) along the predefined path (e.g., 1050*a*) at a second speed.

In accordance with some embodiments, the second audio source (e.g., audio file, music file, media file) corresponds (1212) to a second visual element (e.g., 1004*b*, audio of the video in the playback window, audio of the song from the album corresponding to the album art, audio generated by, or received from, the first application).

The third mode (1214) is configured such that audio produced using the third mode is perceived by the user as being produced from a third point in space that moves over time in the first direction (e.g., a left to right direction) along the predefined path (e.g., 1050*a*) at a third speed.

In accordance with some embodiments, the third audio source (e.g., audio file, music file, media file) corresponds (1216) to a third visual element (e.g., 1004*c*, audio of the video in the playback window, audio of the song from the album corresponding to the album art, audio generated by, or received from, the first application).

The first point (e.g., location of 1054*a* at FIG. 10C), the second point (e.g., location of 1054*b* at FIG. 10C), and the third point (e.g., location of 1054*c* at FIG. 10C) are different (1218) points in space (e.g., different points in space as perceived by the user). Producing audio with varying characteristics also provides the user with contextual feedback about the placement of different content and enables users to quickly and easily recognize what inputs are required to access the content (e.g., to cause display of the content). For example, the user can recognize that a particular audio can be access with a particular input based on where in space the user perceives the audio as from coming from. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In accordance with some embodiments, concurrently with producing audio using the first audio source, second audio source, and third audio source, the electronic device displays (1220), on the display, concurrent movement of two or more of the first visual element (e.g., 1004*a*), the second visual element (e.g., 1004*b*), and the third visual element (e.g., 1004*c*) at a fourth speed. In some examples, the device displays concurrent movement of all of the first visual element (e.g., 1004*a*), the second visual element (e.g., 1004*b*), and the third visual element (e.g., 1004*c*) at a fourth speed.

In accordance with some embodiments, the movement of the two or more of the first visual element (e.g., 1004*a*), the second visual element (e.g., 1004*b*), and the third visual element (e.g., 1004*c*) is in the first direction (e.g., a left to right direction).

In accordance with some embodiments, the predefined path (e.g., 1050*a*) varies along a first dimension (e.g., x dimension, left/right dimension). The predefined path varies along a second dimension (e.g., z dimension, near/far dimension) different from the first dimension. The predefined path does not vary along a third dimension (e.g., y dimension, up/down dimension, height) different from the first dimension and the second dimension. Thus, in some examples, the devices produces audio along a path such that the user perceives the audio moving from left-to-right and/or right-to-left and from further-to-nearer or nearer-to-further, but does not perceive the audio as moving up-to-down or down-to-up.

In accordance with some embodiments, concurrently producing (1204), using the two or more speakers, audio further includes using a fourth audio source (e.g., audio file, music file, media file) in a fourth mode. The fourth mode is configured such that audio (e.g., 1054*d*) produced using the fourth mode is perceived by the user as being produced from a fourth point in space (e.g., location of 1054*a*) that moves over time in the first direction (e.g., a left to right direction) along the predefined path (e.g., 1050*a*), the fourth point in space being further from the user than the first point, the second point, and the third point. In some examples, visual elements of audio that are perceived as being off in the distance (e.g., further than a predetermined distance) are not displayed on the display (e.g., 1004*a* in FIG. 10E is not displayed on the display). While displaying, on the display, the concurrent movement of the two or more of the first visual element (e.g., 1004*a*), the second visual element (e.g., 1004*b*), and the third visual element (e.g., 1004*c*), the electronic device forgoes displaying, on the display, a fourth visual element (e.g., 1004*d*) that corresponds to the fourth audio source.

In accordance with some embodiments, the first speed, the second speed, and the third speed are the same speed. In accordance with some embodiments, the first speed, the second speed, and the third speed are different speeds.

In accordance with some embodiments, while concurrently producing, using the two or more speakers, the audio (e.g., as illustrated in 1050 of FIG. 10F), the electronic device detects a second user input (e.g., 1010*b*) in a second direction (e.g., a right to left direction) that is different from the first direction (e.g., a left to right direction). In response to detecting the second user input (e.g., 1010*b*) in the second direction, the electronic device updates production of the audio of the first audio source, the second audio source, and the third audio source using modes configured such that the audio sources are perceived by the user as moving over time in the second direction (e.g., a right to left direction, as illustrated in 1050 of FIG. 10H) along the predefined path (e.g., 1050*a*). Further in response to detecting the second user input (e.g., 1010*b*) in the second direction, the electronic device updates display, on the display, of the movement of one or more of (e.g., two or more of, all of) the first visual element (e.g., 1004*a*), the second visual element (e.g., 1004*a*), and the third visual element (e.g., 1004*a*) such that the movement is in the second direction (e.g., a right to left direction, as illustrated in FIGS. 10H-10I).

In accordance with some embodiments, while concurrently producing, using the two or more speakers, the audio, the electronic device detects a third user input (e.g., in the first direction, a left to right direction). In response to detecting the third user input, the electronic device updates production of the audio of the first audio source, the second audio source, and the third audio source using modes configured such that the audio sources are perceived by the user as moving over time in the first direction (e.g., a right to left direction) along the predefined path at a fifth speed that is faster than the first speed. Further in response to detecting the third user input, the electronic device updates display, on the display, of the concurrent movement of the first visual element, the second visual element, and the third visual element such that the movement is in the first direction (e.g., a left to right direction) at a sixth speed that is faster than the fourth speed.

In accordance with some embodiments, the electronic device detects a selection input (e.g., 1010*c*, a tap input, a tap-and-hold input) at a location corresponding to the second visual element (e.g., 1004*b*). In response to detecting the selection input (e.g., 1010*c*), the electronic device produces, using the two or more speakers, audio of the second audio file in a fifth mode (and not in the second mode). The audio produced using the fifth mode is not perceived by the user as being produced from a point in space that moves over time.

In accordance with some embodiments, the fifth mode does not include a modification of an interaural time difference of audio. In some examples, audio produced in the fifth mode (e.g., 1054*b* at FIG. 10K) is not modified using any of an HRTF, an interaural time different of audio, or cross cancellation.

In accordance with some embodiments, the first mode, second mode, and the third mode include modification of an interaural time difference of audio. In some examples, audio produced in the first mode is modified using one or more of an HRTF, an interaural time different of audio, and cross cancellation. In some examples, audio produced in the second mode is modified using one or more of an HRTF, an interaural time different of audio, and cross cancellation. In some examples, audio produced in the third mode is modified using one or more of an HRTF, an interaural time different of audio, and cross cancellation. Modifying an interaural time difference of audio enables the user to perceive the audio as coming from a particular direction. This directional information in the audio provides the user with additional feedback about the about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In accordance with some embodiments, modification of the interaural time difference of audio includes: combining a first channel audio (e.g., a right channel) of the audio and a second channel audio (e.g., a left channel) of the audio to form a combined channel audio, updating the second channel audio to include the combined channel audio at a first delay (e.g., 0 ms delay, less than a delay amount), and updating the first channel audio to include the combined channel audio at a second delay (e.g., a 100 ms delay, more than the delay amount) different from the first delay. In some examples, modifying the interaural time difference of audio includes introducing a time delay to a first channel audio (e.g., a right channel) without introducing a time delay to the second channel audio (e.g., a left channel) that is different from the first audio channel.

Note that details of the processes described above with respect to method 1200 (e.g., FIGS. 12A-12B) are also applicable in an analogous manner to the methods described below and above. For example, methods 700, 900, 1400, and 1500 optionally include one or more of the characteristics of the various methods described above with reference to method 1200. For example, the same or similar techniques are used to place audio in space. For another example, the same audio sources may be used in the various techniques. For yet another example, currently playing audio in each of the various methods can be manipulated using the techniques described in other methods. For brevity, these details are not repeated below.

FIGS. 13A-13F illustrate exemplary techniques for managing headphone transparency, in accordance with some embodiments. The techniques in these figures are used to illustrate the processes described below, including the processes in FIGS. 14A-14B.

FIGS. 13G-13M illustrate exemplary techniques for manipulating multiple audio streams of an audio source, in accordance with some embodiments. The techniques in these figures are used to illustrate the processes described below, including the processes in FIG. 15.

FIGS. 13A-13M illustrate device 1300 (e.g., a mobile phone) with a display and a touch-sensitive surface that is connected to left and right speakers (e.g., headphones 1358). In some examples, the left and right speakers are operable to individually operate at a noise cancellation level (e.g., noises from outside of the headphones are suppressed, so the user hears less of those noises—thus, a low state of noise transparency) and a full transparency level (e.g., noises from outside of the headphones are fully passed through to the user, or passed through as much as the headphones are able, so the user can hear those noises—thus, a high state of noise transparency). In FIGS. 13A-13C, device 1300 is operating left speaker 1358*a* and right speaker 1358*b* at the noise cancellation level, as illustrated by the speakers being filled. However, for example, device 1300 can operate left speaker 1358*a* at the noise cancellation level while operating right speaker 1358*b* at the full transparency level.

Overhead view 1350 is a visual depiction of the spatial organization of audio being produced by device 1300 and is illustrated throughout FIGS. 13A-13M to provide the reader with a better understanding of the techniques, in particular with respect to locations from which the user 1356 perceives sounds as coming from (e.g., as a result of device 1300 placing audio in space). Overhead view 1350 is not part of the user interface of device 1300. In some examples, the techniques described below enable users to more easily and efficiently listen to audio sources not produced a device they are currently listening to. For instance, the techniques enable a user to more clearly hear someone speaking to the user while the user is listening to music using headphones. In some examples, the techniques described below enable users to easily manipulate various streams of audio.

At FIG. 13A, device 1300 displays music player 1304, which includes album art 1304*a* and, optionally, axes 1304*b*.

The album art corresponds to a song being played by device 1300. In some examples, the song includes a plurality of audio streams. In this examples, the song includes five audio steams, where each audio stream corresponds to a particular instrument.

At FIG. 13A, device 1300 produces, using the left 1358a and right 1358b speakers, audio for the song (including all five audio streams) without placing the audio in space (e.g., device 1300 does not apply any of an interaural time difference, an HRTF, or cross cancellation). For example, this results in the user perceiving the audio as being in the head of user 1356, as illustrated by audio element 1354 in overhead view 850 of FIG. 8F-8G. Audio element 1354 corresponds to the song, including the five audio streams. Device 1300 is configured such that user inputs received at affordances 1304c control the music, such as by pausing, playing, fast forwarding, and rewinding the music.

In some examples, user 1356 sees that a person to the right of them is speaking and the user provides drag input 1310a. At FIGS. 13B-13D, device 1300 detects drag input 1310a, which displaces album art 1304a. For example, device 1300 updates display of the location of album art 1304a such that it corresponds to the movement of drag input 1310a.

At FIGS. 13B and 13C, the displacement of album art 1304a does not exceed a predetermined distance and device 1300 continues producing, using left 1358a and right 1358b speakers, audio for the song (including all five audio streams) without placing the audio in space (e.g., device 1300 does not apply any of an interaural time difference, an HRTF, or cross cancellation) and while maintaining operation of left 1358a and right 1358b speakers at the noise cancellation level.

Figure 13D:
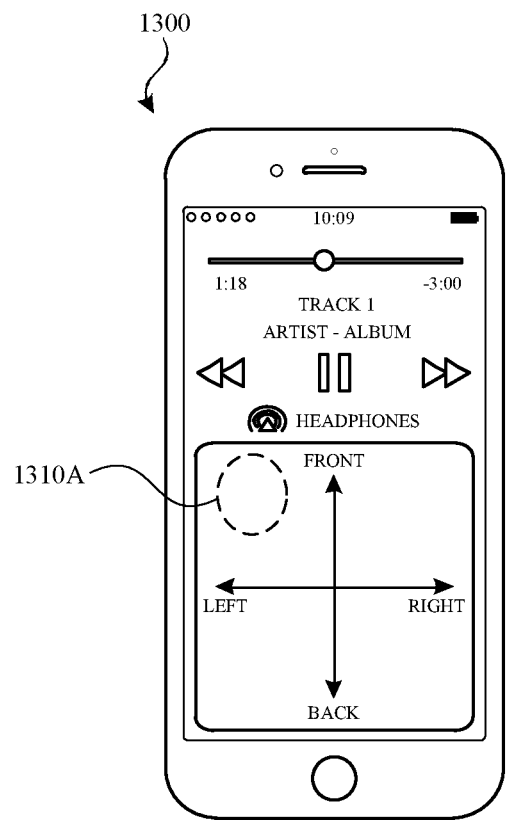
Figure 13D:
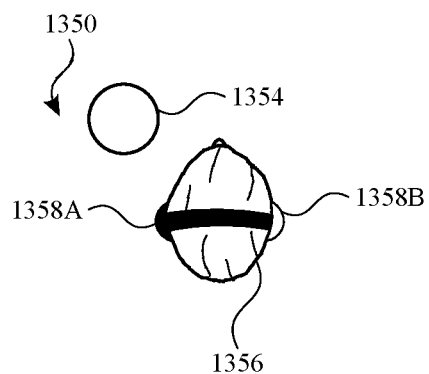
Figure 14A:
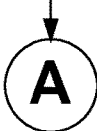

At FIG. 13D, device 1300 determines that displacement of album art 1304a exceeds the predetermined distance (e.g., the user has moved album art 1304a far enough). In response to the determination that the displacement of album art 1304a exceeds the predetermined distance, device 1300 transitions to producing, using left 1358a and right 1358b speakers, audio for the song (including all five audio streams) by placing the audio in space (e.g., device 1300 applies an interaural time difference, an HRTF, and/or cross cancellation) such that the user perceives the audio as being at a location in space that is away (e.g., forward and to the left) from the person to the right of the user, as illustrated in overhead view 1350 of FIG. 13D. In some examples, the audio is moved to a location in space based on the direction and/or distance of drag input 1310a. Further in response to the determination that the displacement of album art 1304a exceeds the predetermined distance, device 1300 maintains operation of left speaker 1358a at the noise cancellation level and transitions operation of right speaker 1358b to the full transparency level, as illustrated in overhead view 1350 of FIG. 13D by left speaker 1358a being filled and right speaker 1358b not being filled.

Figure 13E:
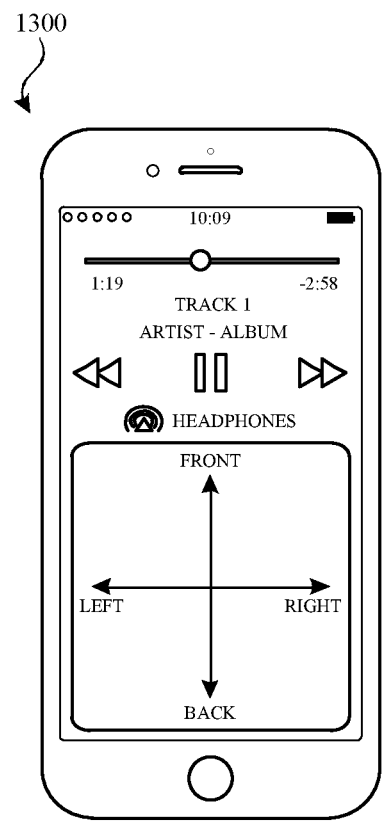
Figure 13E:
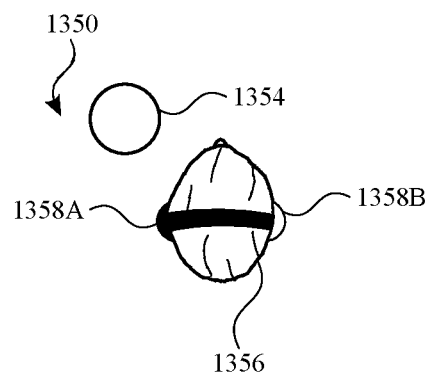

While device 1300 maintains placement of the audio in space (e.g., device 1300 applies an interaural time difference, an HRTF, and/or cross cancellation), operates left speaker 1358a at the noise cancellation level, and operates right speaker 1358b at the full transparency level, at FIG. 13E device 1300 detects lift-off of drag input 1310a.

Figure 13F:
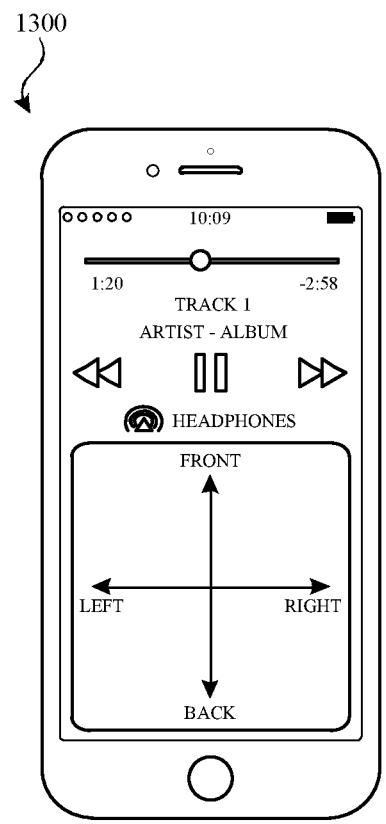
Figure 13F:
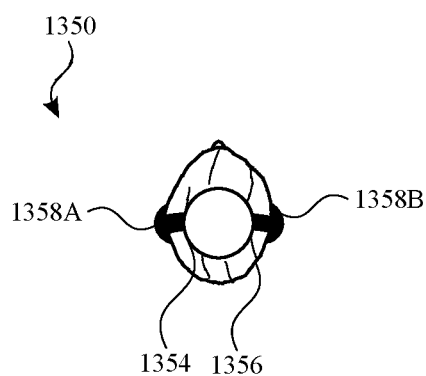

In response to detecting lift-off of drag input 1310a, as illustrated in FIG. 13F, device 1300 returns display of album art 1304a to the original pre-drag position and transitions to producing, using left 1358a and right 1358b speakers, audio for the song (including all five audio streams) without placing the audio in space (e.g., device 1300 does not apply any of an interaural time difference, an HRTF, and/or cross cancellation) such that the user perceives the audio as being in the head of the user. Further in response to detecting lift-off of drag input 1310a, device 1300 maintains operation of left speaker 1358a at the noise cancellation level and transitions operation of right speaker 1358b to the noise cancellation level, as illustrated in overhead view 1350 of FIG. 13D by left speaker 1358a and right speaker 1358b being filled.

In some examples, in response to detecting lift-off of drag input 1310a, device 1300 maintains the placement of the audio in space and maintains operation of right speaker 1358b at the full transparency level.

Figure 13G:
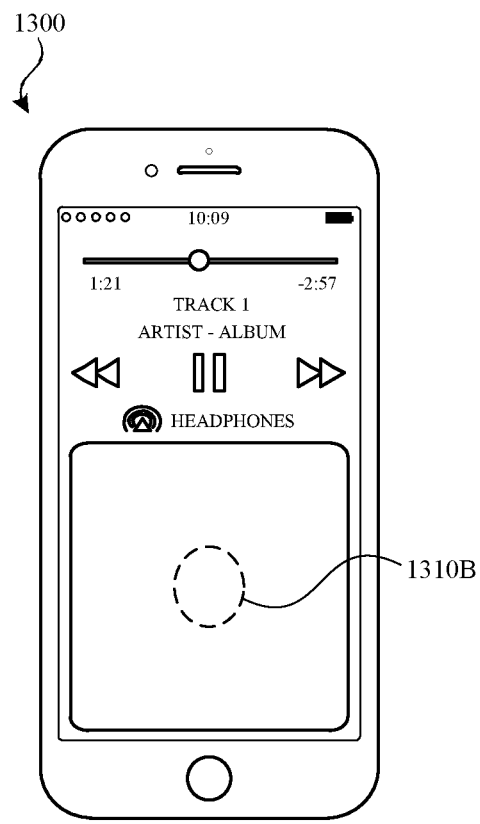
FIGS. 13G-13M illustrate exemplary techniques for manipulating multiple audio streams of an audio source, in accordance with some embodiments.
Figure 13G:
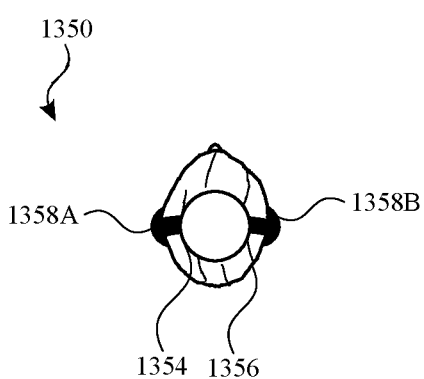

At FIG. 13G, device 1300 continues to produce, using the left 1358a and right 1358b speakers, audio for the song (including all five audio streams) without placing the audio in space (e.g., device 1300 does not apply any of an interaural time difference, an HRTF, or cross cancellation). At FIG. 13G, device 1300 detects input 1310b.

In some examples, device 1300 determines whether a characteristic intensity of input 1310b exceeds an intensity threshold. In response to device 1300 determining that the characteristic intensity of input 1310b does not exceed an intensity threshold, device 1300 continues to produce, using the left 1358a and right 1358b speakers, audio for the song (including all five audio streams) without placing the audio in space.

Figure 13H:
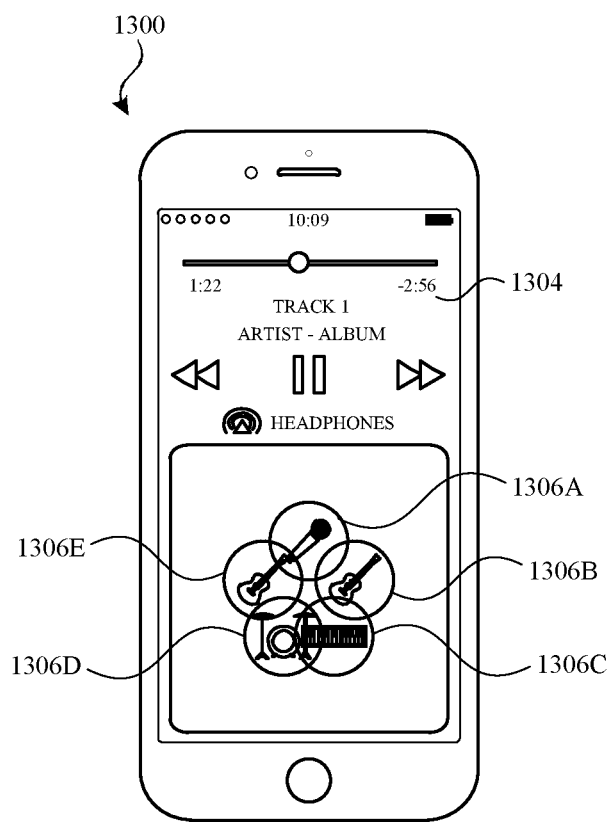
Figure 13H:
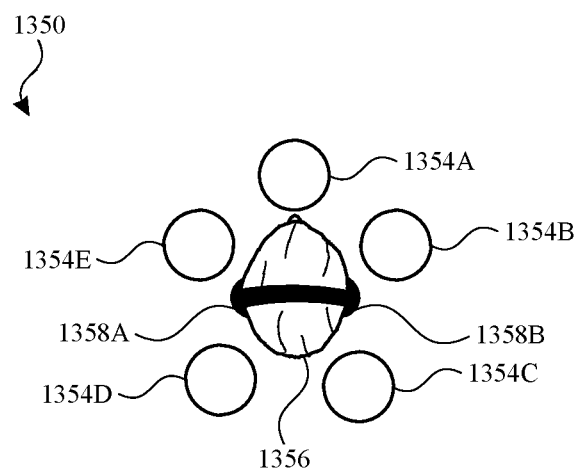
Figure 13I:
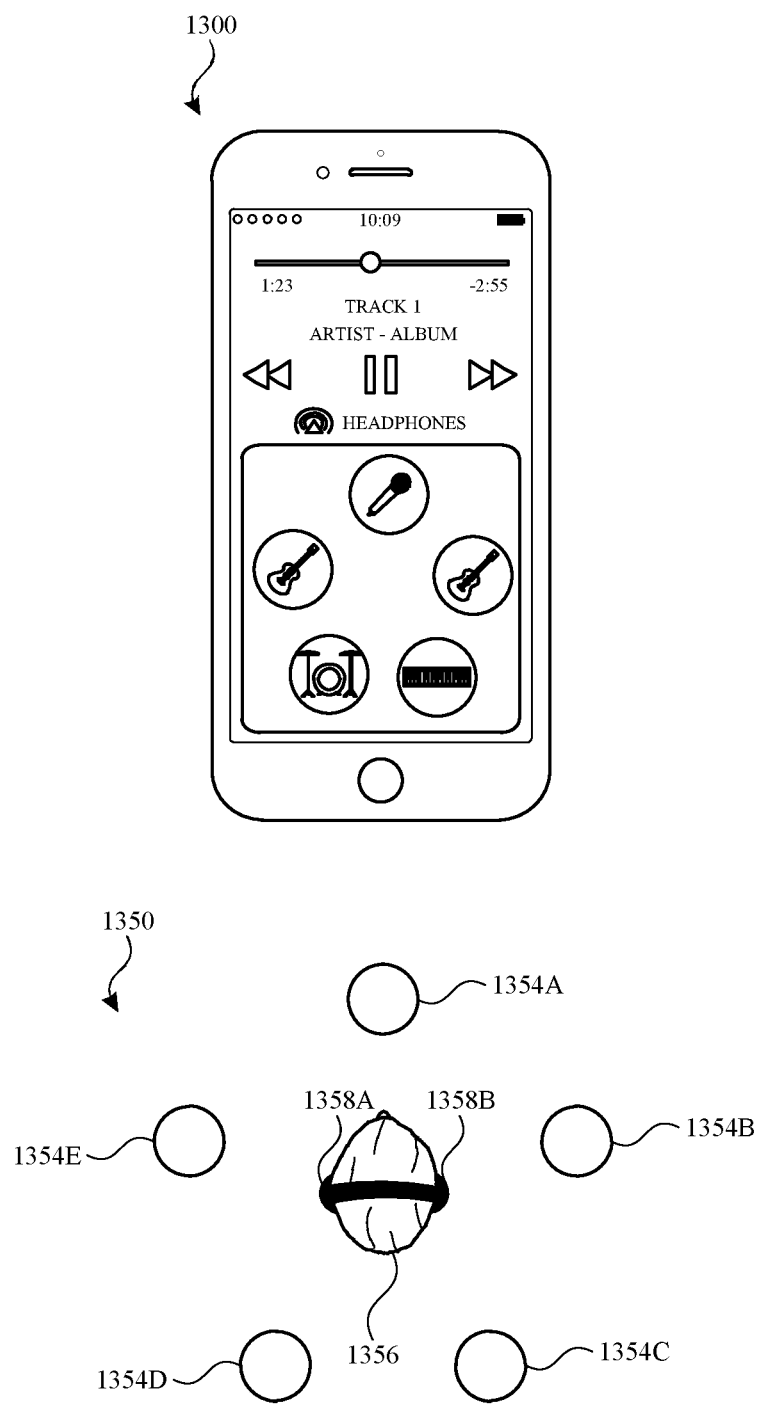

In response to device 1300 determining that the characteristic intensity of input 1310b does exceed an intensity threshold, device 1300 transitions to producing, using the left 1358a and right 1358b speakers, audio for the various audio streams for the song (including all five audio streams) by placing the various audio in space such that the user perceives the various audio streams as leaving the user's head in different directions, as illustrated by audio element 1354 splitting up into audio elements 1354a-1354e in FIGS. 13G-13I. Further in response to device 1300 determining that the characteristic intensity of input 1310b does exceed an intensity threshold, device 1300 updates display of music player 1304 to show an animation of stream affordances 1306a-1306e being displayed and spreading apart, as illustrated in FIGS. 13H-13I. For example, each of stream affordances 1306a-1306e correspond to respective audio stream of the song. For example, stream affordance 1306a corresponds to a first audio stream that includes a singer (but does not include guitar, keyboard, drums, etc). Similarly, audio element 1354a corresponds to the first audio stream. For another example, stream affordance 1306d corresponds to a second audio stream that includes a guitar (but does not include a singer, keyboard, drums, etc). Similarly, audio element 1354d corresponds to the second audio stream.

As illustrated in FIGS. 13H-13I, device 1300 displays stream affordances 1306a-1306e at locations on the display (e.g., relative to each other, relative to a point on the display) that corresponds to locations in space at which device 1300 has placed corresponding audio streams.

Figure 13J:
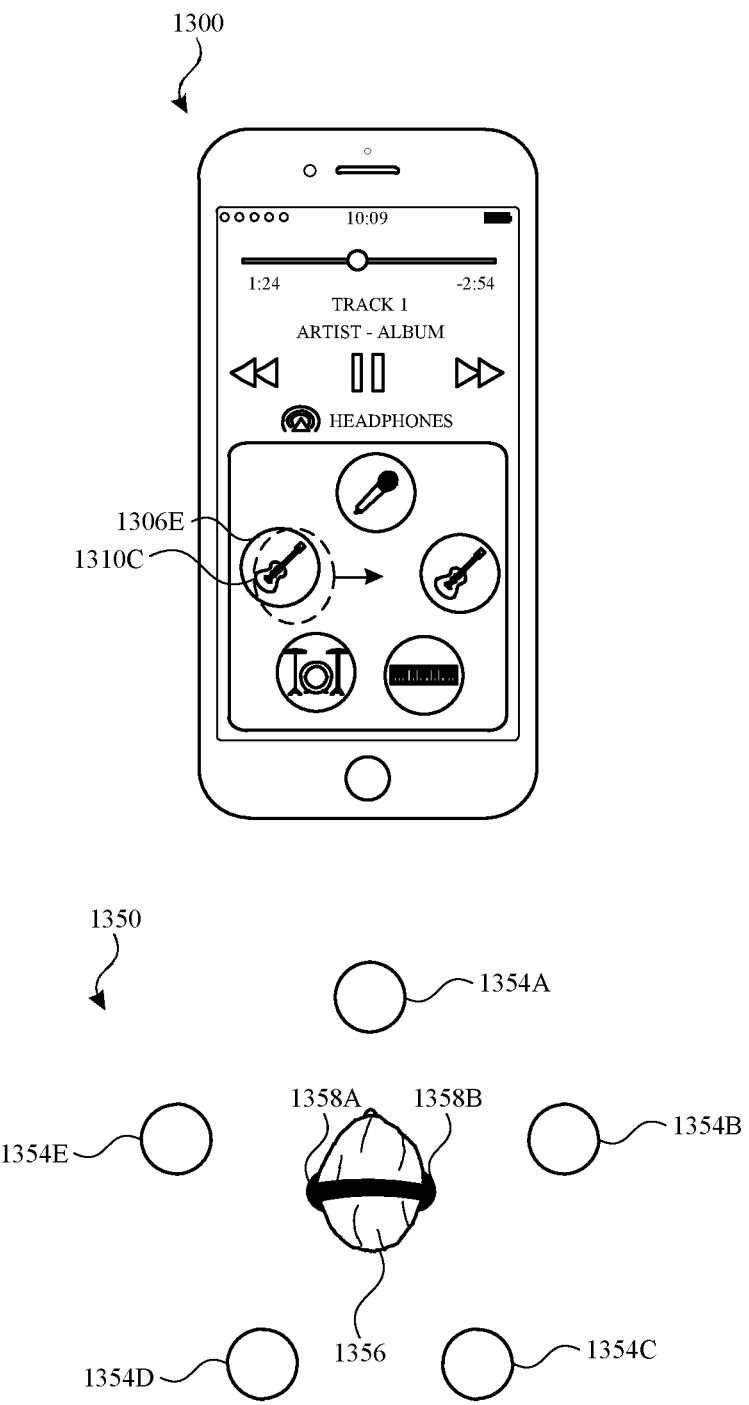
Figure 13K:
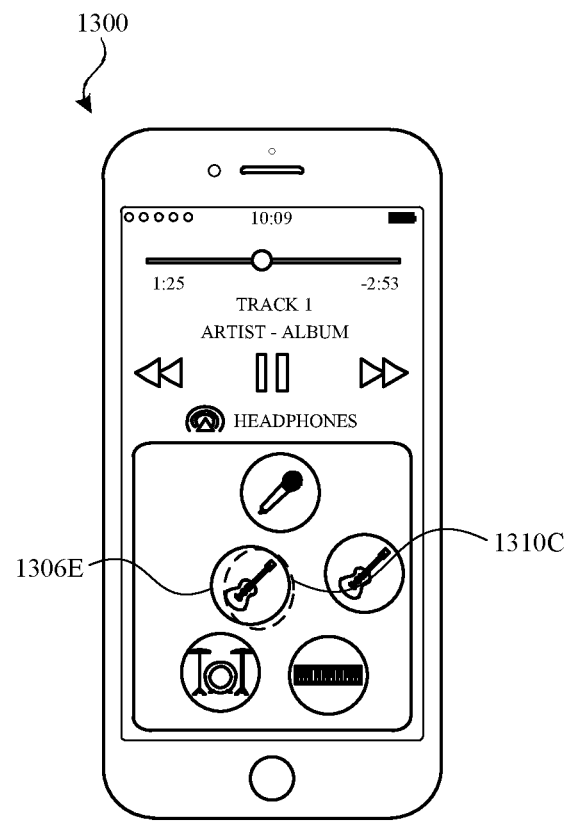
Figure 13K:
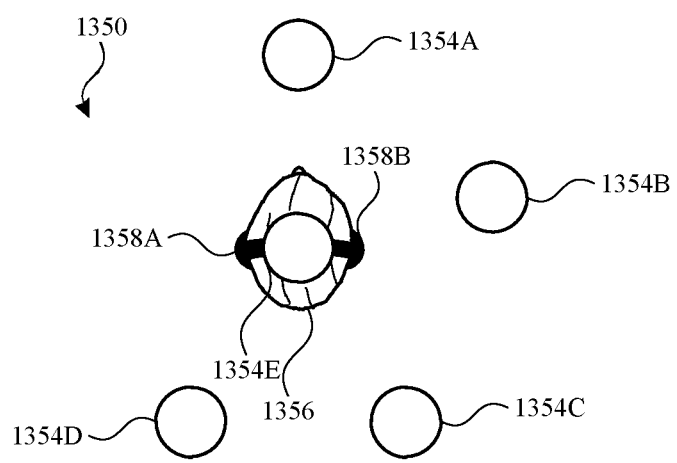

At FIG. 13J-13K, device 1300 detects drag gesture 1310c on stream affordance 1306d. In response to detecting drag gesture 1310c, device 1300 transitions to producing, using the left 1358a and right 1358b speakers, audio for the second audio stream (corresponding to audio element 1354e) without placing the audio in space such that the user perceives the audio for the second audio stream as being in the users head and continues producing the other various audio streams (e.g., corresponding to audio elements 1354a-1354d) for the song at various places in space, as illustrated by audio elements 1354a-1354e in FIG. 13K. Thus, the device moves individual audio streams of the song into and out of the user's head and to different positions in space based on detecting drag inputs on corresponding stream affordance 1306a-1306d. In some examples, the device places the various audio streams at locations in space based on the detected drag inputs (e.g., direction of movement, placement of liftoff).

Figure 13L:
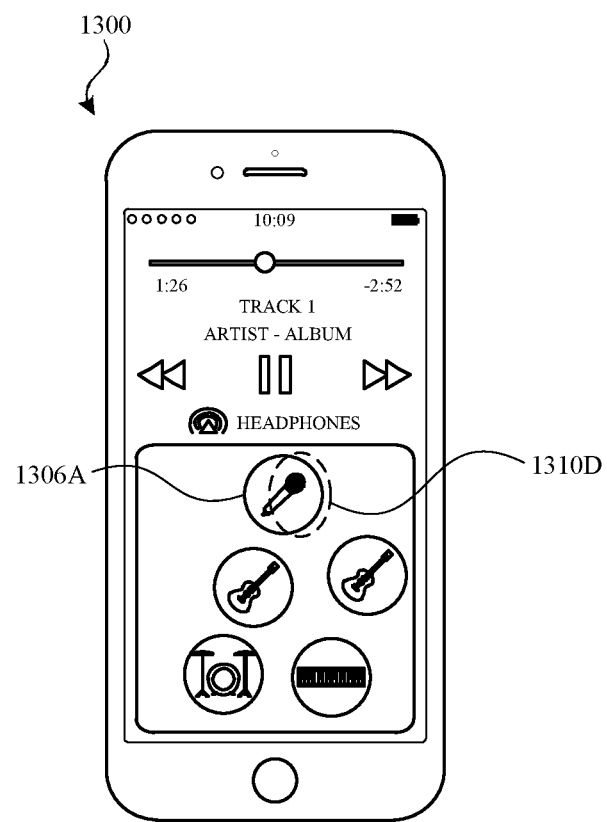
Figure 13L:
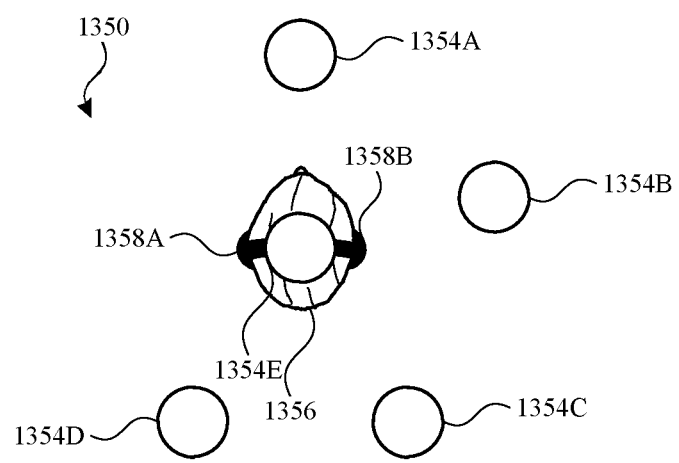
Figure 13M:
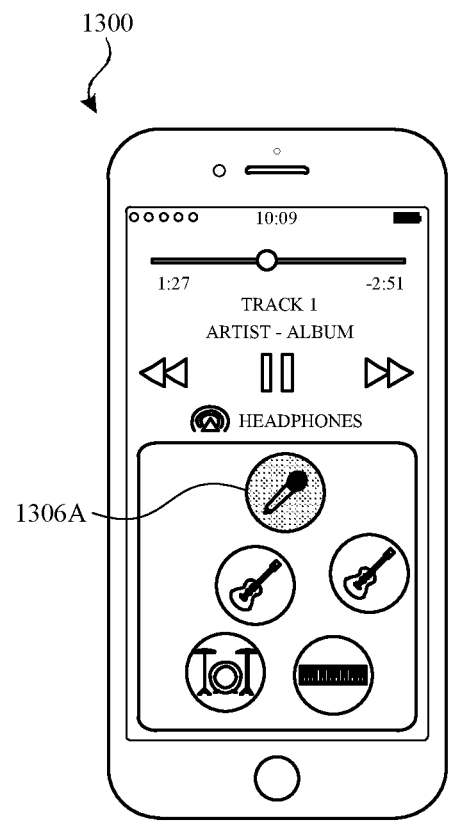
Figure 13M:
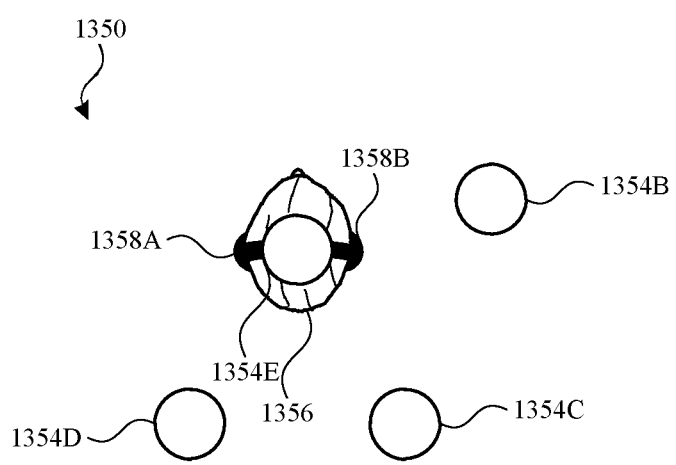

At FIG. 13L, device 1300 detects tap input 1310d on stream affordance 1306a. In response to detecting tap input 1310d on stream affordance 1306a, device 1300 ceases to produce audio for the second audio stream, thus disabling the audio stream. Further in response to detecting tap input 1310d on stream affordance 1306a, device 1300 updates one or more visual characteristics (e.g., shading, size, movement) of stream affordance 1306a to indicate that the corresponding audio stream is disabled. In some examples, device 1300 receives input that moves the disabled audio stream to a new location in space (e.g., drag gesture on stream affordance 1306a), without producing the disabled audio stream. In response to detecting an additional tap input on a stream affordance that corresponds to the disabled audio stream, device 1300 enables the audio stream and begins producing audio for the enabled audio stream at the new location in space.

In some examples, device 1300 includes a digital assistant that produces audio feedback, such as returning the results of a query by speaking the results. In some examples, device 1300 produces audio for the digital assistant by placing the audio for the digital assistant at a location in space (e.g., over the right shoulder of the user) such that the user perceives the digital assistant as remaining stationary in space even when other audio moves in space. In some examples, device 1300 emphasizes the audio for the digital assistant by ducking one or more (or all) other audio.

FIGS. 14A-14B is a flow diagram illustrating a method for managing headphone transparency using an electronic device in accordance with some embodiments. Method 1400 is performed at a device (e.g., 100, 300, 500, 1300) with a display and a touch-sensitive surface.

The electronic device is operably connected with two or more speakers (e.g., left and right speakers, left and right headphones, left and right earphones, left and right earbuds). Some operations in method 1400 are, optionally, combined, the orders of some operations are, optionally, changed, and some operations are, optionally, omitted.

As described below, method 1400 provides an intuitive way for managing headphone transparency. The method reduces the cognitive burden on a user for managing headphone transparency, thereby creating a more efficient human-machine interface. For battery-operated computing devices, enabling a user to manage headphone transparency faster and more efficiently conserves power and increases the time between battery charges.

The electronic device displays (1402), at a first location on the display, a user-movable affordance (e.g., 1304a, album art).

While (1404) the user-movable affordance (e.g., 1304a) is displayed at the first location (e.g., 1304a as illustrated in FIG. 13A), the electronic device operates (1408) the electronic device in a first state of ambient sound transparency (e.g., a state where transparency is disable for both the first speaker and the second speaker of the two or more speakers, a state where external noises are suppressed for the first speaker and for the second speaker of the two or more speakers, 1358a and 1358b as illustrated in FIG. 13A).

While (1404) the user-movable affordance (e.g., 1304a) is displayed at the first location (e.g., 1304a as illustrated in FIG. 13A), the electronic device produces (1410), using the two or more speakers, audio (e.g., 1354) using an audio source (e.g., audio file, music file, media file) in a first mode (e.g., 1354 of FIG. 13A, a stereo mode, without applying any of an HRTF, cross cancellation, or interaural time difference).

While (1404) the user-movable affordance (e.g., 1304a) is displayed at the first location (e.g., 1304a as illustrated in FIG. 13A), the electronic device detects (1412), using the touch-sensitive surface, user input (e.g., 1310a, a drag gesture).

A set of one or more conditions includes (1416) a first condition that is met when the user input (e.g., 1310a) is a touch-and-drag operation on the user-movable affordance (e.g., 1304a). In accordance with some embodiments, the set of one or more conditions further includes (1418) a second condition that is met when the user input causes displacement of the user-movable affordance from the first location by at least a predetermined amount. For example, small movement of the moveable affordance (e.g., 1304a) does not cause a change—the moveable affordance (e.g., 1304a) must be moved a minimum distance between the mode is changed from the first mode to the second mode and before the state is changed from the first state to the second state. This helps to avoid inadvertent mode and state changes.

In response (1414) to detecting the user input (e.g., 1310a), and in accordance with (1416) the set of one or more conditions being met, the electronic device operates (1420) the electronic device in a second state of ambient sound transparency (e.g., a state where transparency is enabled for the first speaker and transparency is disabled for the second speaker of the two or more speakers, a state where external noises are suppressed for the first speaker and external noises are not suppressed for the second speaker of the two or more speakers, 1358a and 1358b as illustrated in FIG. 13D) different from the first state of ambient sound transparency. Changing the state of ambient sound transparency enables the user to hear sounds better from the user's environment, and specifically sound from a particular direction in the environment.

Further in response (1414) to detecting the user input (e.g., 1310a), and in accordance with (1416) the set of one or more conditions being met, the electronic device transitions (1422) production of audio (e.g., 1354 as illustrated in FIG. 13D) using the audio source from the first mode to a second mode (e.g., mono mode, applying one or more of an HRTF, cross cancellation, and interaural time difference) different from the first mode. Changing the mode at which audio is produced enables the user to hear sounds better from the user's environment, and specifically sound from a particular direction in the environment (e.g., the particular direction being away from the direction to which the production of audio has been moved in space).

Further in response (1414) to detecting the user input (e.g., 1310a), and in accordance with (1424) the set of one or more conditions not being met, the electronic device maintains (1426) the electronic device in the first state of ambient sound transparency (e.g., a state where transparency is disable for both the first speaker and the second speaker).

Further in response (1414) to detecting the user input (e.g., 1310a), and in accordance with (1424) the set of one or more conditions not being met, the electronic device maintains producing audio (e.g., 1354 as illustrated in FIG. 13C) using the audio source in the first mode.

In some examples, the speakers (e.g., headphones) are operable to operate at a full noise cancellation level (e.g., noises from outside of the headphones are suppressed, suppressed as much as the headphones are able, so the user cannot hear those noises—thus, a low state of noise transparency) and a full transparency level (e.g., noises from outside of the headphones are fully passed through to the user, or passed through as much as the headphones are able, so the user can hear those noises—thus, a high state of noise transparency).

Further in response (1414) to detecting the user input (e.g., 1310*a*), the electronic device updates (1430) display, on the display, of the user-movable affordance (e.g., 1304*a*) from the first location (e.g., location of 1304*a* in FIG. 13A) on the display to a second location (e.g., location of 1304*a* in FIG. 13D) on the display in accordance with movement, on the touch-sensitive surface, of the user input (e.g., 1310*a*). In some examples, the display location of the user-movable affordance (e.g., 1304*a*) is based on the user input, such as by updating display of the user-movable affordance (e.g., 1304*a*) to correspond to the location of a contact of the user input. Thus, the farther the user input (e.g., 1310*a*) moves the farther the user-movable affordance (e.g., 1304*a*) moves on the display.

In accordance with some embodiments, after (e.g., while) the set of one or more conditions are being met, the electronic device detects an end of the user input (e.g., 1310*a*, detecting a lift-off of the contact of the user input on the touch-sensitive surface). In response to detecting the end of the user input, the electronic device updates display, on the display, of the user-movable affordance (e.g., 1304*a* at FIG. 13F) to the first location on the display. Further in response to detecting the end of the user input, the electronic device transitions the electronic device to operate in the first state of ambient sound transparency (e.g., as illustrated by 1358*a* and 1358*b* of FIG. 13F). Further in response to detecting the end of the user input, the electronic device transitions production of audio using the audio source from the second mode to the first mode (e.g., as illustrated by the change in location of 1354 in FIGS. 13E-13F).

In accordance with some embodiments, after (e.g., while) the set of one or more conditions are being met, the electronic device detects an end of the user input (e.g., detecting a lift-off of the contact of the user input on the touch-sensitive surface). In response to detecting the end of the user input, the electronic device maintains display, on the display, of the user-movable affordance at the second location on the display. Further in response to detecting the end of the user input, the electronic device maintains operation of the electronic device in the second state of ambient sound transparency. Further in response to detecting the end of the user input, the electronic device maintains production of audio using the audio source in the second mode.

In accordance with some embodiments, the user input (e.g., 1310*a*) includes a direction of movement. In accordance with some embodiments, the second state of ambient sound transparency (as illustrated by 1358*a* and 1358*b* in FIG. 13D) is based on the direction of movement of the user input (e.g., 1310*a*). For example, the electronic device selects a particular speaker (e.g., 1358*b*) to change the state of transparency based on the direction of movement of the user input (e.g., 1310*a*). In accordance with some embodiments, the second mode is based on the direction of movement of the user input. For example, in the second mode the electronic device produces the audio such that the audio is perceived as being produced from a direction in space, the direction in spaced being based on the direction of movement of the first input (and/or based on the location of the user-moveable affordance 1304*a*).

In accordance with some embodiments, the second mode is configured such that audio produced using the second mode is perceived by the user as being produced from a point in space that corresponds to the second location of the displayed user-movable affordance.

In accordance with some embodiments, the first mode does not include a modification of an interaural time difference of audio. In some examples, audio produced in the first mode is not modified using any of an HRTF, cross cancellation, or interaural time difference.

In accordance with some embodiments, the second mode includes a modification of an interaural time difference of audio. In some examples, the second mode includes a modification of an interaural time difference of audio such that the audio is perceived by a user as being produced from a direction originating at a location that corresponds to a location of the user-moveable affordance, such as the left or to the right of the display or user. In some examples, audio produced in the second mode is modified using one or more of an HRTF, cross cancellation, and interaural time difference. Modifying an interaural time difference of audio enables the user to perceive the audio as coming from a particular direction. This directional information in the audio provides the user with additional feedback about the about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In accordance with some embodiments, modification of the interaural time difference of audio includes: combining a first channel audio (e.g., a right channel) of the audio and a second channel audio (e.g., a left channel) of the audio to form a combined channel audio, updating the second channel audio to include the combined channel audio at a first delay (e.g., 0 ms delay, less than a delay amount), and updating the first channel audio to include the combined channel audio at a second delay (e.g., a 100 ms delay, more than the delay amount) different from the first delay. In some examples, modifying the interaural time difference of audio includes introducing a time delay to a first channel audio (e.g., a right channel) without introducing a time delay to the second channel audio (e.g., a left channel) that is different from the first audio channel.

Note that details of the processes described above with respect to method 1400 (e.g., FIGS. 14A-14B) are also applicable in an analogous manner to the methods described below and above. For example, methods 700, 900, 1200, and 1500 optionally include one or more of the characteristics of the various methods described above with reference to method 1400. For example, the same or similar techniques are used to place audio in space. For another example, the same audio sources may be used in the various techniques. For yet another example, currently playing audio in each of the various methods can be manipulated using the techniques described in other methods. For brevity, these details are not repeated below.

FIG. 15 is a flow diagram illustrating a method for manipulating multiple audio streams of an audio source using an electronic device in accordance with some embodiments. Method 1500 is performed at a device (e.g., 100, 300, 500, 1300) with a display and a touch-sensitive surface. The electronic device is operably connected with two or more speakers, including a first (e.g., left, 1358*a*) speaker and a second (e.g., right, 1358*b*) speaker. For examples, the two or more speakers are left and right speakers, left and right headphones, left and right earphones, or left and right earbuds. Some operations in method 1500 are, optionally, combined, the orders of some operations are, optionally, changed, and some operations are, optionally, omitted.

As described below, method 1500 provides an intuitive way for manipulating multiple audio streams of an audio source. The method reduces the cognitive burden on a user for manipulating multiple audio streams of an audio source, thereby creating a more efficient human-machine interface. For battery-operated computing devices, enabling a user to manipulate multiple audio streams of an audio source faster and more efficiently conserves power and increases the time between battery charges.

The electronic device produces (1502), using the two or more speakers, audio (e.g., 1354 at FIG. 13F) using an audio source (e.g., audio file, music file, media file) in a first mode (e.g., a stereo mode, without applying any of an HRTF, cross cancellation, or interaural time difference). The audio source includes a plurality (e.g., five) of audio streams, including a first audio stream and a second audio stream. In some examples, each audio stream of the audio source is a stereo audio stream. In some examples, each audio stream is limited to a single respective instrument. In some examples, each audio stream is limited to a voice of a single respective singer. Thus, each audio stream of the audio source is produced in the first mode.

The electronic device detects (1504), using the touch-sensitive surface, a first user input (e.g., 1310*b*, a tap on an affordance, an input with a characteristic intensity that exceeds an intensity threshold).

In response (1506) to detecting the first user input (e.g., 1310*b*), the electronic device transitions (1508), using the two or more speakers, production of the first audio stream (e.g., 1354*a* at FIG. 13H) of the audio source from the first mode to a second mode that is different from the first mode.

Further in response (1506) to detecting the first user input (e.g., 1310*b*), the electronic device transitions (1510), using the two or more speakers, production of the second audio stream (e.g., 1354*b* at FIG. 13H) of the audio source from the first mode to a third mode that is different from the first mode and the second mode.

Placing the various audio streams at different locations in space enables the user to better distinguish between the different audio streams. This, in turn, enables the user to more quickly and efficiently turn off (and on) certain portions of the audio (e.g., a particular audio stream) that the user wants to exclude from the listening experience. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Further in response (1506) to detecting the first user input (e.g., 1310*b*), the electronic device displays (1512), on the display, a first visual representation (e.g., 1306*a*) of the first audio stream of the audio source.

Further in response (1506) to detecting the first user input (e.g., 1310*b*), the electronic device displays (1514), on the display, a second visual representation (e.g., 1306*b*) of the second audio stream of the audio source, wherein the first visual representation (e.g., 1306*a*) is different from the second visual representation (e.g., 1306*b*).

In accordance with some embodiments, blocks 1508-1514 occur concurrently.

In accordance with some embodiments, the first mode does not include a modification of an interaural time difference of audio. In some examples, audio produced in the first mode is not modified using any of an HRTF, cross cancellation, or interaural time difference.

In accordance with some embodiments, the second mode includes a modification of an interaural time difference of audio. In some examples, the second mode includes a modification of an interaural time difference of audio such that the audio is perceived by a user as being produced from a direction originating at a location that corresponds to a location of the corresponding visual representation. In some examples, the second mode includes applying one or more of an HRTF, cross cancellation, and interaural time difference. In some examples, the third mode includes a modification of an interaural time difference of audio. In some examples, the third mode includes applying one or more of an HRTF, cross cancellation, and interaural time difference. Modifying an interaural time difference of audio enables the user to perceive the audio as coming from a particular direction. This directional information in the audio provides the user with additional feedback about the about the placement of different content. Providing improved audio feedback to the user enhances the operability of the device and makes the user-device interface more efficient (e.g., by helping the user to provide proper inputs) which, additionally, reduces power usage and improves battery life of the device by enabling the user to use the device more quickly and efficiently.

In accordance with some embodiments, modification of the interaural time difference of audio includes: combining a first channel audio (e.g., a right channel) of an audio stream and a second channel audio (e.g., a left channel) of the audio stream to form a combined channel audio, updating the second channel audio to include the combined channel audio at a first delay (e.g., 0 ms delay, less than a delay amount), and updating the first channel audio to include the combined channel audio at a second delay (e.g., a 100 ms delay, more than the delay amount) different from the first delay. In some examples, modifying the interaural time difference of audio includes introducing a time delay to a first channel audio (e.g., a right channel) without introducing a time delay to the second channel audio (e.g., a left channel) that is different from the first audio channel.

In accordance with some embodiments, the electronic device displays, on the display, the first visual representation (e.g., 1306*a*) of the first audio stream of the audio source includes displaying the first visual representation at a first location and sliding the first visual representation in a first direction to a second location (e.g., 1306*a* at FIG. 13I) on the display. In accordance with some embodiments, the electronic device displays, on the display, the second visual representation (e.g., 1306*b*) of the second audio stream of the audio source includes displaying the second visual representation at the first location and sliding the second visual representation in a second direction different from the first direction to a third location (e.g., 1306*b* at FIG. 13I) different from the second location.

In accordance with some embodiments, the electronic device detects, using the touch-sensitive surface, a second user input (e.g., 1310*c*), the second input (e.g., 1310*c*) starting at a location corresponding to the second location and ending at a location corresponding to the first location. In response to detecting the second user input, the electronic device slides the first visual representation from the second location to the first location on the display while maintaining the second visual representation at the third location on the display. Further in response to detecting the second user input, the electronic device transitions, using the two or more speakers, production of audio using the first audio stream from the second mode to the first mode while maintaining production of audio using the second audio stream in the third mode.

In accordance with some embodiments, detecting the first user input (e.g., 1310*a*) includes: accessing a characteristic intensity of the first user input, and determining that the characteristics intensity of the first user input exceeds an intensity threshold.

In accordance with some embodiments, while the electronic device is producing, using the two or more speakers, audio using the first audio stream of the audio source and the second audio stream of the audio source, the electronic device detects, using the touch-sensitive surface, a third user input (e.g., 1310*d*, a tap input) at a location on the touch-sensitive surface corresponding to the first visual representation (e.g., 1306*a*). In response to detecting the third user input (e.g., 1310*d*), the electronic device ceases to produce, using the two or more speakers, audio (e.g., 1354*a*) using the first audio stream of the audio source. Further in response to detecting the third user input (e.g., 1310*d*), the electronic device, the electronic device maintains, using the two or more speakers, production of audio using the second audio stream (e.g., 1354*b*) of the audio source. Thus, the electronic device detects a tap on an instrument affordance and disables the audio stream corresponding to that instrument.

In accordance with some embodiments, while the electronic device is not producing, using the two or more speakers, audio using the first audio stream of the audio source and is producing, using the two or more speakers, audio using the second audio stream of the audio source, the electronic device detects, using the touch-sensitive surface, a fourth user input (e.g., a tap input) at a location on the touch-sensitive surface corresponding to the first visual representation. In response to detecting the fourth user input, the electronic device produces, using the two or more speakers, audio using the first audio stream of the audio source. Further in response to detecting the fourth user input, the electronic device maintains, using the two or more speakers, production of audio using the second audio stream of the audio source. Thus, the electronic device detects a tap on an instrument affordance and enables the audio stream corresponding to that instrument.

In accordance with some embodiments, the electronic device detects a volume control input (e.g., a user input requesting to turn down the volume). In response to detecting the volume control input, the electronic device modifies the volume of audio produced, using the two or more speakers, for each audio stream in the plurality of audio streams.

Note that details of the processes described above with respect to method 1500 (e.g., FIG. 15) are also applicable in an analogous manner to the methods described above. For example, methods 700, 900, 1200, and 1400 optionally include one or more of the characteristics of the various methods described above with reference to method 1500. For example, the same or similar techniques are used to place audio in space. For another example, the same audio sources may be used in the various techniques. For yet another example, currently playing audio in each of the various methods can be manipulated using the techniques described in other methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve audio delivery. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver an improved audio experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of audio delivery services, the present technology can be configured to allow users to select to "opt in" or "opt out" of participation in the collection of personal information data during registration for services or anytime thereafter. In yet another example, users can select to limit the length of time location information data is collected or maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio can be delivered to users based on non-personal information data or a bare minimum amount of personal information, such as the content being requested by the device associated with a user, other non-personal information available to the system, or publicly available information.

What is claimed is:

1. An electronic device, comprising:
   a display;
   a touch-sensitive surface;
   one or more processors; and
   memory storing one or more programs configured to be executed by the one or more processors,
   wherein the electronic device is operably connected with two or more speakers, the one or more programs including instructions for:
      displaying, at a first location on the display, a user-movable affordance;
      while the user-movable affordance is displayed at the first location:
         operating the electronic device in a first state of ambient sound transparency;
         producing, using the two or more speakers, audio using an audio source in a first mode; and
         detecting, using the touch-sensitive surface, user input; and
      in response to detecting the user input and while continuing to display the user-movable affordance:
         in accordance with a set of one or more conditions being met, the set of one or more conditions including a first condition that is met when the user input is a touch-and-drag operation on the user-movable affordance:
            operating the electronic device in a second state of ambient sound transparency different from the first state of ambient sound transparency; and
            transitioning production of audio using the audio source from the first mode to a second mode different from the first mode;
         in accordance with the set of one or more conditions not being met:
            maintaining the electronic device in the first state of ambient sound transparency; and
            maintaining producing audio using the audio source in the first mode.

2. The device of claim 1, the one or more programs further including instructions for:
   in response to detecting the user input:
      updating display, on the display, of the user-movable affordance from the first location on the display to a second location on the display in accordance with movement, on the touch-sensitive surface, of the user input.

3. The device of claim 1, wherein the set of one or more conditions includes a second condition that is met when the user input causes displacement of the user-movable affordance from the first location by at least a predetermined amount.

4. The device of claim 2, the one or more programs further including instructions for:
   after the set of one or more conditions are being met, detecting an end of the user input; and
   in response to detecting the end of the user input:
      updating display, on the display, of the user-movable affordance to the first location on the display;
      transitioning the electronic device to operate in the first state of ambient sound transparency; and
      transitioning production of audio using the audio source from the second mode to the first mode.

5. The device of claim 2, the one or more programs further including instructions for:
   after the set of one or more conditions are being met, detecting an end of the user input; and
   in response to detecting the end of the user input:
      maintaining display, on the display, of the user-movable affordance at the second location on the display;
      maintaining operation of the electronic device in the second state of ambient sound transparency; and
      maintaining production of audio using the audio source in the second mode.

6. The device of claim 1, wherein:
   the user input includes a direction of movement;
   the second state of ambient sound transparency is based on the direction of movement of the user input; and
   the second mode is based on the direction of movement of the user input.

7. The device of claim 2, wherein the second mode is configured such that audio produced using the second mode is perceived by the user as being produced from a point in space that corresponds to the second location of the displayed user-movable affordance.

8. The device of claim 1, wherein the first mode does not include a modification of an interaural time difference of audio.

9. The device of claim 1, wherein the second mode includes a modification of an interaural time difference of audio.

10. The device of claim 8, wherein modification of the interaural time difference of audio includes:
    combining a first channel audio of the audio and a second channel audio of the audio to form a combined channel audio;
    updating the second channel audio to include the combined channel audio at a first delay; and
    updating the first channel audio to include the combined channel audio at a second delay different from the first delay.

11. A non-transitory computer-readable storage medium storing one or more programs configured to be executed by one or more processors of an electronic device with a display and a touch-sensitive surface, wherein the electronic device is operably connected with two or more speakers, the one or more programs including instructions for:
    displaying, at a first location on the display, a user-movable affordance;
    while the user-movable affordance is displayed at the first location:
        operating the electronic device in a first state of ambient sound transparency;
        producing, using the two or more speakers, audio using an audio source in a first mode; and
        detecting, using the touch-sensitive surface, user input; and
    in response to detecting the user input and while continuing to display the user-movable affordance:
        in accordance with a set of one or more conditions being met, the set of one or more conditions including a first condition that is met when the user input is a touch-and-drag operation on the user-movable affordance:
            operating the electronic device in a second state of ambient sound transparency different from the first state of ambient sound transparency; and
            transitioning production of audio using the audio source from the first mode to a second mode different from the first mode;
        in accordance with the set of one or more conditions not being met:
            maintaining the electronic device in the first state of ambient sound transparency; and
            maintaining producing audio using the audio source in the first mode.

12. The non-transitory computer-readable storage medium of claim 11, the one or more programs further including instructions for:
    in response to detecting the user input:
        updating display, on the display, of the user-movable affordance from the first location on the display to a second location on the display in accordance with movement, on the touch-sensitive surface, of the user input.

13. The non-transitory computer-readable storage medium of claim 11, wherein the set of one or more conditions includes a second condition that is met when the user input causes displacement of the user-movable affordance from the first location by at least a predetermined amount.

14. The non-transitory computer-readable storage medium of claim 12, the one or more programs further including instructions for:
    after the set of one or more conditions are being met, detecting an end of the user input; and
    in response to detecting the end of the user input:
        updating display, on the display, of the user-movable affordance to the first location on the display;
        transitioning the electronic device to operate in the first state of ambient sound transparency; and
        transitioning production of audio using the audio source from the second mode to the first mode.

15. The non-transitory computer-readable storage medium of claim 12, the one or more programs further including instructions for:
    after the set of one or more conditions are being met, detecting an end of the user input; and
    in response to detecting the end of the user input:
        maintaining display, on the display, of the user-movable affordance at the second location on the display;
        maintaining operation of the electronic device in the second state of ambient sound transparency; and
        maintaining production of audio using the audio source in the second mode.

16. The non-transitory computer-readable storage medium of claim 11, wherein:
    the user input includes a direction of movement;
    the second state of ambient sound transparency is based on the direction of movement of the user input; and
    the second mode is based on the direction of movement of the user input.

17. The non-transitory computer-readable storage medium of claim 12, wherein the second mode is configured such that audio produced using the second mode is perceived by the user as being produced from a point in space that corresponds to the second location of the displayed user-movable affordance.

18. The non-transitory computer-readable storage medium of claim 11, wherein the first mode does not include a modification of an interaural time difference of audio.

19. The non-transitory computer-readable storage medium of claim 11, wherein the second mode includes a modification of an interaural time difference of audio.

20. The non-transitory computer-readable storage medium of claim 18, wherein modification of the interaural time difference of audio includes:
    combining a first channel audio of the audio and a second channel audio of the audio to form a combined channel audio;
    updating the second channel audio to include the combined channel audio at a first delay; and
    updating the first channel audio to include the combined channel audio at a second delay different from the first delay.

21. A method, comprising:
    at an electronic device with a display and a touch-sensitive surface, wherein the electronic device is operably connected with two or more speakers:
        displaying, at a first location on the display, a user-movable affordance;
        while the user-movable affordance is displayed at the first location:
            operating the electronic device in a first state of ambient sound transparency;

producing, using the two or more speakers, audio using an audio source in a first mode; and detecting, using the touch-sensitive surface, user input; and in response to detecting the user input and while continuing to display the user-movable affordance:

in accordance with a set of one or more conditions being met, the set of one or more conditions including a first condition that is met when the user input is a touch-and-drag operation on the user-movable affordance:

operating the electronic device in a second state of ambient sound transparency different from the first state of ambient sound transparency; and transitioning production of audio using the audio source from the first mode to a second mode different from the first mode;

in accordance with the set of one or more conditions not being met:

maintaining the electronic device in the first state of ambient sound transparency; and maintaining producing audio using the audio source in the first mode.

22. The method of claim 21, further comprising:

in response to detecting the user input:

updating display, on the display, of the user-movable affordance from the first location on the display to a second location on the display in accordance with movement, on the touch-sensitive surface, of the user input.

23. The method of claim 21, wherein the set of one or more conditions includes a second condition that is met when the user input causes displacement of the user-movable affordance from the first location by at least a predetermined amount.

24. The method of claim 22, further comprising:

after the set of one or more conditions are being met, detecting an end of the user input; and in response to detecting the end of the user input:

updating display, on the display, of the user-movable affordance to the first location on the display;

transitioning the electronic device to operate in the first state of ambient sound transparency; and transitioning production of audio using the audio source from the second mode to the first mode.

25. The method of claim 22, further comprising:

after the set of one or more conditions are being met, detecting an end of the user input; and in response to detecting the end of the user input:

maintaining display, on the display, of the user-movable affordance at the second location on the display;

maintaining operation of the electronic device in the second state of ambient sound transparency; and maintaining production of audio using the audio source in the second mode.

26. The method of claim 21, wherein:

the user input includes a direction of movement;

the second state of ambient sound transparency is based on the direction of movement of the user input; and the second mode is based on the direction of movement of the user input.

27. The method of claim 22, wherein the second mode is configured such that audio produced using the second mode is perceived by the user as being produced from a point in space that corresponds to the second location of the displayed user-movable affordance.

28. The method of claim 21, wherein the first mode does not include a modification of an interaural time difference of audio.

29. The method of claim 21, wherein the second mode includes a modification of an interaural time difference of audio.

30. The method of claim 28, wherein modification of the interaural time difference of audio includes:

combining a first channel audio of the audio and a second channel audio of the audio to form a combined channel audio;

updating the second channel audio to include the combined channel audio at a first delay; and updating the first channel audio to include the combined channel audio at a second delay different from the first delay.

* * * * *